US005361387A

United States Patent [19]

Millar et al.

[11] Patent Number: 5,361,387

[45] Date of Patent: Nov. 1, 1994

[54] VIDEO ACCELERATOR AND METHOD USING SYSTEM RAM

[75] Inventors: Gregory M. Millar, Pleasanton; Tung-Faing Ko, San Jose; Nicolas N. Moss, Sunnyvale, all of Calif.; Jon F. Hueras, Chelmsford, Mass.

[73] Assignee: Radius Inc., San Jose, Calif.

[21] Appl. No.: 595,212

[22] Filed: Oct. 9, 1990

[51] Int. Cl.[5] .......... G06F 15/62

[52] U.S. Cl. .......... 395/164; 395/162; 345/201

[58] Field of Search .......... 364/162, 164, 165; 395/162, 164, 165, 250, 400, 425, 163, 166; 340/724, 727, 798, 799, 800; 345/185, 201

[56] References Cited

U.S. PATENT DOCUMENTS

| | | | |
|---|---|---|---|
| 4,135,213 | 1/1979 | Wintfeld et al. | 358/142 |
| 4,148,070 | 4/1979 | Taylor | 358/160 |
| 4,199,757 | 4/1980 | Ichimi | 340/750 |
| 4,370,645 | 1/1983 | Cason et al. | 340/709 |
| 4,485,378 | 11/1984 | Matsui et al. | 340/750 |
| 4,491,836 | 1/1985 | Collmeyer et al. | 340/747 |
| 4,546,451 | 10/1985 | Bruce | 364/900 |
| 4,586,037 | 4/1986 | Rosener et al. | 340/728 |
| 4,688,190 | 8/1987 | Bechtolsheim | 364/900 |

*Primary Examiner*—Dale M. Shaw
*Assistant Examiner*—Kee M. Tung
*Attorney, Agent, or Firm*—Stuart P. Meyer

[57] ABSTRACT

A computer video display acceleration system and method is disclosed for increasing the speed with which modifications can be made to video memory. This system and method uses a video buffer section in system memory with high priority access by a central processing unit which can use the buffer space to make changes rapidly in the stored video information. Once the changes are completed, the data stored in the buffer is written as a block of data to video memory without requiring additional video memory read cycles.

6 Claims, 8 Drawing Sheets

| | | | |
|---|---|---|---|
| $P_{00}$ | 0 | 0 | 0 |
| $P_{01}$ | 0 | 0 | 0 |
| $P_{02}$ | 0 | 0 | 0 |
| $P_{03}$ | 0 | 0 | 0 |

Figure 5A

| | | | |
|---|---|---|---|
| 0 | $P_{10}$ | 0 | 0 |
| 0 | $P_{11}$ | 0 | 0 |
| 0 | $P_{12}$ | 0 | 0 |
| 0 | $P_{13}$ | 0 | 0 |

Figure 5B

VIDEO ACCELERATOR AND METHOD USING SYSTEM RAM

RELATED APPLICATION

The subject matter of this application relates to the subject matter set forth in the utility application METHOD AND APPARATUS FOR CHANGING THE ORIENTATION OF A VIDEO DISPLAY, Ser. No. 07/447,110, filed on Dec. 6, 1989, by Julien T. Nguyen; the subject matter of which utility application is incorporated herein by reference.

FIELD OF THE INVENTION

This invention relates to video display systems, and more specifically to a method and system for accelerating video display modifications within a generic personal computer architecture.

BACKGROUND OF THE INVENTION

Traditional personal computer system architectures are structured around a Central Processing Unit (CPU) that communicates across a parallel bus to numerous peripherals and subsystems. The CPU commonly displays data on a video screen by writing the data over the main system bus to a dedicated block of Random Access Memory (RAM) which serves as video or display memory. A Cathode Ray Tube Controller (CRTC), acting essentially as a second CPU or display processor, periodically reads the data from video memory and presents it to a video display along a separate video bus. Substantial delays are introduced by this periodic cycle as the CRTC sequentially reads the memory locations of video memory and presents the stored data to refresh the display. During this refresh, the CRTC has access priority over the video memory, thereby excluding access by the CPU. Video data which is ready to be transmitted from the CPU must wait until the CRTC momentarily relinquishes control before such data can be written to video memory. Access to the video memory must be reestablished for each byte of data transmitted thereto. The consequence of this contention for access to the video memory is that presentation of data for video display is limited in conventional systems by the frequency with which the CPU is able to gain control of the video RAM between refresh cycles, and is therefore largely independent of processor speed.

Additionally, conventional systems commonly require the CPU to perform a read-modify-write sequence for each new byte that is sent to update the video display. This three step sequence is required to allow the CPU to add or subtract video data from the data that is stored for each display pixel, or picture element, without disturbing the stored data for other pixels. To accomplish this task, the CPU must read the byte of pixel data from video memory and analyze it before executing a subsequent write step. One consequence of the read-modify-write sequence is that every change in the data to be displayed requires two accesses to the video memory. The first access is to read the video memory and the second access is to write into the video memory. This double access requirement in conventional systems thus introduces substantial delays into the processing of video displays. Such delays in processing the video display can be easily observed in cursor movement on the video display, for example, when an input pointing device such as a "mouse" is moved. As a specific example, the computer program "Windows 3.0," supplied by Microsoft Corporation of Redmond, Wash., demonstrates a significant delay between rapid mouse movements and the resulting cursor response when the program is run on a conventional personal computer system. Another example of such delays can be observed when a command is given to fill a displayed block image with a solid color. Although the CPU rapidly calculates the coordinates of pixels to be altered, each coordinate must be transmitted to video memory one byte at a time. Between each byte transfer the CPU must wait to regain access to the video RAM. The resulting delay is evidenced by the relatively slow scanning motion that is observed on the display as the block image is filled with the solid color.

SUMMARY OF THE INVENTION

In accordance with the present invention, a portion of system RAM is used as a video buffer to reduce the access requirements usually associated with conventional separate video memory to provide faster, more responsive video displays. Specifically, this is accomplished by allocating video buffer space within system memory, by rerouting video display data from video RAM to video buffer memory, by storing parametric data describing the region of video that is to be changed, and by moving a block of data from the video buffer in system RAM to the video RAM. In this manner, the read cycle from video RAM normally required with each video write cycle is completely eliminated. Since video RAM 4 access is much more time consuming than system RAM access, this video acceleration technique provides gains of almost 2 to 1 in the speed of performance and reduces the annoying display artifacts resulting from refresh cycle delays in conventional systems.

DESCRIPTION OF THE DRAWINGS

FIG. 5(*a*) illustrates data resulting from rotation of the data in the lowest row of FIG. 4(*a*), and FIG. 5(*b*) illustrates data resulting from rotation of data in the next to the bottom row of FIG. 4(*a*), in accordance with the present invention.

DESCRIPTION OF THE PREFERRED EMBODIMENT

Figure 1:
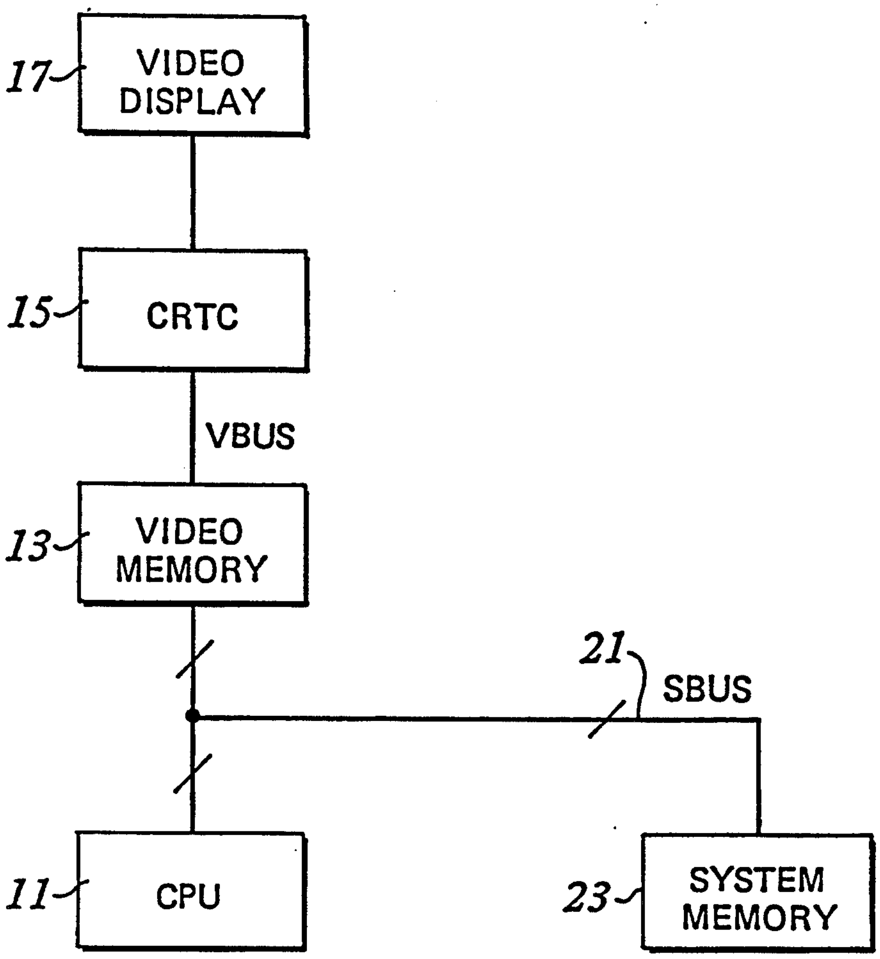
Figure 1 (Prior Art)
FIG. 1 is a block diagram illustrating a conventional computer architecture.

Referring now to FIG. 1, there is shown a block diagram of typical computer architecture for controlling the video display according to the prior art. The Central Processing Unit (CPU) 11 is connected to RAM video memory 13 and RAM system memory 23 by the system bus 21. The video memory 13 is also connected to the CRTC 15 by the video bus 19. In operation, the CPU 11 generates a change in the video display 17 by writing a new byte of video information into video memory 13. This change is accomplished by first reading the contents of video memory 13, then modifying the byte of data stored there, and finally rewriting the new data back into video memory 13. The need for this three step sequence results from the fact that, when modifying a video pixel, the CPU 11 adds or subtracts video data from the video image byte without disturbing other data within the same byte. This protection of existing video data requires reading the image byte from video memory 13 and analyzing it before the subsequent write step is executed.

The CRTC 15 scans video memory 13 periodically and displays the contents of that memory 13 on the video display 17. During this CRTC 15 scan, further access to the video memory 13 by the CPU 11 is disabled until that refresh cycle is completed. The main priority of the CRTC 15 is to continually refresh the video display 17 with information stored in the video memory 13. As a result, there is often significant delay associated with the access to video memory 13 by the CPU 11. The requirement for two accesses to video memory 13 for each modification of the data for the video display 17 that is stored in the video memory 13 while the CRTC 15 may have access thereto results in significant time spent by the CPU 11 waiting for access to the video memory 13 simply to update the video display 17.

Figure 3:
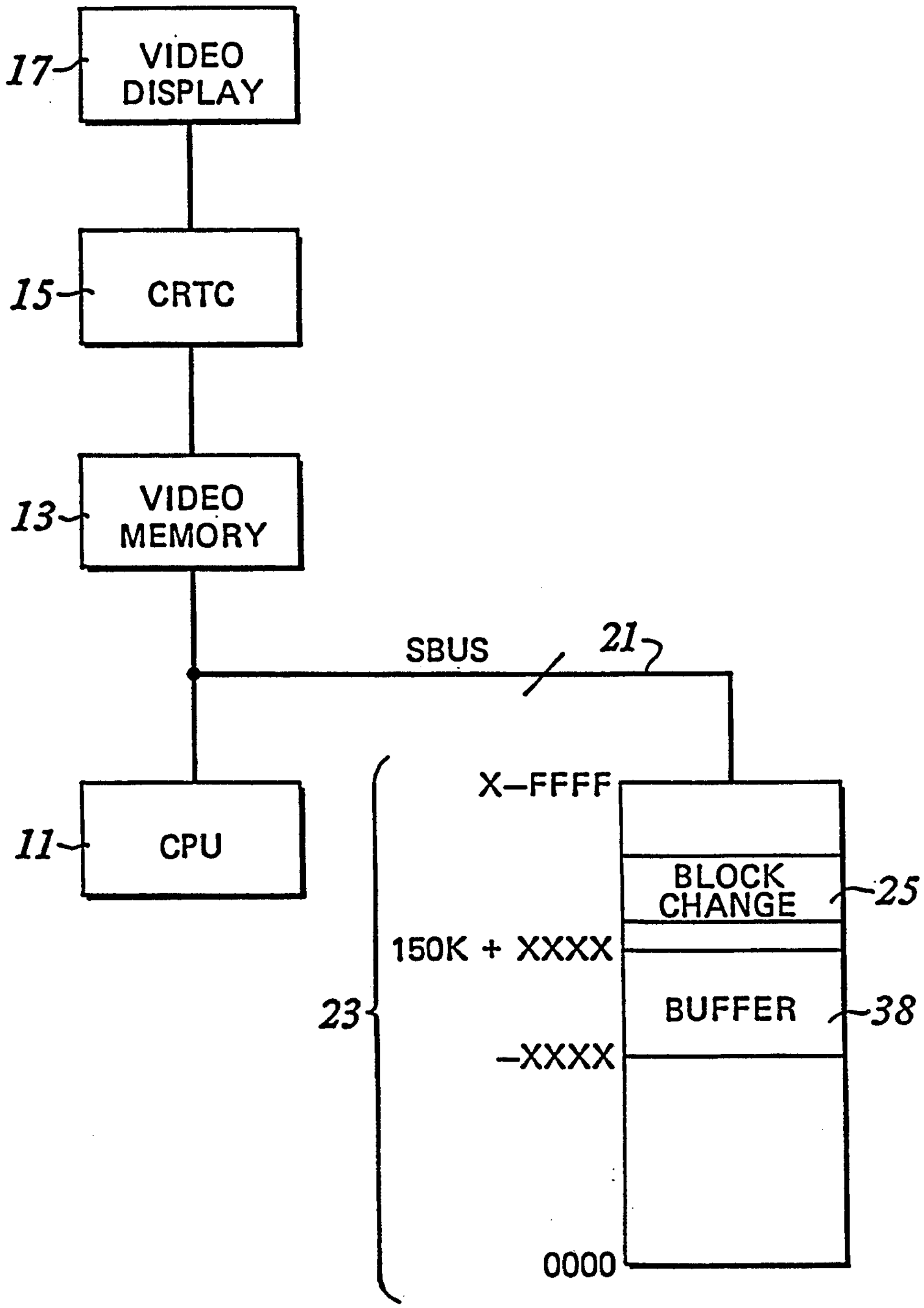
FIG. 3 is a block diagram showing the preferred embodiment of the present invention in a conventional computer architecture.

Referring now to FIG. 3, in accordance with the present invention, the CPU 11 allocates a section of about 150K bytes in the system memory 23 to act as a buffer 38 between the CPU 11 and the video memory 13, thereby keeping the image to be displayed within the contents of the system memory 23 at all times. Modification to video memory 13 is made by first reading and writing to the system memory buffer 38 instead of by changing display data in video memory 13. Since system memory 23 access has high priority for the CPU 11, there are no wait states or delays introduced during the read-modify-write accesses to system memory 23 in contrast to delays encountered using this same procedure to update video memory 13, as previously described. Once the data for the displayable image is modified within the memory buffer 38 of the system memory 23, its contents may then be written to video memory 13. The data from the system memory 23 that is to be transferred to the video memory 13 may also be transformed in various ways, as later described herein. The conventional read-modify-write sequence in video memory 13 is thereby avoided since the image data modification already occurred in system memory 23 without introducing operating delays in the CPU 11. This use of system memory 23 for buffer storage of image data has the effect of reducing the number of accesses to video memory 13 by about one-half. Since the wait period encountered by the CPU 11 in accessing video memory 13 is a significant portion of the CPU 11 instruction cycle, this scheme of operation according to the present invention provides improvement of about two to one in the speed of operation to update the video display 17.

Figure 2:
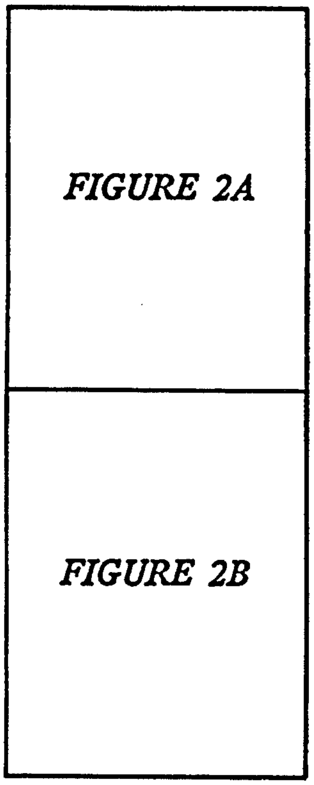
FIG. 2 shows a flow chart illustrating video RAM acceleration in accordance with the present invention.
Figure 2A:
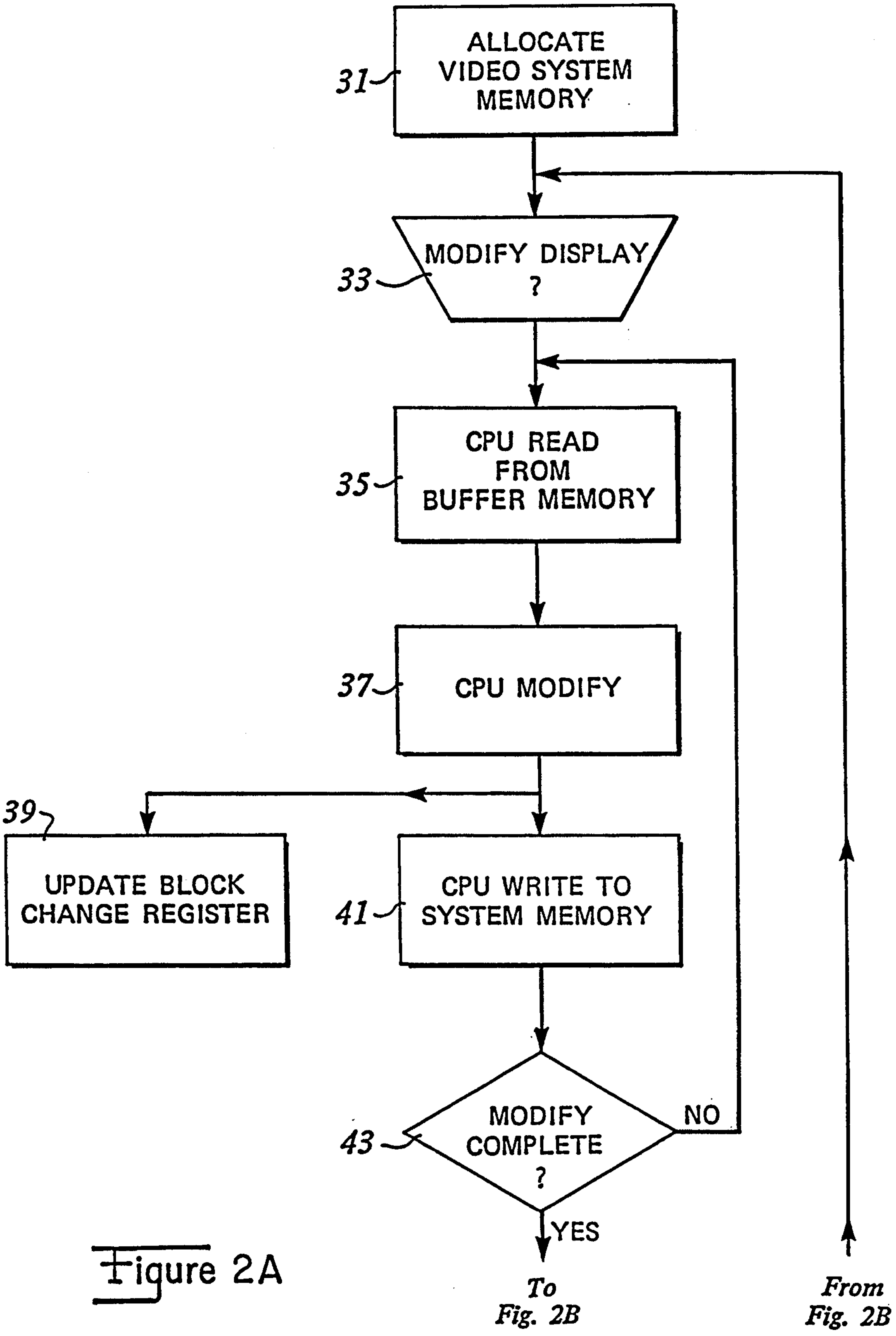
Figure 2B:
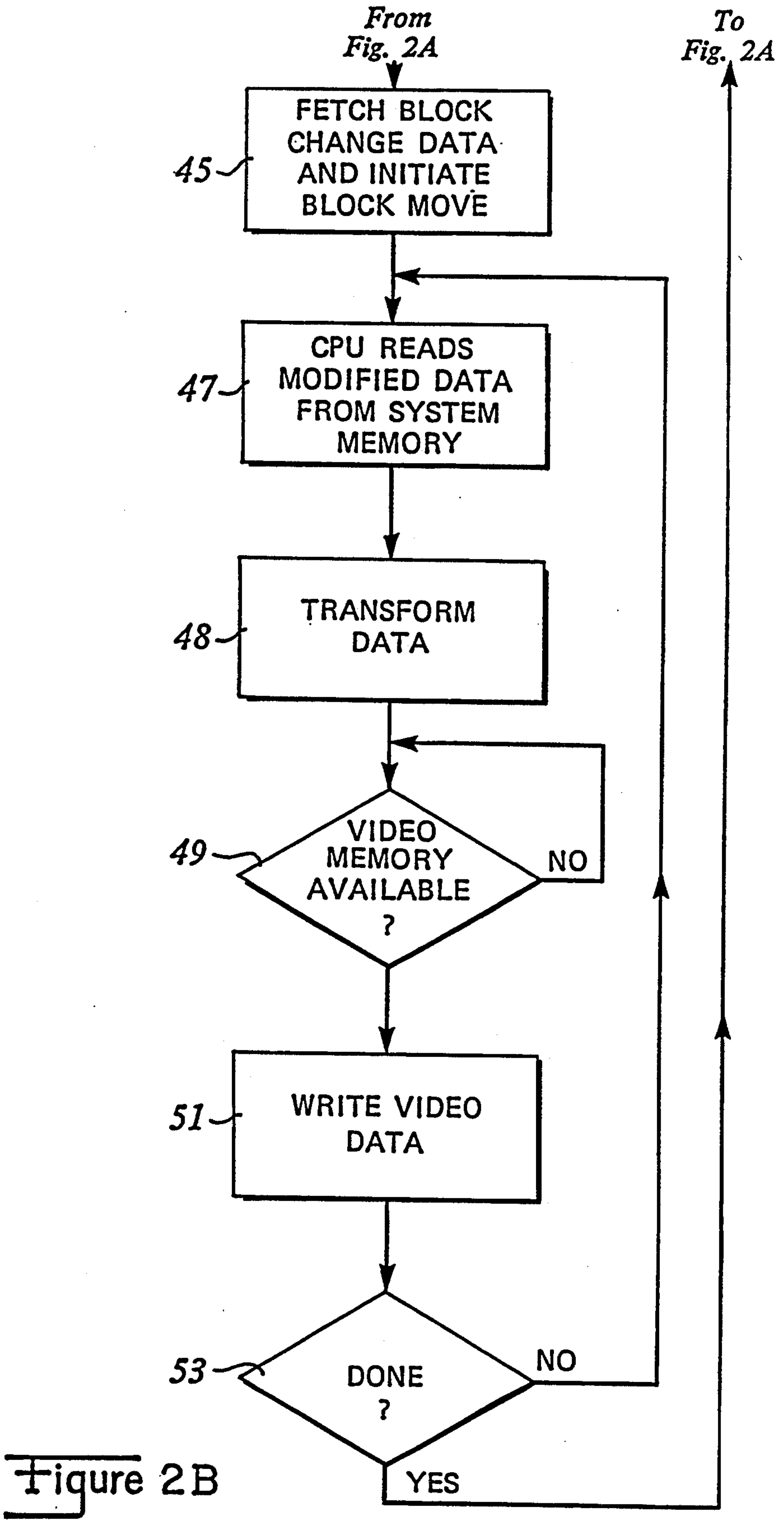

Referring now to FIG. 2, there is shown a flow diagram of the method in accordance with the present invention. Initially, a portion of the system memory 23 is allocated 31 to operate as a buffer memory for the CPU 11. In allocating system memory 23, the CPU 11 partitions off and protects approximately 150K bytes of RAM in a conventional manner to serve as a video buffer memory 38 that cannot be over-written by other on-going CPU 11 programs and processes. In addition, another portion of system memory 23 serves as a block change register 25, as later described herein.

During normal processing of data to produce a video display, the CPU 11 will encounter an instruction to modify 33 the video display 17. The CPU 11 reads 35 the contents of the buffer memory 38 over the system bus 21. Then, the CPU 11 modifies 37 the contents of the buffer memory 38 and subsequently writes 41 the modified data into the buffer memory 38. At the same time, the block change register 25 is updated 39 in order to keep track of which locations in the buffer memory 38 were actually modified.

Then, the subsequent operation of the CPU 11 is determined 43 by whether or not the modification to buffer memory 38 is complete. If the modification is not complete, processing returns to step 35 in which the CPU 11 reads video data from buffer memory 38. If the modification is complete, the CPU fetches 45 the updated block change register 25 and, based upon the contents of that register 25, moves the modified video data from the buffer memory 38 to the corresponding location in video memory 13 without requiring additional reads of the data in video memory 13. The block change register 25 points to the first location in buffer memory 38 containing a byte of modified video data. The CPU 11 next reads 47 this first byte of modified video data from the system memory and applies a data transform 48 on this block of video data being moved. The specific type and steps of the transform 48 depend largely on the type of display for which video data is accumulated in video memory 13. For a conventional raster-type video display terminal 17, this transform may comprise the steps of converting sequentially-arranged data to a format in the video memory which orients bytes of the data over the finite lengths of successive horizontal video scan lines. If the display is, for example, a line printer, then the transform may comprise alternating the sequence of data formatted for forward and backward printing in alternate lines to facilitate printing of the data during alternating forward and backward scanning operation of the printer. Various other embodiments of this transform may include the transform of data for operation of a video display in 'portrait' or 'landscape' mode, as described below and in the aforecited related application.

The CPU attempts to transfer the block of video data in the buffer memory 38 to video memory 13 by first polling video memory 13 to check its availability 49 for access. If the video memory 13 is engaged with the CRTC 15 in a video refresh cycle, the CPU 11 waits until the cycle is completed. When video memory 13 is available for access, the CPU 11 then writes 51 a byte of video data into video memory 13. If the block move is completed, the CPU 11 then resumes processing other system functions until a subsequent modification 33 of the display is encountered. However, if the block move is not completed, the CPU 11 reads 47 the contents of the next memory location and again attempts to transfer the modified video data in the manner as previously described.

Following the block move 45, the CRTC 15 refreshes the video display 17 based upon the new contents of video memory 13. In updating and writing modified video data, the read-modify-write sequence of steps 33 through 51 are performed using the fast-access system memory 23 rather than the video memory 13 to which the CPU 11 has only lower access priority.

Figure 4A:
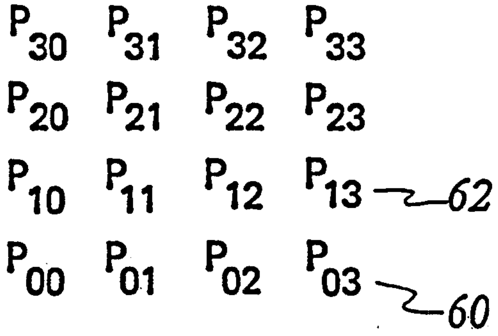
FIG. 4(*a*) illustrates a four-by-four square of pixels before ninety degree rotation, and FIG. 4(*b*) illustrates those same pixels after rotation, in accordance with the present invention.
Figure 4B:
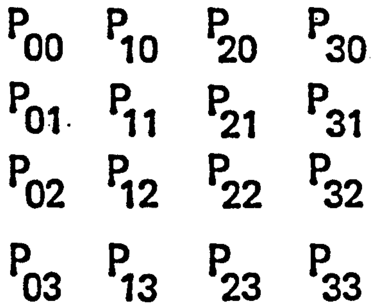

As already discussed, a data transform 48 may be performed on a block of video data in accordance with the present invention. Referring now to FIGS. 4(*a*) and 4(*b*), this transform may include a ninety degree rotation of the displayed video data. FIG. 4(*a*) illustrates a four-by-four square of pixels before such rotation, and FIG. 4(*b*) illustrates those same pixels after rotation.

Assuming that each pixel is defined by two bits and that each row of four pixels is defined by a single byte, a conventional method for performing the pixel rotation would require copying the byte containing the pixel, masking out all bits of that byte not associated with the pixel, shifting the bits as required to correspond to the new position of the pixel, and performing an OR operation to write the byte containing the shifted pixel into the destination byte. This method may be rather time consuming because each of the 16 pixels in the block must be processed as described above, one at a time. A conventional technique using bit-fields rather than the masking, shifting and OR operations described above may yield some improvements in efficiency, but still requires separate operations for each pixel.

Figure 6:
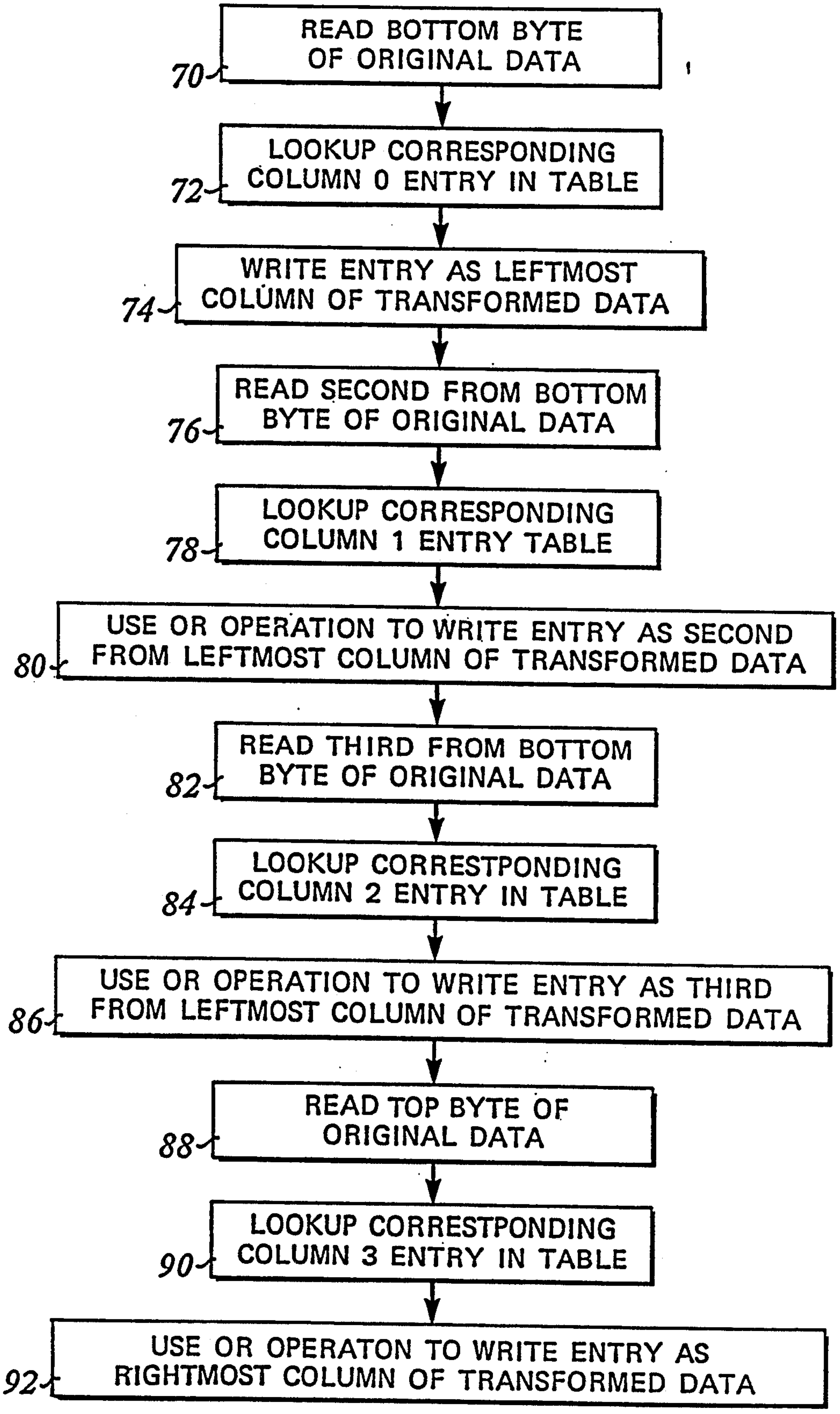
FIG. 6 illustrates processing flow for transformation of the pixels illustrated in FIG. 4(*a*) to the transformed block of FIG. 4(*b*), in accordance with the present invention.

A transform in accordance with the present invention involves the use of a lookup table to permit processing of an entire byte of information at one time. Each byte of pixel data is used as an index to a lookup table, and separate lookup tables are used for each destination column. FIG. 5(*a*) illustrates the data resulting from application of the bottom row 60 of FIG. 4(*a*) to the lookup table for the leftmost destination column, and FIG. 5(*b*) illustrates the data resulting from application of the next to the bottom row 62 of FIG. 4(*a*) to the lookup table for the next to leftmost destination column. To transform all of the pixel information of the four-by-four block of pixels illustrated in FIG. 4(*a*) to the transformed block of FIG. 4(*b*), the processing flow illustrated in FIG. 6 is used. The first step is for the byte containing the bottom row 60 of pixels ($p_{00}p_{01}p_{02}p_{03}$) in FIG. 4(*a*) to be read 70. This byte is used in step 72 as the index to an entry in a lookup table designated for destination column 0, since upon transform all of these pixels will reside in the leftmost column of the block of FIG. 4(*b*). In step 74, the corresponding table entry is written as the first component of the transformed block (also illustrated as FIG. 5(*a*)). Next, step 76 reads the second from the bottom byte of data from the original block (pixels $p_{10}p_{11}p_{12}p_{13}$ in FIG. 4(*a*)), step 78 looks up the corresponding entry in the lookup table for column 1 of the transformed data, and step 80 writes that information (shown as FIG. 5 (b)) into the transformed data block by performing an OR operation with the partial transformed data already written in step 74. Similarly, the third and fourth rows of data are read, the corresponding table entries obtained, and the partial transformed data written to the transformed data block in steps 82 through 92.

The use of a lookup table is relatively slow if measured on an instruction by instruction basis, because the lookup table entries must be obtained from memory. However, an overall time savings is achieved because only one such operation is required to transform four pixels. Furthermore, conventional memory caching techniques may be used to reduce the amount of time required for the lookup operations.

Different pixel bit depths or memory limitations may call for the use of different-sized data blocks to perform this transformation. For instance, pixels defined by only one bit may be efficiently processed using data blocks representing eight by eight squares of pixels. Each row of eight pixels may be represented by a single byte which, when transformed, will result in a single column of transformed data. Such a scheme may provide even greater efficiencies if separate tables are not provided for each column, but a single large table is used, and only the pertinent output column information from that table is written to the transformed data block, depending on which row the input information was obtained from. For instance, the one byte input word from the third row would be applied to the lookup table, and the corresponding entry would by a full eight byte square of information. However, the only pertinent information from that entry would be the third column, so the other columns of information would simply be masked out before the information was written (via an OR operation) into the transformed block of data. Further efficiencies may be achieved by writing the partial transform destination bytes to two 32-bit data registers, so that the number of memory calls is reduced during manipulation. After the transformation is complete, the fully transformed data may then be written to the destination locations.

In the preferred embodiment, pixels defined by two bits are transformed from a eight by four pixel rectangle to a four by eight pixel rectangle. Although the environment of the preferred embodiment contains sufficient registers to perform eight by eight rotation, the resulting instruction algorithm would exceed the size of the available memory cache and therefore execute comparatively more slowly. In the preferred embodiment, each source row of eight pixels requires two bytes, and processing is performed as described above, except that processing uses two-byte, rather than one-byte, words. Separate lookups are performed on each of the two bytes, the appropriate table entries are masked out so that only the pertinent column information is written, and the partial transform destination bytes are stored in data registers until the transformation is complete.

In cases where pixels are each defined by four bits, eight by four pixel blocks are transformed to four by eight pixel blocks, but four bytes are required for each row of eight pixels. Separate lookups are performed for each of the four bytes, and the appropriate table entries are masked out. Four 32-bit data registers are used to store the partial destination bytes during transformation, and after transformation is complete, the transformed data is written to the destination locations.

As a further disclosure, examples of lookup tables for ninety degree transformation of one-bit, two-bit and four-bit pixels as described herein are provided as an appendix to this specification. The numbers in the appended tables are in hexadecimal format.

Therefore, the use of a buffer memory segment of the system memory rather than a video memory for updating video data in accordance with the present invention reduces video refresh cycle delays and accelerates the modification of video data for display.

APPENDIX 1-bit Mode - Destination Column 0

| Src | Destination Row | | | | | | | | Src | Destination Row | | | | | | | | Src | Destination Row | | | | | | | |
|---|---|---|---|---|---|---|---|---|---|---|---|---|---|---|---|---|---|---|---|---|---|---|---|---|---|---|
| Byte | 0 | 1 | 2 | 3 | 4 | 5 | 6 | 7 | Byte | 0 | 1 | 2 | 3 | 4 | 5 | 6 | 7 | Byte | 0 | 1 | 2 | 3 | 4 | 5 | 6 | 7 |
| 00 | 00 | 00 | 00 | 00 | 00 | 00 | 00 | 00 | 1C | 00 | 00 | 00 | 80 | 80 | 80 | 00 | 00 | 39 | 00 | 00 | 80 | 80 | 80 | 00 | 00 | 80 |
| 01 | 00 | 00 | 00 | 00 | 00 | 00 | 00 | 80 | 1D | 00 | 00 | 00 | 80 | 80 | 80 | 00 | 80 | 3A | 00 | 00 | 80 | 80 | 80 | 00 | 80 | 00 |
| 02 | 00 | 00 | 00 | 00 | 00 | 00 | 80 | 00 | 1E | 00 | 00 | 00 | 80 | 80 | 80 | 80 | 00 | 3B | 00 | 00 | 80 | 80 | 80 | 00 | 80 | 80 |
| 03 | 00 | 00 | 00 | 00 | 00 | 00 | 80 | 80 | 1F | 00 | 00 | 00 | 80 | 80 | 80 | 80 | 80 | 3C | 00 | 00 | 80 | 80 | 80 | 80 | 00 | 00 |
| 04 | 00 | 00 | 00 | 00 | 00 | 80 | 00 | 00 | 20 | 00 | 00 | 80 | 00 | 00 | 00 | 00 | 00 | 3D | 00 | 00 | 80 | 80 | 80 | 80 | 00 | 80 |
| 05 | 00 | 00 | 00 | 00 | 00 | 80 | 00 | 80 | 21 | 00 | 00 | 80 | 00 | 00 | 00 | 00 | 80 | 3E | 00 | 00 | 80 | 80 | 80 | 80 | 80 | 00 |
| 06 | 00 | 00 | 00 | 00 | 00 | 80 | 80 | 00 | 22 | 00 | 00 | 80 | 00 | 00 | 00 | 80 | 00 | 3F | 00 | 00 | 80 | 80 | 80 | 80 | 80 | 80 |
| 07 | 00 | 00 | 00 | 00 | 00 | 80 | 80 | 80 | 23 | 00 | 00 | 80 | 00 | 00 | 00 | 80 | 80 | 40 | 00 | 80 | 00 | 00 | 00 | 00 | 00 | 00 |
| 08 | 00 | 00 | 00 | 00 | 80 | 00 | 00 | 00 | 24 | 00 | 00 | 80 | 00 | 00 | 80 | 00 | 00 | 41 | 00 | 80 | 00 | 00 | 00 | 00 | 00 | 80 |
| 09 | 00 | 00 | 00 | 00 | 80 | 00 | 00 | 80 | 25 | 00 | 00 | 80 | 00 | 00 | 80 | 00 | 80 | 42 | 00 | 80 | 00 | 00 | 00 | 00 | 80 | 00 |
| 0A | 00 | 00 | 00 | 00 | 80 | 00 | 80 | 00 | 26 | 00 | 00 | 80 | 00 | 00 | 80 | 80 | 00 | 43 | 00 | 80 | 00 | 00 | 00 | 00 | 80 | 80 |
| 0B | 00 | 00 | 00 | 00 | 80 | 00 | 80 | 80 | 27 | 00 | 00 | 80 | 00 | 00 | 80 | 80 | 80 | 44 | 00 | 80 | 00 | 00 | 00 | 80 | 00 | 00 |
| 0C | 00 | 00 | 00 | 00 | 80 | 80 | 00 | 00 | 28 | 00 | 00 | 80 | 00 | 80 | 00 | 00 | 00 | 45 | 00 | 80 | 00 | 00 | 00 | 80 | 00 | 80 |
| 0D | 00 | 00 | 00 | 00 | 80 | 80 | 00 | 80 | 29 | 00 | 00 | 80 | 00 | 80 | 00 | 00 | 80 | 46 | 00 | 80 | 00 | 00 | 00 | 80 | 80 | 00 |
| 0E | 00 | 00 | 00 | 00 | 80 | 80 | 80 | 00 | 2A | 00 | 00 | 80 | 00 | 80 | 00 | 80 | 00 | 47 | 00 | 80 | 00 | 00 | 00 | 80 | 80 | 80 |
| 0F | 00 | 00 | 00 | 00 | 80 | 80 | 80 | 80 | 2B | 00 | 00 | 80 | 00 | 80 | 00 | 80 | 80 | 48 | 00 | 80 | 00 | 00 | 80 | 00 | 00 | 00 |
| 10 | 00 | 00 | 00 | 80 | 00 | 00 | 00 | 00 | 2C | 00 | 00 | 80 | 00 | 80 | 80 | 00 | 00 | 49 | 00 | 80 | 00 | 00 | 80 | 00 | 00 | 80 |
| 11 | 00 | 00 | 00 | 80 | 00 | 00 | 00 | 80 | 2D | 00 | 00 | 80 | 00 | 80 | 80 | 00 | 80 | 4A | 00 | 80 | 00 | 00 | 80 | 00 | 80 | 00 |
| 12 | 00 | 00 | 00 | 80 | 00 | 00 | 80 | 00 | 2E | 00 | 00 | 80 | 00 | 80 | 80 | 80 | 00 | 4B | 00 | 80 | 00 | 00 | 80 | 00 | 80 | 80 |
| 13 | 00 | 00 | 00 | 80 | 00 | 00 | 80 | 80 | 2F | 00 | 00 | 80 | 00 | 80 | 80 | 80 | 80 | 4C | 00 | 80 | 00 | 00 | 80 | 80 | 00 | 00 |
| 14 | 00 | 00 | 00 | 80 | 00 | 80 | 00 | 00 | 30 | 00 | 00 | 80 | 80 | 00 | 00 | 00 | 00 | 4D | 00 | 80 | 00 | 00 | 80 | 80 | 00 | 80 |
| 15 | 00 | 00 | 00 | 80 | 00 | 80 | 00 | 80 | 31 | 00 | 00 | 80 | 80 | 00 | 00 | 00 | 80 | 4E | 00 | 80 | 00 | 00 | 80 | 80 | 80 | 00 |
| 16 | 00 | 00 | 00 | 80 | 00 | 80 | 80 | 00 | 32 | 00 | 00 | 80 | 80 | 00 | 00 | 80 | 00 | 4F | 00 | 80 | 00 | 00 | 80 | 80 | 80 | 80 |
| 17 | 00 | 00 | 00 | 80 | 00 | 80 | 80 | 80 | 33 | 00 | 00 | 80 | 80 | 00 | 00 | 80 | 80 | 50 | 00 | 80 | 00 | 80 | 00 | 00 | 00 | 00 |
| 18 | 00 | 00 | 00 | 80 | 80 | 00 | 00 | 00 | 34 | 00 | 00 | 80 | 80 | 00 | 80 | 00 | 00 | 51 | 00 | 80 | 00 | 80 | 00 | 00 | 00 | 80 |
| 19 | 00 | 00 | 00 | 80 | 80 | 00 | 00 | 80 | 35 | 00 | 00 | 80 | 80 | 00 | 80 | 00 | 80 | 52 | 00 | 80 | 00 | 80 | 00 | 00 | 80 | 00 |
| 1A | 00 | 00 | 00 | 80 | 80 | 00 | 80 | 00 | 36 | 00 | 00 | 80 | 80 | 00 | 80 | 80 | 00 | 53 | 00 | 80 | 00 | 80 | 00 | 00 | 80 | 80 |
| 1B | 00 | 00 | 00 | 80 | 80 | 00 | 80 | 80 | 37 | 00 | 00 | 80 | 80 | 00 | 80 | 80 | 80 | 54 | 00 | 80 | 00 | 80 | 00 | 80 | 00 | 00 |
| | | | | | | | | | 38 | 00 | 00 | 80 | 80 | 80 | 00 | 00 | 00 | 55 | 00 | 80 | 00 | 80 | 00 | 80 | 00 | 80 |
| 56 | 00 | 80 | 00 | 80 | 00 | 80 | 80 | 00 | 73 | 00 | 80 | 80 | 80 | 00 | 00 | 80 | 80 | 90 | 80 | 00 | 00 | 80 | 00 | 00 | 00 | 00 |
| 57 | 00 | 80 | 00 | 80 | 00 | 80 | 80 | 80 | 74 | 00 | 80 | 80 | 80 | 00 | 80 | 00 | 00 | 91 | 80 | 00 | 00 | 80 | 00 | 00 | 00 | 80 |
| 58 | 00 | 80 | 00 | 80 | 80 | 00 | 00 | 00 | 75 | 00 | 80 | 80 | 80 | 00 | 80 | 00 | 80 | 92 | 80 | 00 | 00 | 80 | 00 | 00 | 80 | 00 |
| 59 | 00 | 80 | 00 | 80 | 80 | 00 | 00 | 80 | 76 | 00 | 80 | 80 | 80 | 00 | 80 | 80 | 00 | 93 | 80 | 00 | 00 | 80 | 00 | 00 | 80 | 80 |
| 5A | 00 | 80 | 00 | 80 | 80 | 00 | 80 | 00 | 77 | 00 | 80 | 80 | 80 | 00 | 80 | 80 | 80 | 94 | 80 | 00 | 00 | 80 | 00 | 80 | 00 | 00 |
| 5B | 00 | 80 | 00 | 80 | 80 | 00 | 80 | 80 | 78 | 00 | 80 | 80 | 80 | 80 | 00 | 00 | 00 | 95 | 80 | 00 | 00 | 80 | 00 | 80 | 00 | 80 |
| 5C | 00 | 80 | 00 | 80 | 80 | 80 | 00 | 00 | 79 | 00 | 80 | 80 | 80 | 80 | 00 | 00 | 80 | 96 | 80 | 00 | 00 | 80 | 00 | 80 | 80 | 00 |
| 5D | 00 | 80 | 00 | 80 | 80 | 80 | 00 | 80 | 7A | 00 | 80 | 80 | 80 | 80 | 00 | 80 | 00 | 97 | 80 | 00 | 00 | 80 | 00 | 80 | 80 | 80 |
| 5E | 00 | 80 | 00 | 80 | 80 | 80 | 80 | 00 | 7B | 00 | 80 | 80 | 80 | 80 | 00 | 80 | 80 | 98 | 80 | 00 | 00 | 80 | 80 | 00 | 00 | 00 |
| 5F | 00 | 80 | 00 | 80 | 80 | 80 | 80 | 80 | 7C | 00 | 80 | 80 | 80 | 80 | 80 | 00 | 00 | 99 | 80 | 00 | 00 | 80 | 80 | 00 | 00 | 80 |
| 60 | 00 | 80 | 80 | 00 | 00 | 00 | 00 | 00 | 7D | 00 | 80 | 80 | 80 | 80 | 80 | 00 | 80 | 9A | 80 | 00 | 00 | 80 | 80 | 00 | 80 | 00 |
| 61 | 00 | 80 | 80 | 00 | 00 | 00 | 00 | 80 | 7E | 00 | 80 | 80 | 80 | 80 | 80 | 80 | 00 | 9B | 80 | 00 | 00 | 80 | 80 | 00 | 80 | 80 |
| 62 | 00 | 80 | 80 | 00 | 00 | 00 | 80 | 00 | 7F | 00 | 80 | 80 | 80 | 80 | 80 | 80 | 80 | 9C | 80 | 00 | 00 | 80 | 80 | 80 | 00 | 00 |
| 63 | 00 | 80 | 80 | 00 | 00 | 00 | 80 | 80 | 80 | 80 | 00 | 00 | 00 | 00 | 00 | 00 | 00 | 9D | 80 | 00 | 00 | 80 | 80 | 80 | 00 | 80 |
| 64 | 00 | 80 | 80 | 00 | 00 | 80 | 00 | 00 | 81 | 80 | 00 | 00 | 00 | 00 | 00 | 00 | 80 | 9E | 80 | 00 | 00 | 80 | 80 | 80 | 80 | 00 |
| 65 | 00 | 80 | 80 | 00 | 00 | 80 | 00 | 80 | 82 | 80 | 00 | 00 | 00 | 00 | 00 | 80 | 00 | 9F | 80 | 00 | 00 | 80 | 80 | 80 | 80 | 80 |
| 66 | 00 | 80 | 80 | 00 | 00 | 80 | 80 | 00 | 83 | 80 | 00 | 00 | 00 | 00 | 00 | 80 | 80 | A0 | 80 | 00 | 80 | 00 | 00 | 00 | 00 | 00 |
| 67 | 00 | 80 | 80 | 00 | 00 | 80 | 80 | 80 | 84 | 80 | 00 | 00 | 00 | 00 | 80 | 00 | 00 | A1 | 80 | 00 | 80 | 00 | 00 | 00 | 00 | 80 |
| 68 | 00 | 80 | 80 | 00 | 80 | 00 | 00 | 00 | 85 | 80 | 00 | 00 | 00 | 00 | 80 | 00 | 80 | A2 | 80 | 00 | 80 | 00 | 00 | 00 | 80 | 00 |
| 69 | 00 | 80 | 80 | 00 | 80 | 00 | 00 | 80 | 86 | 80 | 00 | 00 | 00 | 00 | 80 | 80 | 00 | A3 | 80 | 00 | 80 | 00 | 00 | 00 | 80 | 80 |
| 6A | 00 | 80 | 80 | 00 | 80 | 00 | 80 | 00 | 87 | 80 | 00 | 00 | 00 | 00 | 80 | 80 | 80 | A4 | 80 | 00 | 80 | 00 | 00 | 80 | 00 | 00 |
| 6B | 00 | 80 | 80 | 00 | 80 | 00 | 80 | 80 | 88 | 80 | 00 | 00 | 00 | 80 | 00 | 00 | 00 | A5 | 80 | 00 | 80 | 00 | 00 | 80 | 00 | 80 |
| 6C | 00 | 80 | 80 | 00 | 80 | 80 | 00 | 00 | 89 | 80 | 00 | 00 | 00 | 80 | 00 | 00 | 80 | A6 | 80 | 00 | 80 | 00 | 00 | 80 | 80 | 00 |
| 6D | 00 | 80 | 80 | 00 | 80 | 80 | 00 | 80 | 8A | 80 | 00 | 00 | 00 | 80 | 00 | 80 | 00 | A7 | 80 | 00 | 80 | 00 | 00 | 80 | 80 | 80 |
| 6E | 00 | 80 | 80 | 00 | 80 | 80 | 80 | 00 | 8B | 80 | 00 | 00 | 00 | 80 | 00 | 80 | 80 | A8 | 80 | 00 | 80 | 00 | 80 | 00 | 00 | 00 |
| 6F | 00 | 80 | 80 | 00 | 80 | 80 | 80 | 80 | 8C | 80 | 00 | 00 | 00 | 80 | 80 | 00 | 00 | A9 | 80 | 00 | 80 | 00 | 80 | 00 | 00 | 80 |
| 70 | 00 | 80 | 80 | 80 | 00 | 00 | 00 | 00 | 8D | 80 | 00 | 00 | 00 | 80 | 80 | 00 | 80 | AA | 80 | 00 | 80 | 00 | 80 | 00 | 80 | 00 |
| 71 | 00 | 80 | 80 | 80 | 00 | 00 | 00 | 80 | 8E | 80 | 00 | 00 | 00 | 80 | 80 | 80 | 00 | AB | 80 | 00 | 80 | 00 | 80 | 00 | 80 | 80 |
| 72 | 00 | 80 | 80 | 80 | 00 | 00 | 80 | 00 | 8F | 80 | 00 | 00 | 00 | 80 | 80 | 80 | 80 | AC | 80 | 00 | 80 | 00 | 80 | 80 | 00 | 00 |
| AD | 80 | 00 | 80 | 00 | 80 | 80 | 00 | 80 | CA | 80 | 80 | 00 | 00 | 80 | 00 | 80 | 00 | E7 | 80 | 80 | 80 | 00 | 00 | 80 | 80 | 80 |
| AE | 80 | 00 | 80 | 00 | 80 | 80 | 80 | 00 | CB | 80 | 80 | 00 | 00 | 80 | 00 | 80 | 80 | E8 | 80 | 80 | 80 | 00 | 80 | 00 | 00 | 00 |
| AF | 80 | 00 | 80 | 00 | 80 | 80 | 80 | 80 | CC | 80 | 80 | 00 | 00 | 80 | 80 | 00 | 00 | E9 | 80 | 80 | 80 | 00 | 80 | 00 | 00 | 80 |
| B0 | 80 | 00 | 80 | 80 | 00 | 00 | 00 | 00 | CD | 80 | 80 | 00 | 00 | 80 | 80 | 00 | 80 | EA | 80 | 80 | 80 | 00 | 80 | 00 | 80 | 00 |
| B1 | 80 | 00 | 80 | 80 | 00 | 00 | 00 | 80 | CE | 80 | 80 | 00 | 00 | 80 | 80 | 80 | 00 | EB | 80 | 80 | 80 | 00 | 80 | 00 | 80 | 80 |
| B2 | 80 | 00 | 80 | 80 | 00 | 00 | 80 | 00 | CF | 80 | 80 | 00 | 00 | 80 | 80 | 80 | 80 | EC | 80 | 80 | 80 | 00 | 80 | 80 | 00 | 00 |
| B3 | 80 | 00 | 80 | 80 | 00 | 00 | 80 | 80 | D0 | 80 | 80 | 00 | 80 | 00 | 00 | 00 | 00 | ED | 80 | 80 | 80 | 00 | 80 | 80 | 00 | 80 |
| B4 | 80 | 00 | 80 | 80 | 00 | 80 | 00 | 00 | D1 | 80 | 80 | 00 | 80 | 00 | 00 | 00 | 80 | EE | 80 | 80 | 80 | 00 | 80 | 80 | 80 | 00 |
| B5 | 80 | 00 | 80 | 80 | 00 | 80 | 00 | 80 | D2 | 80 | 80 | 00 | 80 | 00 | 00 | 80 | 00 | EF | 80 | 80 | 80 | 00 | 80 | 80 | 80 | 80 |
| B6 | 80 | 00 | 80 | 80 | 00 | 80 | 80 | 00 | D3 | 80 | 80 | 00 | 80 | 00 | 00 | 80 | 80 | F0 | 80 | 80 | 80 | 80 | 00 | 00 | 00 | 00 |
| B7 | 80 | 00 | 80 | 80 | 00 | 80 | 80 | 80 | D4 | 80 | 80 | 00 | 80 | 00 | 80 | 00 | 00 | F1 | 80 | 80 | 80 | 80 | 00 | 00 | 00 | 80 |
| B8 | 80 | 00 | 80 | 80 | 80 | 00 | 00 | 00 | D5 | 80 | 80 | 00 | 80 | 00 | 80 | 00 | 80 | F2 | 80 | 80 | 80 | 80 | 00 | 00 | 80 | 00 |
| B9 | 80 | 00 | 80 | 80 | 80 | 00 | 00 | 80 | D6 | 80 | 80 | 00 | 80 | 00 | 80 | 80 | 00 | F3 | 80 | 80 | 80 | 80 | 00 | 00 | 80 | 80 |
| BA | 80 | 00 | 80 | 80 | 80 | 00 | 80 | 00 | D7 | 80 | 80 | 00 | 80 | 00 | 80 | 80 | 80 | F4 | 80 | 80 | 80 | 80 | 00 | 80 | 00 | 00 |
| BB | 80 | 00 | 80 | 80 | 80 | 00 | 80 | 80 | D8 | 80 | 80 | 00 | 80 | 80 | 00 | 00 | 00 | F5 | 80 | 80 | 80 | 80 | 00 | 80 | 00 | 80 |
| BC | 80 | 00 | 80 | 80 | 80 | 80 | 00 | 00 | D9 | 80 | 80 | 00 | 80 | 80 | 00 | 00 | 80 | F6 | 80 | 80 | 80 | 80 | 00 | 80 | 80 | 00 |
| BD | 80 | 00 | 80 | 80 | 80 | 80 | 00 | 80 | DA | 80 | 80 | 00 | 80 | 80 | 00 | 80 | 00 | F7 | 80 | 80 | 80 | 80 | 00 | 80 | 80 | 80 |
| BE | 80 | 00 | 80 | 80 | 80 | 80 | 80 | 00 | DB | 80 | 80 | 00 | 80 | 80 | 00 | 80 | 80 | F8 | 80 | 80 | 80 | 80 | 80 | 00 | 00 | 00 |
| BF | 80 | 00 | 80 | 80 | 80 | 80 | 80 | 80 | DC | 80 | 80 | 00 | 80 | 80 | 80 | 00 | 00 | F9 | 80 | 80 | 80 | 80 | 80 | 00 | 00 | 80 |
| C0 | 80 | 80 | 00 | 00 | 00 | 00 | 00 | 00 | DD | 80 | 80 | 00 | 80 | 80 | 80 | 00 | 80 | FA | 80 | 80 | 80 | 80 | 80 | 00 | 80 | 00 |

APPENDIX-continued 1-bit Mode - Destination Column 0

| Src | Destination Row | | | | | | | | Src | Destination Row | | | | | | | | Src | Destination Row | | | | | | | |
|---|---|---|---|---|---|---|---|---|---|---|---|---|---|---|---|---|---|---|---|---|---|---|---|---|---|---|
| Byte | 0 | 1 | 2 | 3 | 4 | 5 | 6 | 7 | Byte | 0 | 1 | 2 | 3 | 4 | 5 | 6 | 7 | Byte | 0 | 1 | 2 | 3 | 4 | 5 | 6 | 7 |
| C1 | 80 | 80 | 00 | 00 | 00 | 00 | 00 | 80 | DE | 80 | 80 | 00 | 80 | 80 | 80 | 80 | 00 | FB | 80 | 80 | 80 | 80 | 80 | 00 | 80 | 80 |
| C2 | 80 | 80 | 00 | 00 | 00 | 00 | 80 | 00 | DF | 80 | 80 | 00 | 80 | 80 | 80 | 80 | 80 | FC | 80 | 80 | 80 | 80 | 80 | 80 | 00 | 00 |
| C3 | 80 | 80 | 00 | 00 | 00 | 00 | 80 | 80 | E0 | 80 | 80 | 80 | 00 | 00 | 00 | 00 | 00 | FD | 80 | 80 | 80 | 80 | 80 | 80 | 00 | 80 |
| C4 | 80 | 80 | 00 | 00 | 00 | 80 | 00 | 00 | E1 | 80 | 80 | 80 | 00 | 00 | 00 | 00 | 80 | FE | 80 | 80 | 80 | 80 | 80 | 80 | 80 | 00 |
| C5 | 80 | 80 | 00 | 00 | 00 | 80 | 00 | 80 | E2 | 80 | 80 | 80 | 00 | 00 | 00 | 80 | 00 | FF | 80 | 80 | 80 | 80 | 80 | 80 | 80 | 80 |
| C6 | 80 | 80 | 00 | 00 | 00 | 80 | 80 | 00 | E3 | 80 | 80 | 80 | 00 | 00 | 00 | 80 | 80 | | | | | | | | | |
| C7 | 80 | 80 | 00 | 00 | 00 | 80 | 80 | 80 | E4 | 80 | 80 | 80 | 00 | 00 | 80 | 00 | 00 | | | | | | | | | |
| C8 | 80 | 80 | 00 | 00 | 80 | 00 | 00 | 00 | E5 | 80 | 80 | 80 | 00 | 00 | 80 | 00 | 80 | | | | | | | | | |
| C9 | 80 | 80 | 00 | 00 | 80 | 00 | 00 | 80 | E6 | 80 | 80 | 80 | 00 | 00 | 80 | 80 | 00 | | | | | | | | | |

1-bit Mode - Destination Column 1

| Src | Destination Row | | | | | | | | Src | Destination Row | | | | | | | | Src | Destination Row | | | | | | | |
|---|---|---|---|---|---|---|---|---|---|---|---|---|---|---|---|---|---|---|---|---|---|---|---|---|---|---|
| Byte | 0 | 1 | 2 | 3 | 4 | 5 | 6 | 7 | Byte | 0 | 1 | 2 | 3 | 4 | 5 | 6 | 7 | Byte | 0 | 1 | 2 | 3 | 4 | 5 | 6 | 7 |
| 00 | 00 | 00 | 00 | 00 | 00 | 00 | 00 | 00 | 1D | 00 | 00 | 00 | 40 | 40 | 40 | 00 | 40 | 3A | 00 | 00 | 40 | 40 | 40 | 00 | 40 | 00 |
| 01 | 00 | 00 | 00 | 00 | 00 | 00 | 00 | 40 | 1E | 00 | 00 | 00 | 40 | 40 | 40 | 40 | 00 | 3B | 00 | 00 | 40 | 40 | 40 | 00 | 40 | 40 |
| 02 | 00 | 00 | 00 | 00 | 00 | 00 | 40 | 00 | 1F | 00 | 00 | 00 | 40 | 40 | 40 | 40 | 40 | 3C | 00 | 00 | 40 | 40 | 40 | 40 | 00 | 00 |
| 03 | 00 | 00 | 00 | 00 | 00 | 00 | 40 | 40 | 20 | 00 | 00 | 40 | 00 | 00 | 00 | 00 | 00 | 3D | 00 | 00 | 40 | 40 | 40 | 40 | 00 | 40 |
| 04 | 00 | 00 | 00 | 00 | 00 | 40 | 00 | 00 | 21 | 00 | 00 | 40 | 00 | 00 | 00 | 00 | 04 | 3E | 00 | 00 | 40 | 40 | 40 | 40 | 40 | 00 |
| 05 | 00 | 00 | 00 | 00 | 00 | 40 | 00 | 40 | 22 | 00 | 00 | 40 | 00 | 00 | 00 | 40 | 00 | 3F | 00 | 00 | 40 | 40 | 40 | 40 | 40 | 40 |
| 06 | 00 | 00 | 00 | 00 | 00 | 40 | 40 | 00 | 23 | 00 | 00 | 40 | 00 | 00 | 00 | 40 | 40 | 40 | 00 | 40 | 00 | 00 | 00 | 00 | 00 | 00 |
| 07 | 00 | 00 | 00 | 00 | 00 | 40 | 40 | 40 | 24 | 00 | 00 | 40 | 00 | 00 | 40 | 00 | 00 | 41 | 00 | 40 | 00 | 00 | 00 | 00 | 00 | 40 |
| 08 | 00 | 00 | 00 | 00 | 40 | 00 | 00 | 00 | 25 | 00 | 00 | 40 | 00 | 00 | 40 | 00 | 40 | 42 | 00 | 40 | 00 | 00 | 00 | 00 | 40 | 00 |
| 09 | 00 | 00 | 00 | 00 | 40 | 00 | 00 | 40 | 26 | 00 | 00 | 40 | 00 | 00 | 40 | 40 | 00 | 43 | 00 | 40 | 00 | 00 | 00 | 00 | 40 | 40 |
| 0A | 00 | 00 | 00 | 00 | 40 | 00 | 40 | 00 | 27 | 00 | 00 | 40 | 00 | 00 | 40 | 40 | 40 | 44 | 00 | 40 | 00 | 00 | 00 | 40 | 00 | 00 |
| 0B | 00 | 00 | 00 | 00 | 40 | 00 | 40 | 40 | 28 | 00 | 00 | 40 | 00 | 40 | 00 | 00 | 00 | 45 | 00 | 40 | 00 | 00 | 00 | 40 | 00 | 40 |
| 0C | 00 | 00 | 00 | 00 | 40 | 40 | 00 | 00 | 29 | 00 | 00 | 40 | 00 | 40 | 00 | 00 | 40 | 46 | 00 | 40 | 00 | 00 | 00 | 40 | 40 | 00 |
| 0D | 00 | 00 | 00 | 00 | 40 | 40 | 00 | 40 | 2A | 00 | 00 | 40 | 00 | 40 | 00 | 40 | 00 | 47 | 00 | 40 | 00 | 00 | 00 | 40 | 40 | 40 |
| 0E | 00 | 00 | 00 | 00 | 40 | 40 | 40 | 00 | 2B | 00 | 00 | 40 | 00 | 40 | 00 | 40 | 40 | 48 | 00 | 40 | 00 | 00 | 40 | 00 | 00 | 00 |
| 0F | 00 | 00 | 00 | 00 | 40 | 40 | 40 | 40 | 2C | 00 | 00 | 40 | 00 | 40 | 40 | 00 | 00 | 49 | 00 | 40 | 00 | 00 | 40 | 00 | 00 | 40 |
| 10 | 00 | 00 | 00 | 40 | 00 | 00 | 00 | 00 | 2D | 00 | 00 | 40 | 00 | 40 | 40 | 00 | 40 | 4A | 00 | 40 | 00 | 00 | 40 | 00 | 40 | 00 |
| 11 | 00 | 00 | 00 | 40 | 00 | 00 | 00 | 40 | 2E | 00 | 00 | 40 | 00 | 40 | 40 | 40 | 00 | 4B | 00 | 40 | 00 | 00 | 40 | 00 | 40 | 40 |
| 12 | 00 | 00 | 00 | 40 | 00 | 00 | 40 | 00 | 2F | 00 | 00 | 40 | 00 | 40 | 40 | 40 | 40 | 4C | 00 | 40 | 00 | 00 | 40 | 40 | 00 | 00 |
| 13 | 00 | 00 | 00 | 40 | 00 | 00 | 40 | 40 | 30 | 00 | 00 | 40 | 40 | 00 | 00 | 00 | 00 | 4D | 00 | 40 | 00 | 00 | 40 | 40 | 00 | 40 |
| 14 | 00 | 00 | 00 | 40 | 00 | 40 | 00 | 00 | 31 | 00 | 00 | 40 | 40 | 00 | 00 | 00 | 40 | 4E | 00 | 40 | 00 | 00 | 40 | 40 | 40 | 00 |
| 15 | 00 | 00 | 00 | 40 | 00 | 40 | 00 | 40 | 32 | 00 | 00 | 40 | 40 | 00 | 00 | 40 | 00 | 4F | 00 | 40 | 00 | 00 | 40 | 40 | 40 | 40 |
| 16 | 00 | 00 | 00 | 40 | 00 | 40 | 40 | 00 | 33 | 00 | 00 | 40 | 40 | 00 | 00 | 40 | 40 | 50 | 00 | 40 | 00 | 40 | 00 | 00 | 00 | 00 |
| 17 | 00 | 00 | 00 | 40 | 00 | 40 | 40 | 40 | 34 | 00 | 00 | 40 | 40 | 00 | 40 | 00 | 00 | 51 | 00 | 40 | 00 | 40 | 00 | 00 | 00 | 40 |
| 18 | 00 | 00 | 00 | 40 | 40 | 00 | 00 | 00 | 35 | 00 | 00 | 40 | 40 | 00 | 40 | 00 | 40 | 52 | 00 | 40 | 00 | 40 | 00 | 00 | 40 | 00 |
| 19 | 00 | 00 | 00 | 40 | 40 | 00 | 00 | 40 | 36 | 00 | 00 | 40 | 40 | 00 | 40 | 40 | 00 | 53 | 00 | 40 | 00 | 40 | 00 | 00 | 40 | 40 |
| 1A | 00 | 00 | 00 | 40 | 40 | 00 | 40 | 00 | 37 | 00 | 00 | 40 | 40 | 00 | 40 | 40 | 40 | 54 | 00 | 40 | 00 | 40 | 00 | 40 | 00 | 00 |
| 1B | 00 | 00 | 00 | 40 | 40 | 00 | 40 | 40 | 38 | 00 | 00 | 40 | 40 | 40 | 00 | 00 | 00 | 55 | 00 | 40 | 00 | 40 | 00 | 40 | 00 | 40 |
| 1C | 00 | 00 | 00 | 40 | 40 | 40 | 00 | 00 | 39 | 00 | 00 | 40 | 40 | 40 | 00 | 00 | 40 | 56 | 00 | 40 | 00 | 40 | 00 | 40 | 40 | 00 |
| 57 | 00 | 40 | 00 | 40 | 00 | 40 | 40 | 40 | 74 | 00 | 40 | 40 | 40 | 00 | 40 | 00 | 00 | 91 | 40 | 00 | 00 | 40 | 00 | 00 | 00 | 40 |
| 58 | 00 | 40 | 00 | 40 | 40 | 00 | 00 | 00 | 75 | 00 | 40 | 40 | 40 | 00 | 40 | 00 | 40 | 92 | 40 | 00 | 00 | 40 | 00 | 00 | 40 | 00 |
| 59 | 00 | 40 | 00 | 40 | 40 | 00 | 00 | 40 | 76 | 00 | 40 | 40 | 40 | 00 | 40 | 40 | 00 | 93 | 40 | 00 | 00 | 40 | 00 | 00 | 40 | 40 |
| 5A | 00 | 40 | 00 | 40 | 40 | 00 | 40 | 00 | 77 | 00 | 40 | 40 | 40 | 00 | 40 | 40 | 40 | 94 | 40 | 00 | 00 | 40 | 00 | 40 | 00 | 00 |
| 5B | 00 | 40 | 00 | 40 | 40 | 00 | 40 | 40 | 78 | 00 | 40 | 40 | 40 | 40 | 00 | 00 | 00 | 95 | 40 | 00 | 00 | 40 | 00 | 40 | 00 | 40 |
| 5C | 00 | 40 | 00 | 40 | 40 | 40 | 00 | 00 | 79 | 00 | 40 | 40 | 40 | 40 | 00 | 00 | 40 | 96 | 40 | 00 | 00 | 40 | 00 | 40 | 40 | 00 |
| 5D | 00 | 40 | 00 | 40 | 40 | 40 | 00 | 40 | 7A | 00 | 40 | 40 | 40 | 40 | 00 | 40 | 00 | 97 | 40 | 00 | 00 | 40 | 00 | 40 | 40 | 40 |
| 5E | 00 | 40 | 00 | 40 | 40 | 40 | 40 | 00 | 7B | 00 | 40 | 40 | 40 | 40 | 00 | 40 | 40 | 98 | 40 | 00 | 00 | 40 | 40 | 00 | 00 | 00 |
| 5F | 00 | 40 | 00 | 40 | 40 | 40 | 40 | 40 | 7C | 00 | 40 | 40 | 40 | 40 | 40 | 00 | 00 | 99 | 40 | 00 | 00 | 40 | 40 | 00 | 00 | 40 |
| 60 | 00 | 40 | 40 | 00 | 00 | 00 | 00 | 00 | 7D | 00 | 40 | 40 | 40 | 40 | 40 | 00 | 40 | 9A | 40 | 00 | 00 | 40 | 40 | 00 | 40 | 00 |
| 61 | 00 | 40 | 40 | 00 | 00 | 00 | 00 | 40 | 7E | 00 | 40 | 40 | 40 | 40 | 40 | 40 | 00 | 9B | 40 | 00 | 00 | 40 | 40 | 00 | 40 | 40 |
| 62 | 00 | 40 | 40 | 00 | 00 | 00 | 40 | 00 | 7F | 00 | 40 | 40 | 40 | 40 | 40 | 40 | 40 | 9C | 40 | 00 | 00 | 40 | 40 | 40 | 00 | 00 |
| 63 | 00 | 40 | 40 | 00 | 00 | 00 | 40 | 40 | 80 | 40 | 00 | 00 | 00 | 00 | 00 | 00 | 00 | 9D | 40 | 00 | 00 | 40 | 40 | 40 | 00 | 40 |
| 64 | 00 | 40 | 40 | 00 | 00 | 40 | 00 | 00 | 81 | 40 | 00 | 00 | 00 | 00 | 00 | 00 | 40 | 9E | 40 | 00 | 00 | 40 | 40 | 40 | 40 | 00 |
| 65 | 00 | 40 | 40 | 00 | 00 | 40 | 00 | 40 | 82 | 40 | 00 | 00 | 00 | 00 | 00 | 40 | 00 | 9F | 40 | 00 | 00 | 40 | 40 | 40 | 40 | 40 |
| 66 | 00 | 40 | 40 | 00 | 00 | 40 | 40 | 00 | 83 | 40 | 00 | 00 | 00 | 00 | 00 | 40 | 40 | A0 | 40 | 00 | 40 | 00 | 00 | 00 | 00 | 00 |
| 67 | 00 | 40 | 40 | 00 | 00 | 40 | 40 | 40 | 84 | 40 | 00 | 00 | 00 | 00 | 40 | 00 | 00 | A1 | 40 | 00 | 40 | 00 | 00 | 00 | 00 | 40 |
| 68 | 00 | 40 | 40 | 00 | 40 | 00 | 00 | 00 | 85 | 40 | 00 | 00 | 00 | 00 | 40 | 00 | 40 | A2 | 40 | 00 | 40 | 00 | 00 | 00 | 40 | 00 |
| 69 | 00 | 40 | 40 | 00 | 40 | 00 | 00 | 40 | 86 | 40 | 00 | 00 | 00 | 00 | 40 | 40 | 00 | A3 | 40 | 00 | 40 | 00 | 00 | 00 | 40 | 40 |
| 6A | 00 | 40 | 40 | 00 | 40 | 00 | 40 | 00 | 87 | 40 | 00 | 00 | 00 | 00 | 40 | 40 | 40 | A4 | 40 | 00 | 40 | 00 | 00 | 40 | 00 | 00 |
| 6B | 00 | 40 | 40 | 00 | 40 | 00 | 40 | 40 | 88 | 40 | 00 | 00 | 00 | 40 | 00 | 00 | 00 | A5 | 40 | 00 | 40 | 00 | 00 | 40 | 00 | 40 |
| 6C | 00 | 40 | 40 | 00 | 40 | 40 | 00 | 00 | 89 | 40 | 00 | 00 | 00 | 40 | 00 | 00 | 40 | A6 | 40 | 00 | 40 | 00 | 00 | 40 | 40 | 00 |
| 6D | 00 | 40 | 40 | 00 | 40 | 40 | 00 | 40 | 8A | 40 | 00 | 00 | 00 | 40 | 00 | 40 | 00 | A7 | 40 | 00 | 40 | 00 | 00 | 40 | 40 | 40 |
| 6E | 00 | 40 | 40 | 00 | 40 | 40 | 40 | 00 | 8B | 40 | 00 | 00 | 00 | 40 | 00 | 40 | 40 | A8 | 40 | 00 | 40 | 00 | 40 | 00 | 00 | 00 |
| 6F | 00 | 40 | 40 | 00 | 40 | 40 | 40 | 40 | 8C | 40 | 00 | 00 | 00 | 40 | 40 | 00 | 00 | A9 | 40 | 00 | 40 | 00 | 40 | 00 | 00 | 40 |
| 70 | 00 | 40 | 40 | 40 | 00 | 00 | 00 | 00 | 8D | 40 | 00 | 00 | 00 | 40 | 40 | 00 | 40 | AA | 40 | 00 | 40 | 00 | 40 | 00 | 40 | 00 |
| 71 | 00 | 40 | 40 | 40 | 00 | 00 | 00 | 40 | 8E | 40 | 00 | 00 | 00 | 40 | 40 | 40 | 00 | AB | 40 | 00 | 40 | 00 | 40 | 00 | 40 | 40 |
| 72 | 00 | 40 | 40 | 40 | 00 | 00 | 40 | 00 | 8F | 40 | 00 | 00 | 00 | 40 | 40 | 40 | 40 | AC | 40 | 00 | 40 | 00 | 40 | 40 | 00 | 00 |
| 73 | 00 | 40 | 40 | 40 | 00 | 00 | 40 | 40 | 90 | 40 | 00 | 00 | 40 | 00 | 00 | 00 | 00 | AD | 40 | 00 | 40 | 00 | 40 | 40 | 00 | 40 |
| AE | 40 | 00 | 40 | 00 | 40 | 40 | 40 | 00 | CB | 40 | 40 | 00 | 00 | 40 | 00 | 40 | 40 | E8 | 40 | 40 | 40 | 00 | 40 | 00 | 00 | 00 |
| AF | 40 | 00 | 40 | 00 | 40 | 40 | 40 | 40 | CC | 40 | 40 | 00 | 00 | 40 | 40 | 00 | 00 | E9 | 40 | 40 | 40 | 00 | 40 | 00 | 00 | 40 |
| B0 | 40 | 00 | 40 | 40 | 00 | 00 | 00 | 00 | CD | 40 | 40 | 00 | 00 | 40 | 40 | 00 | 40 | EA | 40 | 40 | 40 | 00 | 40 | 00 | 40 | 00 |

-continued 1-bit Mode - Destination Column 1

| Src Byte | Destination Row 0 | 1 | 2 | 3 | 4 | 5 | 6 | 7 | Src Byte | Destination Row 0 | 1 | 2 | 3 | 4 | 5 | 6 | 7 | Src Byte | Destination Row 0 | 1 | 2 | 3 | 4 | 5 | 6 | 7 |
|---|---|---|---|---|---|---|---|---|---|---|---|---|---|---|---|---|---|---|---|---|---|---|---|---|---|---|
| B1 | 40 | 00 | 40 | 40 | 00 | 00 | 00 | 40 | CE | 40 | 40 | 00 | 00 | 40 | 40 | 40 | 00 | EB | 40 | 40 | 40 | 00 | 40 | 00 | 40 | 40 |
| B2 | 40 | 00 | 40 | 40 | 00 | 00 | 40 | 00 | CF | 40 | 40 | 00 | 00 | 40 | 40 | 40 | 40 | EC | 40 | 40 | 40 | 00 | 40 | 40 | 00 | 00 |
| B3 | 40 | 00 | 40 | 40 | 00 | 00 | 40 | 40 | D0 | 40 | 40 | 00 | 40 | 00 | 00 | 00 | 00 | ED | 40 | 40 | 40 | 00 | 40 | 40 | 00 | 40 |
| B4 | 40 | 00 | 40 | 40 | 00 | 40 | 00 | 00 | D1 | 40 | 40 | 00 | 40 | 00 | 00 | 00 | 40 | EE | 40 | 40 | 40 | 00 | 40 | 40 | 40 | 00 |
| B5 | 40 | 00 | 40 | 40 | 00 | 40 | 00 | 40 | D2 | 40 | 40 | 00 | 40 | 00 | 00 | 40 | 00 | EF | 40 | 40 | 40 | 00 | 40 | 40 | 40 | 40 |
| B6 | 40 | 00 | 40 | 40 | 00 | 40 | 40 | 00 | D3 | 40 | 40 | 00 | 40 | 00 | 00 | 40 | 40 | F0 | 40 | 40 | 40 | 40 | 00 | 00 | 00 | 00 |
| B7 | 40 | 00 | 40 | 40 | 00 | 40 | 40 | 40 | D4 | 40 | 40 | 00 | 40 | 00 | 40 | 00 | 00 | F1 | 40 | 40 | 40 | 40 | 00 | 00 | 00 | 40 |
| B8 | 40 | 00 | 40 | 40 | 40 | 00 | 00 | 00 | D5 | 40 | 40 | 00 | 40 | 00 | 40 | 00 | 40 | F2 | 40 | 40 | 40 | 40 | 00 | 00 | 40 | 00 |
| B9 | 40 | 00 | 40 | 40 | 40 | 00 | 00 | 40 | D6 | 40 | 40 | 00 | 40 | 00 | 40 | 40 | 00 | F3 | 40 | 40 | 40 | 40 | 00 | 00 | 40 | 40 |
| BA | 40 | 00 | 40 | 40 | 40 | 00 | 40 | 00 | D7 | 40 | 40 | 00 | 40 | 00 | 40 | 40 | 40 | F4 | 40 | 40 | 40 | 40 | 00 | 40 | 00 | 00 |
| BB | 40 | 00 | 40 | 40 | 40 | 00 | 40 | 40 | D8 | 40 | 40 | 00 | 40 | 40 | 00 | 00 | 00 | F5 | 40 | 40 | 40 | 40 | 00 | 40 | 00 | 40 |
| BC | 40 | 00 | 40 | 40 | 40 | 40 | 00 | 00 | D9 | 40 | 40 | 00 | 40 | 40 | 00 | 00 | 40 | F6 | 40 | 40 | 40 | 40 | 00 | 40 | 40 | 00 |
| BD | 40 | 00 | 40 | 40 | 40 | 40 | 00 | 40 | DA | 40 | 40 | 00 | 40 | 40 | 00 | 40 | 00 | F7 | 40 | 40 | 40 | 40 | 00 | 40 | 40 | 40 |
| BE | 40 | 00 | 40 | 40 | 40 | 40 | 40 | 00 | DB | 40 | 40 | 00 | 40 | 40 | 00 | 40 | 40 | F8 | 40 | 40 | 40 | 40 | 40 | 00 | 00 | 00 |
| BF | 40 | 00 | 40 | 40 | 40 | 40 | 40 | 40 | DC | 40 | 40 | 00 | 40 | 40 | 40 | 00 | 00 | F9 | 40 | 40 | 40 | 40 | 40 | 00 | 00 | 40 |
| C0 | 40 | 40 | 00 | 00 | 00 | 00 | 00 | 00 | DD | 40 | 40 | 00 | 40 | 40 | 40 | 00 | 40 | FA | 40 | 40 | 40 | 40 | 40 | 00 | 40 | 00 |
| C1 | 40 | 40 | 00 | 00 | 00 | 00 | 00 | 40 | DE | 40 | 40 | 00 | 40 | 40 | 40 | 40 | 00 | FB | 40 | 40 | 40 | 40 | 40 | 00 | 40 | 40 |
| C2 | 40 | 40 | 00 | 00 | 00 | 00 | 40 | 00 | DF | 40 | 40 | 00 | 40 | 40 | 40 | 40 | 40 | FC | 40 | 40 | 40 | 40 | 40 | 40 | 00 | 00 |
| C3 | 40 | 40 | 00 | 00 | 00 | 00 | 40 | 40 | E0 | 40 | 40 | 40 | 00 | 00 | 00 | 00 | 00 | FD | 40 | 40 | 40 | 40 | 40 | 40 | 00 | 40 |
| C4 | 40 | 40 | 00 | 00 | 00 | 40 | 00 | 00 | E1 | 40 | 40 | 40 | 00 | 00 | 00 | 00 | 40 | FE | 40 | 40 | 40 | 40 | 40 | 40 | 40 | 00 |
| C5 | 40 | 40 | 00 | 00 | 00 | 40 | 00 | 40 | E2 | 40 | 40 | 40 | 00 | 00 | 00 | 40 | 00 | FF | 40 | 40 | 40 | 40 | 40 | 40 | 40 | 40 |
| C6 | 40 | 40 | 00 | 00 | 00 | 40 | 40 | 00 | E3 | 40 | 40 | 40 | 00 | 00 | 00 | 40 | 40 | | | | | | | | | |
| C7 | 40 | 40 | 00 | 00 | 00 | 40 | 40 | 40 | E4 | 40 | 40 | 40 | 00 | 00 | 40 | 00 | 00 | | | | | | | | | |
| C8 | 40 | 40 | 00 | 00 | 40 | 00 | 00 | 00 | E5 | 40 | 40 | 40 | 00 | 00 | 40 | 00 | 40 | | | | | | | | | |
| C9 | 40 | 40 | 00 | 00 | 40 | 00 | 00 | 40 | E6 | 40 | 40 | 40 | 00 | 00 | 40 | 40 | 00 | | | | | | | | | |
| CA | 40 | 40 | 00 | 00 | 40 | 00 | 40 | 00 | E7 | 40 | 40 | 40 | 00 | 00 | 40 | 40 | 40 | | | | | | | | | |

1-bit Mode - Destination Column 2

| Src Byte | Destination Row 0 | 1 | 2 | 3 | 4 | 5 | 6 | 7 | Src Byte | Destination Row 0 | 1 | 2 | 3 | 4 | 5 | 6 | 7 | Src Byte | Destination Row 0 | 1 | 2 | 3 | 4 | 5 | 6 | 7 |
|---|---|---|---|---|---|---|---|---|---|---|---|---|---|---|---|---|---|---|---|---|---|---|---|---|---|---|
| 00 | 00 | 00 | 00 | 00 | 00 | 00 | 00 | 00 | 1D | 00 | 00 | 00 | 20 | 20 | 20 | 00 | 20 | 3A | 00 | 00 | 20 | 20 | 20 | 00 | 20 | 00 |
| 01 | 00 | 00 | 00 | 00 | 00 | 00 | 00 | 20 | 1E | 00 | 00 | 00 | 20 | 20 | 20 | 20 | 00 | 3B | 00 | 00 | 20 | 20 | 20 | 00 | 20 | 20 |
| 02 | 00 | 00 | 00 | 00 | 00 | 00 | 20 | 00 | 1F | 00 | 00 | 00 | 20 | 20 | 20 | 20 | 20 | 3C | 00 | 00 | 20 | 20 | 20 | 20 | 00 | 00 |
| 03 | 00 | 00 | 00 | 00 | 00 | 00 | 20 | 20 | 20 | 00 | 00 | 20 | 00 | 00 | 00 | 00 | 00 | 3D | 00 | 00 | 20 | 20 | 20 | 20 | 00 | 20 |
| 04 | 00 | 00 | 00 | 00 | 00 | 20 | 00 | 00 | 21 | 00 | 00 | 20 | 00 | 00 | 00 | 00 | 20 | 3E | 00 | 00 | 20 | 20 | 20 | 20 | 20 | 00 |
| 05 | 00 | 00 | 00 | 00 | 00 | 20 | 00 | 20 | 22 | 00 | 00 | 20 | 00 | 00 | 00 | 20 | 00 | 3F | 00 | 00 | 20 | 20 | 20 | 20 | 20 | 20 |
| 06 | 00 | 00 | 00 | 00 | 00 | 20 | 20 | 00 | 23 | 00 | 00 | 20 | 00 | 00 | 00 | 20 | 20 | 40 | 00 | 20 | 00 | 00 | 00 | 00 | 00 | 00 |
| 07 | 00 | 00 | 00 | 00 | 00 | 20 | 20 | 20 | 24 | 00 | 00 | 20 | 00 | 00 | 20 | 00 | 00 | 41 | 00 | 20 | 00 | 00 | 00 | 00 | 00 | 20 |
| 08 | 00 | 00 | 00 | 00 | 20 | 00 | 00 | 00 | 25 | 00 | 00 | 20 | 00 | 00 | 20 | 00 | 20 | 42 | 00 | 20 | 00 | 00 | 00 | 00 | 20 | 00 |
| 09 | 00 | 00 | 00 | 00 | 20 | 00 | 00 | 20 | 26 | 00 | 00 | 20 | 00 | 00 | 20 | 20 | 00 | 43 | 00 | 20 | 00 | 00 | 00 | 00 | 20 | 20 |
| 0A | 00 | 00 | 00 | 00 | 20 | 00 | 20 | 00 | 27 | 00 | 00 | 20 | 00 | 00 | 20 | 20 | 20 | 44 | 00 | 20 | 00 | 00 | 00 | 20 | 00 | 00 |
| 0B | 00 | 00 | 00 | 00 | 20 | 00 | 20 | 20 | 28 | 00 | 00 | 20 | 00 | 20 | 00 | 00 | 00 | 45 | 00 | 20 | 00 | 00 | 00 | 20 | 00 | 20 |
| 0C | 00 | 00 | 00 | 00 | 20 | 20 | 00 | 00 | 29 | 00 | 00 | 20 | 00 | 20 | 00 | 00 | 20 | 46 | 00 | 20 | 00 | 00 | 00 | 20 | 20 | 00 |
| 0D | 00 | 00 | 00 | 00 | 20 | 20 | 00 | 20 | 2A | 00 | 00 | 20 | 00 | 20 | 00 | 20 | 00 | 47 | 00 | 20 | 00 | 00 | 00 | 20 | 20 | 20 |
| 0E | 00 | 00 | 00 | 00 | 20 | 20 | 20 | 00 | 2B | 00 | 00 | 20 | 00 | 20 | 00 | 20 | 20 | 48 | 00 | 20 | 00 | 00 | 20 | 00 | 00 | 00 |
| 0F | 00 | 00 | 00 | 00 | 20 | 20 | 20 | 20 | 2C | 00 | 00 | 20 | 00 | 20 | 20 | 00 | 00 | 49 | 00 | 20 | 00 | 00 | 20 | 00 | 00 | 20 |
| 10 | 00 | 00 | 00 | 20 | 00 | 00 | 00 | 00 | 2D | 00 | 00 | 20 | 00 | 20 | 20 | 00 | 20 | 4A | 00 | 20 | 00 | 00 | 20 | 00 | 20 | 00 |
| 11 | 00 | 00 | 00 | 20 | 00 | 00 | 00 | 20 | 2E | 00 | 00 | 20 | 00 | 20 | 20 | 20 | 00 | 4B | 00 | 20 | 00 | 00 | 20 | 00 | 20 | 20 |
| 12 | 00 | 00 | 00 | 20 | 00 | 00 | 20 | 00 | 2F | 00 | 00 | 20 | 00 | 20 | 20 | 20 | 20 | 4C | 00 | 20 | 00 | 00 | 20 | 20 | 00 | 00 |
| 13 | 00 | 00 | 00 | 20 | 00 | 00 | 20 | 20 | 30 | 00 | 00 | 20 | 20 | 00 | 00 | 00 | 00 | 4D | 00 | 20 | 00 | 00 | 20 | 20 | 00 | 20 |
| 14 | 00 | 00 | 00 | 20 | 00 | 20 | 00 | 00 | 31 | 00 | 00 | 20 | 20 | 00 | 00 | 00 | 20 | 4E | 00 | 20 | 00 | 00 | 20 | 20 | 20 | 00 |
| 15 | 00 | 00 | 00 | 20 | 00 | 20 | 00 | 20 | 32 | 00 | 00 | 20 | 20 | 00 | 00 | 20 | 00 | 4F | 00 | 20 | 00 | 00 | 20 | 20 | 20 | 20 |
| 16 | 00 | 00 | 00 | 20 | 00 | 20 | 20 | 00 | 33 | 00 | 00 | 20 | 20 | 00 | 00 | 20 | 20 | 50 | 00 | 20 | 00 | 20 | 00 | 00 | 00 | 00 |
| 17 | 00 | 00 | 00 | 20 | 00 | 20 | 20 | 20 | 34 | 00 | 00 | 20 | 20 | 00 | 20 | 00 | 00 | 51 | 00 | 20 | 00 | 20 | 00 | 00 | 00 | 20 |
| 18 | 00 | 00 | 00 | 20 | 20 | 00 | 00 | 00 | 35 | 00 | 00 | 20 | 20 | 00 | 20 | 00 | 20 | 52 | 00 | 20 | 00 | 20 | 00 | 00 | 20 | 00 |
| 19 | 00 | 00 | 00 | 20 | 20 | 00 | 00 | 20 | 36 | 00 | 00 | 20 | 20 | 00 | 20 | 20 | 00 | 53 | 00 | 20 | 00 | 20 | 00 | 00 | 20 | 20 |
| 1A | 00 | 00 | 00 | 20 | 20 | 00 | 20 | 00 | 37 | 00 | 00 | 20 | 20 | 00 | 20 | 20 | 20 | 54 | 00 | 20 | 00 | 20 | 00 | 20 | 00 | 00 |
| 1B | 00 | 00 | 00 | 20 | 20 | 00 | 20 | 20 | 38 | 00 | 00 | 20 | 20 | 20 | 00 | 00 | 00 | 55 | 00 | 20 | 00 | 20 | 00 | 20 | 00 | 20 |
| 1C | 00 | 00 | 00 | 20 | 20 | 20 | 00 | 00 | 39 | 00 | 00 | 20 | 20 | 20 | 00 | 00 | 20 | 56 | 00 | 20 | 00 | 20 | 00 | 20 | 20 | 00 |
| 57 | 00 | 20 | 00 | 20 | 00 | 20 | 20 | 20 | 74 | 00 | 20 | 20 | 20 | 00 | 20 | 00 | 00 | 91 | 20 | 00 | 00 | 20 | 00 | 00 | 00 | 20 |
| 58 | 00 | 20 | 00 | 20 | 20 | 00 | 00 | 00 | 75 | 00 | 20 | 20 | 20 | 00 | 20 | 00 | 20 | 92 | 20 | 00 | 00 | 20 | 00 | 00 | 20 | 00 |
| 59 | 00 | 20 | 00 | 20 | 20 | 00 | 00 | 20 | 76 | 00 | 20 | 20 | 20 | 00 | 20 | 20 | 00 | 93 | 20 | 00 | 00 | 20 | 00 | 00 | 20 | 20 |
| 5A | 00 | 20 | 00 | 20 | 20 | 00 | 20 | 00 | 77 | 00 | 20 | 20 | 20 | 00 | 20 | 20 | 20 | 94 | 20 | 00 | 00 | 20 | 00 | 20 | 00 | 00 |
| 5B | 00 | 20 | 00 | 20 | 20 | 00 | 20 | 20 | 78 | 00 | 20 | 20 | 20 | 20 | 00 | 00 | 00 | 95 | 20 | 00 | 00 | 20 | 00 | 20 | 00 | 20 |
| 5C | 00 | 20 | 00 | 20 | 20 | 20 | 00 | 00 | 79 | 00 | 20 | 20 | 20 | 20 | 00 | 00 | 20 | 96 | 20 | 00 | 00 | 20 | 00 | 20 | 20 | 00 |
| 5D | 00 | 20 | 00 | 20 | 20 | 20 | 00 | 20 | 7A | 00 | 20 | 20 | 20 | 20 | 00 | 20 | 00 | 97 | 20 | 00 | 00 | 20 | 00 | 20 | 20 | 20 |
| 5E | 00 | 20 | 00 | 20 | 20 | 20 | 20 | 00 | 7B | 00 | 20 | 20 | 20 | 20 | 00 | 20 | 20 | 98 | 20 | 00 | 00 | 20 | 20 | 00 | 00 | 00 |
| 5F | 00 | 20 | 00 | 20 | 20 | 20 | 20 | 20 | 7C | 00 | 20 | 20 | 20 | 20 | 20 | 00 | 00 | 99 | 20 | 00 | 00 | 20 | 20 | 00 | 00 | 20 |
| 60 | 00 | 20 | 20 | 00 | 00 | 00 | 00 | 00 | 7D | 00 | 20 | 20 | 20 | 20 | 20 | 00 | 20 | 9A | 20 | 00 | 00 | 20 | 20 | 00 | 20 | 00 |
| 61 | 00 | 20 | 20 | 00 | 00 | 00 | 00 | 20 | 7E | 00 | 20 | 20 | 20 | 20 | 20 | 20 | 00 | 9B | 20 | 00 | 00 | 20 | 20 | 00 | 20 | 20 |
| 62 | 00 | 20 | 20 | 00 | 00 | 00 | 20 | 00 | 7F | 00 | 20 | 20 | 20 | 20 | 20 | 20 | 20 | 9C | 20 | 00 | 00 | 20 | 20 | 20 | 00 | 00 |
| 63 | 00 | 20 | 20 | 00 | 00 | 00 | 20 | 20 | 80 | 20 | 00 | 00 | 00 | 00 | 00 | 00 | 00 | 9D | 20 | 00 | 00 | 20 | 20 | 20 | 00 | 20 |
| 64 | 00 | 20 | 20 | 00 | 00 | 20 | 00 | 00 | 81 | 20 | 00 | 00 | 00 | 00 | 00 | 00 | 20 | 9E | 20 | 00 | 00 | 20 | 20 | 20 | 20 | 00 |
| 65 | 00 | 20 | 20 | 00 | 00 | 20 | 00 | 20 | 82 | 20 | 00 | 00 | 00 | 00 | 00 | 20 | 00 | 9F | 20 | 00 | 00 | 20 | 20 | 20 | 20 | 20 |

-continued 1-bit Mode - Destination Column 2

| Src Byte | Destination Row 0 | 1 | 2 | 3 | 4 | 5 | 6 | 7 | Src Byte | Destination Row 0 | 1 | 2 | 3 | 4 | 5 | 6 | 7 | Src Byte | Destination Row 0 | 1 | 2 | 3 | 4 | 5 | 6 | 7 |
|---|---|---|---|---|---|---|---|---|---|---|---|---|---|---|---|---|---|---|---|---|---|---|---|---|---|---|
| 66 | 00 | 20 | 20 | 00 | 00 | 20 | 20 | 00 | 83 | 20 | 00 | 00 | 00 | 00 | 00 | 20 | 20 | A0 | 20 | 00 | 20 | 00 | 00 | 00 | 00 | 00 |
| 67 | 00 | 20 | 20 | 00 | 00 | 20 | 20 | 20 | 84 | 20 | 00 | 00 | 00 | 00 | 20 | 00 | 00 | A1 | 20 | 00 | 20 | 00 | 00 | 00 | 00 | 20 |
| 68 | 00 | 20 | 20 | 00 | 20 | 00 | 00 | 00 | 85 | 20 | 00 | 00 | 00 | 00 | 20 | 00 | 20 | A2 | 20 | 00 | 20 | 00 | 00 | 00 | 20 | 00 |
| 69 | 00 | 20 | 20 | 00 | 20 | 00 | 00 | 20 | 86 | 20 | 00 | 00 | 00 | 00 | 20 | 20 | 00 | A3 | 20 | 00 | 20 | 00 | 00 | 00 | 20 | 20 |
| 6A | 00 | 20 | 20 | 00 | 20 | 00 | 20 | 00 | 87 | 20 | 00 | 00 | 00 | 00 | 20 | 20 | 20 | A4 | 20 | 00 | 20 | 00 | 00 | 20 | 00 | 00 |
| 6B | 00 | 20 | 20 | 00 | 20 | 00 | 20 | 20 | 88 | 20 | 00 | 00 | 00 | 20 | 00 | 00 | 00 | A5 | 20 | 00 | 20 | 00 | 00 | 20 | 00 | 20 |
| 6C | 00 | 20 | 20 | 00 | 20 | 20 | 00 | 00 | 89 | 20 | 00 | 00 | 00 | 20 | 00 | 00 | 20 | A6 | 20 | 00 | 20 | 00 | 00 | 20 | 20 | 00 |
| 6D | 00 | 20 | 20 | 00 | 20 | 20 | 00 | 20 | 8A | 20 | 00 | 00 | 00 | 20 | 00 | 20 | 00 | A7 | 20 | 00 | 20 | 00 | 00 | 20 | 20 | 20 |
| 6E | 00 | 20 | 20 | 00 | 20 | 20 | 20 | 00 | 8B | 20 | 00 | 00 | 00 | 20 | 00 | 20 | 20 | A8 | 20 | 00 | 20 | 00 | 20 | 00 | 00 | 00 |
| 6F | 00 | 20 | 20 | 00 | 20 | 20 | 20 | 20 | 8C | 20 | 00 | 00 | 00 | 20 | 20 | 00 | 00 | A9 | 20 | 00 | 20 | 00 | 20 | 00 | 00 | 20 |
| 70 | 00 | 20 | 20 | 20 | 00 | 00 | 00 | 00 | 8D | 20 | 00 | 00 | 00 | 20 | 20 | 00 | 20 | AA | 20 | 00 | 20 | 00 | 20 | 00 | 20 | 00 |
| 71 | 00 | 20 | 20 | 20 | 00 | 00 | 00 | 20 | 8E | 20 | 00 | 00 | 00 | 20 | 20 | 20 | 00 | AB | 20 | 00 | 20 | 00 | 20 | 00 | 20 | 20 |
| 72 | 00 | 20 | 20 | 20 | 00 | 00 | 20 | 00 | 8F | 20 | 00 | 00 | 00 | 20 | 20 | 20 | 20 | AC | 20 | 00 | 20 | 00 | 20 | 20 | 00 | 00 |
| 73 | 00 | 20 | 20 | 20 | 00 | 00 | 20 | 20 | 90 | 20 | 00 | 00 | 20 | 00 | 00 | 00 | 00 | AD | 20 | 00 | 20 | 00 | 20 | 20 | 00 | 20 |
| AE | 20 | 00 | 20 | 00 | 20 | 20 | 20 | 00 | CB | 20 | 20 | 00 | 00 | 20 | 00 | 20 | 20 | E8 | 20 | 20 | 20 | 00 | 20 | 00 | 00 | 00 |
| AF | 20 | 00 | 20 | 00 | 20 | 20 | 20 | 20 | CC | 20 | 20 | 00 | 00 | 20 | 20 | 00 | 00 | E9 | 20 | 20 | 20 | 00 | 20 | 00 | 00 | 20 |
| B0 | 20 | 00 | 20 | 20 | 00 | 00 | 00 | 00 | CD | 20 | 20 | 00 | 00 | 20 | 20 | 00 | 20 | EA | 20 | 20 | 20 | 00 | 20 | 00 | 20 | 00 |
| B1 | 20 | 00 | 20 | 20 | 00 | 00 | 00 | 20 | CE | 20 | 20 | 00 | 00 | 20 | 20 | 20 | 00 | EB | 20 | 20 | 20 | 00 | 20 | 00 | 20 | 20 |
| B2 | 20 | 00 | 20 | 20 | 00 | 00 | 20 | 00 | CF | 20 | 20 | 00 | 00 | 20 | 20 | 20 | 20 | EC | 20 | 20 | 20 | 00 | 20 | 20 | 00 | 00 |
| B3 | 20 | 00 | 20 | 20 | 00 | 00 | 20 | 20 | D0 | 20 | 20 | 00 | 20 | 00 | 00 | 00 | 00 | ED | 20 | 20 | 20 | 00 | 20 | 20 | 00 | 20 |
| B4 | 20 | 00 | 20 | 20 | 00 | 20 | 00 | 00 | D1 | 20 | 20 | 00 | 20 | 00 | 00 | 00 | 20 | EE | 20 | 20 | 20 | 00 | 20 | 20 | 20 | 00 |
| B5 | 20 | 00 | 20 | 20 | 00 | 20 | 00 | 20 | D2 | 20 | 20 | 00 | 20 | 00 | 00 | 20 | 00 | EF | 20 | 20 | 20 | 00 | 20 | 20 | 20 | 20 |
| B6 | 20 | 00 | 20 | 20 | 00 | 20 | 20 | 00 | D3 | 20 | 20 | 00 | 20 | 00 | 00 | 20 | 20 | F0 | 20 | 20 | 20 | 20 | 00 | 00 | 00 | 00 |
| B7 | 20 | 00 | 20 | 20 | 00 | 20 | 20 | 20 | D4 | 20 | 20 | 00 | 20 | 00 | 20 | 00 | 00 | F1 | 20 | 20 | 20 | 20 | 00 | 00 | 00 | 20 |
| B8 | 20 | 00 | 20 | 20 | 20 | 00 | 00 | 00 | D5 | 20 | 20 | 00 | 20 | 00 | 20 | 00 | 20 | F2 | 20 | 20 | 20 | 20 | 00 | 00 | 20 | 00 |
| B9 | 20 | 00 | 20 | 20 | 20 | 00 | 00 | 20 | D6 | 20 | 20 | 00 | 20 | 00 | 20 | 20 | 00 | F4 | 20 | 20 | 20 | 20 | 00 | 20 | 00 | 00 |
| BB | 20 | 00 | 20 | 20 | 20 | 00 | 20 | 20 | D8 | 20 | 20 | 00 | 20 | 20 | 00 | 00 | 00 | F5 | 20 | 20 | 20 | 20 | 00 | 20 | 00 | 20 |
| BC | 20 | 00 | 20 | 20 | 20 | 20 | 00 | 00 | D9 | 20 | 20 | 00 | 20 | 20 | 00 | 00 | 20 | F6 | 20 | 20 | 20 | 20 | 00 | 20 | 20 | 00 |
| BD | 20 | 00 | 20 | 20 | 20 | 20 | 00 | 20 | DA | 20 | 20 | 00 | 20 | 20 | 00 | 20 | 00 | F7 | 20 | 20 | 20 | 20 | 00 | 20 | 20 | 20 |
| BE | 20 | 00 | 20 | 20 | 20 | 20 | 20 | 00 | DB | 20 | 20 | 00 | 20 | 20 | 00 | 20 | 20 | F8 | 20 | 20 | 20 | 20 | 20 | 00 | 00 | 00 |
| BF | 20 | 00 | 20 | 20 | 20 | 20 | 20 | 20 | DC | 20 | 20 | 00 | 20 | 20 | 20 | 00 | 00 | F9 | 20 | 20 | 20 | 20 | 20 | 00 | 00 | 20 |
| C0 | 20 | 20 | 00 | 00 | 00 | 00 | 00 | 00 | DD | 20 | 20 | 00 | 20 | 20 | 20 | 00 | 20 | FA | 20 | 20 | 20 | 20 | 20 | 00 | 20 | 00 |
| C1 | 20 | 20 | 00 | 00 | 00 | 00 | 00 | 20 | DE | 20 | 20 | 00 | 20 | 20 | 20 | 20 | 00 | FB | 20 | 20 | 20 | 20 | 20 | 00 | 20 | 20 |
| C2 | 20 | 20 | 00 | 00 | 00 | 00 | 20 | 00 | DF | 20 | 20 | 00 | 20 | 20 | 20 | 20 | 20 | FC | 20 | 20 | 20 | 20 | 20 | 20 | 00 | 00 |
| C3 | 20 | 20 | 00 | 00 | 00 | 00 | 20 | 20 | E0 | 20 | 20 | 20 | 00 | 00 | 00 | 00 | 00 | FD | 20 | 20 | 20 | 20 | 20 | 20 | 00 | 20 |
| C4 | 20 | 20 | 00 | 00 | 00 | 20 | 00 | 00 | E1 | 20 | 20 | 20 | 00 | 00 | 00 | 00 | 20 | FE | 20 | 20 | 20 | 20 | 20 | 20 | 20 | 00 |
| C5 | 20 | 20 | 00 | 00 | 00 | 20 | 00 | 20 | E2 | 20 | 20 | 20 | 00 | 00 | 00 | 20 | 00 | FF | 20 | 20 | 20 | 20 | 20 | 20 | 20 | 20 |
| C6 | 20 | 20 | 00 | 00 | 00 | 20 | 20 | 00 | E3 | 20 | 20 | 20 | 00 | 00 | 00 | 20 | 20 | | | | | | | | | |
| C7 | 20 | 20 | 00 | 00 | 00 | 20 | 20 | 20 | E4 | 20 | 20 | 20 | 00 | 00 | 20 | 00 | 00 | | | | | | | | | |
| C8 | 20 | 20 | 00 | 00 | 20 | 00 | 00 | 00 | E5 | 20 | 20 | 20 | 00 | 00 | 20 | 00 | 20 | | | | | | | | | |
| C9 | 20 | 20 | 00 | 00 | 20 | 00 | 00 | 20 | E6 | 20 | 20 | 20 | 00 | 00 | 20 | 20 | 00 | | | | | | | | | |
| CA | 20 | 20 | 00 | 00 | 20 | 00 | 20 | 00 | E7 | 20 | 20 | 20 | 00 | 00 | 20 | 20 | 20 | | | | | | | | | |

1-bit Mode - Destination Column 3

| Src Byte | Destination Row 0 | 1 | 2 | 3 | 4 | 5 | 6 | 7 | Src Byte | Destination Row 0 | 1 | 2 | 3 | 4 | 5 | 6 | 7 | Src Byte | Destination Row 0 | 1 | 2 | 3 | 4 | 5 | 6 | 7 |
|---|---|---|---|---|---|---|---|---|---|---|---|---|---|---|---|---|---|---|---|---|---|---|---|---|---|---|
| 00 | 00 | 00 | 00 | 00 | 00 | 00 | 00 | 00 | 1D | 00 | 00 | 00 | 10 | 10 | 10 | 00 | 10 | 3A | 00 | 00 | 10 | 10 | 10 | 00 | 10 | 00 |
| 01 | 00 | 00 | 00 | 00 | 00 | 00 | 00 | 10 | 1E | 00 | 00 | 00 | 10 | 10 | 10 | 10 | 00 | 3B | 00 | 00 | 10 | 10 | 10 | 00 | 10 | 10 |
| 02 | 00 | 00 | 00 | 00 | 00 | 00 | 10 | 00 | 1F | 00 | 00 | 00 | 10 | 10 | 10 | 10 | 10 | 3C | 00 | 00 | 10 | 10 | 10 | 10 | 00 | 00 |
| 03 | 00 | 00 | 00 | 00 | 00 | 00 | 10 | 10 | 20 | 00 | 00 | 10 | 00 | 00 | 00 | 00 | 00 | 3D | 00 | 00 | 10 | 10 | 10 | 10 | 00 | 10 |
| 04 | 00 | 00 | 00 | 00 | 00 | 10 | 00 | 00 | 21 | 00 | 00 | 10 | 00 | 00 | 00 | 00 | 10 | 3E | 00 | 00 | 10 | 10 | 10 | 10 | 10 | 00 |
| 05 | 00 | 00 | 00 | 00 | 00 | 10 | 00 | 10 | 22 | 00 | 00 | 10 | 00 | 00 | 00 | 10 | 00 | 3F | 00 | 00 | 10 | 10 | 10 | 10 | 10 | 10 |
| 06 | 00 | 00 | 00 | 00 | 00 | 10 | 10 | 00 | 23 | 00 | 00 | 10 | 00 | 00 | 00 | 10 | 10 | 40 | 00 | 10 | 00 | 00 | 00 | 00 | 00 | 00 |
| 07 | 00 | 00 | 00 | 00 | 00 | 10 | 10 | 10 | 24 | 00 | 00 | 10 | 00 | 00 | 10 | 00 | 00 | 41 | 00 | 10 | 00 | 00 | 00 | 00 | 00 | 10 |
| 08 | 00 | 00 | 00 | 00 | 10 | 00 | 00 | 00 | 25 | 00 | 00 | 10 | 00 | 00 | 10 | 00 | 10 | 42 | 00 | 10 | 00 | 00 | 00 | 00 | 10 | 00 |
| 09 | 00 | 00 | 00 | 00 | 10 | 00 | 00 | 10 | 26 | 00 | 00 | 10 | 00 | 00 | 10 | 10 | 00 | 43 | 00 | 10 | 00 | 00 | 00 | 00 | 10 | 10 |
| 0A | 00 | 00 | 00 | 00 | 10 | 00 | 10 | 00 | 27 | 00 | 00 | 10 | 00 | 00 | 10 | 10 | 10 | 44 | 00 | 10 | 00 | 00 | 00 | 10 | 00 | 00 |
| 0B | 00 | 00 | 00 | 00 | 10 | 00 | 10 | 10 | 28 | 00 | 00 | 10 | 00 | 10 | 00 | 00 | 00 | 45 | 00 | 10 | 00 | 00 | 00 | 10 | 00 | 10 |
| 0C | 00 | 00 | 00 | 00 | 10 | 10 | 00 | 00 | 29 | 00 | 00 | 10 | 00 | 10 | 00 | 00 | 10 | 46 | 00 | 10 | 00 | 00 | 00 | 10 | 10 | 00 |
| 0D | 00 | 00 | 00 | 00 | 10 | 10 | 00 | 10 | 2A | 00 | 00 | 10 | 00 | 10 | 00 | 10 | 00 | 47 | 00 | 10 | 00 | 00 | 00 | 10 | 10 | 10 |
| 0E | 00 | 00 | 00 | 00 | 10 | 10 | 10 | 00 | 2B | 00 | 00 | 10 | 00 | 10 | 00 | 10 | 10 | 48 | 00 | 10 | 00 | 00 | 10 | 00 | 00 | 00 |
| 0F | 00 | 00 | 00 | 00 | 10 | 10 | 10 | 10 | 2C | 00 | 00 | 10 | 00 | 10 | 10 | 00 | 00 | 49 | 00 | 10 | 00 | 00 | 10 | 00 | 00 | 10 |
| 10 | 00 | 00 | 00 | 10 | 00 | 00 | 00 | 00 | 2D | 00 | 00 | 10 | 00 | 10 | 10 | 00 | 10 | 4A | 00 | 10 | 00 | 00 | 10 | 00 | 10 | 00 |
| 11 | 00 | 00 | 00 | 10 | 00 | 00 | 00 | 10 | 2E | 00 | 00 | 10 | 00 | 10 | 10 | 10 | 00 | 4B | 00 | 10 | 00 | 00 | 10 | 00 | 10 | 10 |
| 12 | 00 | 00 | 00 | 10 | 00 | 00 | 10 | 00 | 2F | 00 | 00 | 10 | 00 | 10 | 10 | 10 | 10 | 4C | 00 | 10 | 00 | 00 | 10 | 10 | 00 | 00 |
| 13 | 00 | 00 | 00 | 10 | 00 | 00 | 10 | 10 | 30 | 00 | 00 | 10 | 10 | 00 | 00 | 00 | 00 | 4D | 00 | 10 | 00 | 00 | 10 | 10 | 00 | 10 |
| 14 | 00 | 00 | 00 | 10 | 00 | 10 | 00 | 00 | 31 | 00 | 00 | 10 | 10 | 00 | 00 | 00 | 10 | 4E | 00 | 10 | 00 | 00 | 10 | 10 | 10 | 00 |
| 15 | 00 | 00 | 00 | 10 | 00 | 10 | 00 | 10 | 32 | 00 | 00 | 10 | 10 | 00 | 00 | 10 | 00 | 4F | 00 | 10 | 00 | 00 | 10 | 10 | 10 | 10 |
| 16 | 00 | 00 | 00 | 10 | 00 | 10 | 10 | 00 | 33 | 00 | 00 | 10 | 10 | 00 | 00 | 10 | 10 | 50 | 00 | 10 | 00 | 10 | 00 | 00 | 00 | 00 |
| 17 | 00 | 00 | 00 | 10 | 00 | 10 | 10 | 10 | 34 | 00 | 00 | 10 | 10 | 00 | 10 | 00 | 00 | 51 | 00 | 10 | 00 | 10 | 00 | 00 | 00 | 10 |
| 18 | 00 | 00 | 00 | 10 | 10 | 00 | 00 | 00 | 35 | 00 | 00 | 10 | 10 | 00 | 10 | 00 | 10 | 52 | 00 | 10 | 00 | 10 | 00 | 00 | 10 | 00 |
| 19 | 00 | 00 | 00 | 10 | 10 | 00 | 00 | 10 | 36 | 00 | 00 | 10 | 10 | 00 | 10 | 10 | 00 | 53 | 00 | 10 | 00 | 10 | 00 | 00 | 10 | 10 |
| 1A | 00 | 00 | 00 | 10 | 10 | 00 | 10 | 00 | 37 | 00 | 00 | 10 | 10 | 00 | 10 | 10 | 10 | 54 | 00 | 10 | 00 | 10 | 00 | 10 | 00 | 00 |
| 1B | 00 | 00 | 00 | 10 | 10 | 00 | 10 | 10 | 38 | 00 | 00 | 10 | 10 | 10 | 00 | 00 | 00 | 55 | 00 | 10 | 00 | 10 | 00 | 10 | 00 | 10 |

-continued 1-bit Mode - Destination Column 3

| Src Byte | Row 0 | 1 | 2 | 3 | 4 | 5 | 6 | 7 | Src Byte | Row 0 | 1 | 2 | 3 | 4 | 5 | 6 | 7 | Src Byte | Row 0 | 1 | 2 | 3 | 4 | 5 | 6 | 7 |
|---|---|---|---|---|---|---|---|---|---|---|---|---|---|---|---|---|---|---|---|---|---|---|---|---|---|---|
| 1C | 00 | 00 | 00 | 10 | 10 | 10 | 00 | 00 | 39 | 00 | 00 | 10 | 10 | 10 | 00 | 00 | 10 | 56 | 00 | 10 | 00 | 10 | 00 | 10 | 10 | 00 |
| 57 | 00 | 10 | 00 | 10 | 00 | 10 | 10 | 10 | 74 | 00 | 10 | 10 | 10 | 00 | 10 | 00 | 00 | 91 | 10 | 00 | 00 | 10 | 00 | 00 | 00 | 10 |
| 58 | 00 | 10 | 00 | 10 | 10 | 00 | 00 | 00 | 75 | 00 | 10 | 10 | 10 | 00 | 10 | 00 | 10 | 92 | 10 | 00 | 00 | 10 | 00 | 00 | 10 | 00 |
| 59 | 00 | 10 | 00 | 10 | 10 | 00 | 00 | 10 | 76 | 00 | 10 | 10 | 10 | 00 | 10 | 10 | 00 | 93 | 10 | 00 | 00 | 10 | 00 | 00 | 10 | 10 |
| 5A | 00 | 10 | 00 | 10 | 10 | 00 | 10 | 00 | 77 | 00 | 10 | 10 | 10 | 00 | 10 | 10 | 10 | 94 | 10 | 00 | 00 | 10 | 00 | 10 | 00 | 00 |
| 5B | 00 | 10 | 00 | 10 | 10 | 00 | 10 | 10 | 78 | 00 | 10 | 10 | 10 | 10 | 00 | 00 | 00 | 95 | 10 | 00 | 00 | 10 | 00 | 10 | 00 | 10 |
| 5C | 00 | 10 | 00 | 10 | 10 | 10 | 00 | 00 | 79 | 00 | 10 | 10 | 10 | 10 | 00 | 00 | 10 | 96 | 10 | 00 | 00 | 10 | 00 | 10 | 10 | 00 |
| 5D | 00 | 10 | 00 | 10 | 10 | 10 | 00 | 10 | 7A | 00 | 10 | 10 | 10 | 10 | 00 | 10 | 00 | 97 | 10 | 00 | 00 | 10 | 00 | 10 | 10 | 10 |
| 5E | 00 | 10 | 00 | 10 | 10 | 10 | 10 | 00 | 7B | 00 | 10 | 10 | 10 | 10 | 00 | 10 | 10 | 98 | 10 | 00 | 00 | 10 | 10 | 00 | 00 | 00 |
| 5F | 00 | 10 | 00 | 10 | 10 | 10 | 10 | 10 | 7C | 00 | 10 | 10 | 10 | 10 | 10 | 00 | 00 | 99 | 10 | 00 | 00 | 10 | 10 | 00 | 00 | 10 |
| 60 | 00 | 10 | 10 | 00 | 00 | 00 | 00 | 00 | 7D | 00 | 10 | 10 | 10 | 10 | 10 | 00 | 10 | 9A | 10 | 00 | 00 | 10 | 10 | 00 | 10 | 00 |
| 61 | 00 | 10 | 10 | 00 | 00 | 00 | 00 | 10 | 7E | 00 | 10 | 10 | 10 | 10 | 10 | 10 | 00 | 9B | 10 | 00 | 00 | 10 | 10 | 00 | 10 | 10 |
| 62 | 00 | 10 | 10 | 00 | 00 | 00 | 10 | 00 | 7F | 00 | 10 | 10 | 10 | 10 | 10 | 10 | 10 | 9C | 10 | 00 | 00 | 10 | 10 | 10 | 00 | 00 |
| 63 | 00 | 10 | 10 | 00 | 00 | 00 | 10 | 10 | 80 | 10 | 00 | 00 | 00 | 00 | 00 | 00 | 00 | 9D | 10 | 00 | 00 | 10 | 10 | 10 | 00 | 10 |
| 64 | 00 | 10 | 10 | 00 | 00 | 10 | 00 | 00 | 81 | 10 | 00 | 00 | 00 | 00 | 00 | 00 | 10 | 9E | 10 | 00 | 00 | 10 | 10 | 10 | 10 | 00 |
| 65 | 00 | 10 | 10 | 00 | 00 | 10 | 00 | 10 | 82 | 10 | 00 | 00 | 00 | 00 | 00 | 10 | 00 | 9F | 10 | 00 | 00 | 10 | 10 | 10 | 10 | 10 |
| 66 | 00 | 10 | 10 | 00 | 00 | 10 | 10 | 00 | 83 | 10 | 00 | 00 | 00 | 00 | 00 | 10 | 10 | A0 | 10 | 00 | 10 | 00 | 00 | 00 | 00 | 00 |
| 67 | 00 | 10 | 10 | 00 | 00 | 10 | 10 | 10 | 84 | 10 | 00 | 00 | 00 | 00 | 10 | 00 | 00 | A1 | 10 | 00 | 10 | 00 | 00 | 00 | 00 | 10 |
| 68 | 00 | 10 | 10 | 00 | 10 | 00 | 00 | 00 | 85 | 10 | 00 | 00 | 00 | 00 | 10 | 00 | 10 | A2 | 10 | 00 | 10 | 00 | 00 | 00 | 10 | 00 |
| 69 | 00 | 10 | 10 | 00 | 10 | 00 | 00 | 10 | 86 | 10 | 00 | 00 | 00 | 00 | 10 | 10 | 00 | A3 | 10 | 00 | 10 | 00 | 00 | 00 | 10 | 10 |
| 6A | 00 | 10 | 10 | 00 | 10 | 00 | 10 | 00 | 87 | 10 | 00 | 00 | 00 | 00 | 10 | 10 | 10 | A4 | 10 | 00 | 10 | 00 | 00 | 10 | 00 | 00 |
| 6B | 00 | 10 | 10 | 00 | 10 | 00 | 10 | 10 | 88 | 10 | 00 | 00 | 00 | 10 | 00 | 00 | 00 | A5 | 10 | 00 | 10 | 00 | 00 | 10 | 00 | 10 |
| 6C | 00 | 10 | 10 | 00 | 10 | 10 | 00 | 00 | 89 | 10 | 00 | 00 | 00 | 10 | 00 | 00 | 10 | A6 | 10 | 00 | 10 | 00 | 00 | 10 | 10 | 00 |
| 6D | 00 | 10 | 10 | 00 | 10 | 10 | 00 | 10 | 8A | 10 | 00 | 00 | 00 | 10 | 00 | 10 | 00 | A7 | 10 | 00 | 10 | 00 | 00 | 10 | 10 | 10 |
| 6E | 00 | 10 | 10 | 00 | 10 | 10 | 10 | 00 | 8B | 10 | 00 | 00 | 00 | 10 | 00 | 10 | 10 | A8 | 10 | 00 | 10 | 00 | 10 | 00 | 00 | 00 |
| 6F | 00 | 10 | 10 | 00 | 10 | 10 | 10 | 10 | 8C | 10 | 00 | 00 | 00 | 10 | 10 | 00 | 00 | A9 | 10 | 00 | 10 | 00 | 10 | 00 | 00 | 10 |
| 70 | 00 | 10 | 10 | 10 | 00 | 00 | 00 | 00 | 8D | 10 | 00 | 00 | 00 | 10 | 10 | 00 | 10 | AA | 10 | 00 | 10 | 00 | 10 | 00 | 10 | 00 |
| 71 | 00 | 10 | 10 | 10 | 00 | 00 | 00 | 10 | 8E | 10 | 00 | 00 | 00 | 10 | 10 | 10 | 00 | AB | 10 | 00 | 10 | 00 | 10 | 00 | 10 | 10 |
| 72 | 00 | 10 | 10 | 10 | 00 | 00 | 10 | 00 | 8F | 10 | 00 | 00 | 00 | 10 | 10 | 10 | 10 | AC | 10 | 00 | 10 | 00 | 10 | 10 | 00 | 00 |
| 73 | 00 | 10 | 10 | 10 | 00 | 00 | 10 | 10 | 90 | 10 | 00 | 00 | 10 | 00 | 00 | 00 | 00 | AD | 10 | 00 | 10 | 00 | 10 | 10 | 00 | 10 |
| AE | 10 | 00 | 10 | 00 | 10 | 10 | 10 | 00 | CB | 10 | 10 | 00 | 00 | 10 | 00 | 10 | 10 | E8 | 10 | 10 | 10 | 00 | 10 | 00 | 00 | 00 |
| AF | 10 | 00 | 10 | 00 | 10 | 10 | 10 | 10 | CC | 10 | 10 | 00 | 00 | 10 | 10 | 00 | 00 | E9 | 10 | 10 | 10 | 00 | 10 | 00 | 00 | 10 |
| B0 | 10 | 00 | 10 | 10 | 00 | 00 | 00 | 00 | CD | 10 | 10 | 00 | 00 | 10 | 10 | 00 | 10 | EA | 10 | 10 | 10 | 00 | 10 | 00 | 10 | 00 |
| B1 | 10 | 00 | 10 | 10 | 00 | 00 | 00 | 10 | CE | 10 | 10 | 00 | 00 | 10 | 10 | 10 | 00 | EB | 10 | 10 | 10 | 00 | 10 | 00 | 10 | 10 |
| B2 | 10 | 00 | 10 | 10 | 00 | 00 | 10 | 00 | CF | 10 | 10 | 00 | 00 | 10 | 10 | 10 | 10 | EC | 10 | 10 | 10 | 00 | 10 | 10 | 00 | 00 |
| B3 | 10 | 00 | 10 | 10 | 00 | 00 | 10 | 10 | D0 | 10 | 10 | 00 | 10 | 00 | 00 | 00 | 00 | ED | 10 | 10 | 10 | 00 | 10 | 10 | 00 | 10 |
| B4 | 10 | 00 | 10 | 10 | 00 | 10 | 00 | 00 | D1 | 10 | 10 | 00 | 10 | 00 | 00 | 00 | 10 | EE | 10 | 10 | 10 | 00 | 10 | 10 | 10 | 00 |
| B5 | 10 | 00 | 10 | 10 | 00 | 10 | 00 | 10 | D2 | 10 | 10 | 00 | 10 | 00 | 00 | 10 | 00 | EF | 10 | 10 | 10 | 00 | 10 | 10 | 10 | 10 |
| B6 | 10 | 00 | 10 | 10 | 00 | 10 | 10 | 00 | D3 | 10 | 10 | 00 | 10 | 00 | 00 | 10 | 10 | F0 | 10 | 10 | 10 | 10 | 00 | 00 | 00 | 00 |
| B7 | 10 | 00 | 10 | 10 | 00 | 10 | 10 | 10 | D4 | 10 | 10 | 00 | 10 | 00 | 10 | 00 | 00 | F1 | 10 | 10 | 10 | 10 | 00 | 00 | 00 | 10 |
| B8 | 10 | 00 | 10 | 10 | 10 | 00 | 00 | 00 | D5 | 10 | 10 | 00 | 10 | 00 | 10 | 00 | 10 | F2 | 10 | 10 | 10 | 10 | 00 | 00 | 10 | 00 |
| B9 | 10 | 00 | 10 | 10 | 10 | 00 | 00 | 10 | D6 | 10 | 10 | 00 | 10 | 00 | 10 | 10 | 00 | F3 | 10 | 10 | 10 | 10 | 00 | 00 | 10 | 10 |
| BA | 10 | 00 | 10 | 10 | 10 | 00 | 10 | 00 | D7 | 10 | 10 | 00 | 10 | 00 | 10 | 10 | 10 | F4 | 10 | 10 | 10 | 10 | 00 | 10 | 00 | 00 |
| BB | 10 | 00 | 10 | 10 | 10 | 00 | 10 | 10 | D8 | 10 | 10 | 00 | 10 | 10 | 00 | 00 | 00 | F5 | 10 | 10 | 10 | 10 | 00 | 10 | 00 | 10 |
| BC | 10 | 00 | 10 | 10 | 10 | 10 | 00 | 00 | D9 | 10 | 10 | 00 | 10 | 10 | 00 | 00 | 10 | F6 | 10 | 10 | 10 | 10 | 00 | 10 | 10 | 00 |
| BD | 10 | 00 | 10 | 10 | 10 | 10 | 00 | 10 | DA | 10 | 10 | 00 | 10 | 10 | 00 | 10 | 00 | F7 | 10 | 10 | 10 | 10 | 00 | 10 | 10 | 10 |
| BE | 10 | 00 | 10 | 10 | 10 | 10 | 10 | 00 | DB | 10 | 10 | 00 | 10 | 10 | 00 | 10 | 10 | F8 | 10 | 10 | 10 | 10 | 10 | 00 | 00 | 00 |
| BF | 10 | 00 | 10 | 10 | 10 | 10 | 10 | 10 | DC | 10 | 10 | 00 | 10 | 10 | 10 | 00 | 00 | F9 | 10 | 10 | 10 | 10 | 10 | 00 | 00 | 10 |
| C0 | 10 | 10 | 00 | 00 | 00 | 00 | 00 | 00 | DD | 10 | 10 | 00 | 10 | 10 | 10 | 00 | 10 | FA | 10 | 10 | 10 | 10 | 10 | 00 | 10 | 00 |
| C1 | 10 | 10 | 00 | 00 | 00 | 00 | 00 | 10 | DE | 10 | 10 | 00 | 10 | 10 | 10 | 10 | 00 | FB | 10 | 10 | 10 | 10 | 10 | 00 | 10 | 10 |
| C2 | 10 | 10 | 00 | 00 | 00 | 00 | 10 | 00 | DF | 10 | 10 | 00 | 10 | 10 | 10 | 10 | 10 | FC | 10 | 10 | 10 | 10 | 10 | 10 | 00 | 00 |
| C3 | 10 | 10 | 00 | 00 | 00 | 00 | 10 | 10 | E0 | 10 | 10 | 10 | 00 | 00 | 00 | 00 | 00 | FD | 10 | 10 | 10 | 10 | 10 | 10 | 00 | 10 |
| C4 | 10 | 10 | 00 | 00 | 00 | 10 | 00 | 00 | E1 | 10 | 10 | 10 | 00 | 00 | 00 | 00 | 10 | FE | 10 | 10 | 10 | 10 | 10 | 10 | 10 | 00 |
| C5 | 10 | 10 | 00 | 00 | 00 | 10 | 00 | 10 | E2 | 10 | 10 | 10 | 00 | 00 | 00 | 10 | 00 | FF | 10 | 10 | 10 | 10 | 10 | 10 | 10 | 10 |
| C6 | 10 | 10 | 00 | 00 | 00 | 10 | 10 | 00 | E3 | 10 | 10 | 10 | 00 | 00 | 00 | 10 | 10 | | | | | | | | | |
| C7 | 10 | 10 | 00 | 00 | 00 | 10 | 10 | 10 | E4 | 10 | 10 | 10 | 00 | 00 | 10 | 00 | 00 | | | | | | | | | |
| C8 | 10 | 10 | 00 | 00 | 10 | 00 | 00 | 00 | E5 | 10 | 10 | 10 | 00 | 00 | 10 | 00 | 10 | | | | | | | | | |
| C9 | 10 | 10 | 00 | 00 | 10 | 00 | 00 | 10 | E6 | 10 | 10 | 10 | 00 | 00 | 10 | 10 | 00 | | | | | | | | | |
| CA | 10 | 10 | 00 | 00 | 10 | 00 | 10 | 00 | E7 | 10 | 10 | 10 | 00 | 00 | 10 | 10 | 10 | | | | | | | | | |

1-bit Mode - Destination Column 4

| Src Byte | Row 0 | 1 | 2 | 3 | 4 | 5 | 6 | 7 | Src Byte | Row 0 | 1 | 2 | 3 | 4 | 5 | 6 | 7 | Src Byte | Row 0 | 1 | 2 | 3 | 4 | 5 | 6 | 7 |
|---|---|---|---|---|---|---|---|---|---|---|---|---|---|---|---|---|---|---|---|---|---|---|---|---|---|---|
| 00 | 00 | 00 | 00 | 00 | 00 | 00 | 00 | 00 | 1D | 00 | 00 | 00 | 08 | 08 | 08 | 00 | 08 | 3A | 00 | 00 | 08 | 08 | 08 | 00 | 08 | 00 |
| 01 | 00 | 00 | 00 | 00 | 00 | 00 | 00 | 08 | 1E | 00 | 00 | 00 | 08 | 08 | 08 | 08 | 00 | 3B | 00 | 00 | 08 | 08 | 08 | 00 | 08 | 08 |
| 02 | 00 | 00 | 00 | 00 | 00 | 00 | 08 | 00 | 1F | 00 | 00 | 00 | 08 | 08 | 08 | 08 | 08 | 3C | 00 | 00 | 08 | 08 | 08 | 08 | 00 | 00 |
| 03 | 00 | 00 | 00 | 00 | 00 | 00 | 08 | 08 | 20 | 00 | 00 | 08 | 00 | 00 | 00 | 00 | 00 | 3D | 00 | 00 | 08 | 08 | 08 | 08 | 00 | 08 |
| 04 | 00 | 00 | 00 | 00 | 00 | 08 | 00 | 00 | 21 | 00 | 00 | 08 | 00 | 00 | 00 | 00 | 08 | 3E | 00 | 00 | 08 | 08 | 08 | 08 | 08 | 00 |
| 05 | 00 | 00 | 00 | 00 | 00 | 08 | 00 | 08 | 22 | 00 | 00 | 08 | 00 | 00 | 00 | 08 | 00 | 3F | 00 | 00 | 08 | 08 | 08 | 08 | 08 | 08 |
| 06 | 00 | 00 | 00 | 00 | 00 | 08 | 08 | 00 | 23 | 00 | 00 | 08 | 00 | 00 | 00 | 08 | 08 | 40 | 00 | 08 | 00 | 00 | 00 | 00 | 00 | 00 |
| 07 | 00 | 00 | 00 | 00 | 00 | 08 | 08 | 08 | 24 | 00 | 00 | 08 | 00 | 00 | 08 | 00 | 00 | 41 | 00 | 08 | 00 | 00 | 00 | 00 | 00 | 08 |
| 08 | 00 | 00 | 00 | 00 | 08 | 00 | 00 | 00 | 25 | 00 | 00 | 08 | 00 | 00 | 08 | 00 | 08 | 42 | 00 | 08 | 00 | 00 | 00 | 00 | 08 | 00 |
| 09 | 00 | 00 | 00 | 00 | 08 | 00 | 00 | 08 | 26 | 00 | 00 | 08 | 00 | 00 | 08 | 08 | 00 | 43 | 00 | 08 | 00 | 00 | 00 | 00 | 08 | 08 |
| 0A | 00 | 00 | 00 | 00 | 08 | 00 | 08 | 00 | 27 | 00 | 00 | 08 | 00 | 00 | 08 | 08 | 08 | 44 | 00 | 08 | 00 | 00 | 00 | 08 | 00 | 00 |

-continued 1-bit Mode - Destination Column 4

| Src Byte | 0 | 1 | 2 | 3 | 4 | 5 | 6 | 7 | Src Byte | 0 | 1 | 2 | 3 | 4 | 5 | 6 | 7 | Src Byte | 0 | 1 | 2 | 3 | 4 | 5 | 6 | 7 |
|---|---|---|---|---|---|---|---|---|---|---|---|---|---|---|---|---|---|---|---|---|---|---|---|---|---|---|
| | Destination Row | | | | | | | | | Destination Row | | | | | | | | | Destination Row | | | | | | | |
| 0B | 00 | 00 | 00 | 00 | 08 | 00 | 08 | 08 | 28 | 00 | 00 | 08 | 00 | 08 | 00 | 00 | 00 | 45 | 00 | 08 | 00 | 00 | 00 | 08 | 00 | 08 |
| 0C | 00 | 00 | 00 | 00 | 08 | 08 | 00 | 00 | 29 | 00 | 00 | 08 | 00 | 08 | 00 | 00 | 08 | 46 | 00 | 08 | 00 | 00 | 00 | 08 | 08 | 00 |
| 0D | 00 | 00 | 00 | 00 | 08 | 08 | 00 | 08 | 2A | 00 | 00 | 08 | 00 | 08 | 00 | 08 | 00 | 47 | 00 | 08 | 00 | 00 | 00 | 08 | 08 | 08 |
| 0E | 00 | 00 | 00 | 00 | 08 | 08 | 08 | 00 | 2B | 00 | 00 | 08 | 00 | 08 | 00 | 08 | 08 | 48 | 00 | 08 | 00 | 00 | 08 | 00 | 00 | 00 |
| 0F | 00 | 00 | 00 | 00 | 08 | 08 | 08 | 08 | 2C | 00 | 00 | 08 | 00 | 08 | 08 | 00 | 00 | 49 | 00 | 08 | 00 | 00 | 08 | 00 | 00 | 08 |
| 10 | 00 | 00 | 00 | 08 | 00 | 00 | 00 | 00 | 2D | 00 | 00 | 08 | 00 | 08 | 08 | 00 | 08 | 4A | 00 | 08 | 00 | 00 | 08 | 00 | 08 | 00 |
| 11 | 00 | 00 | 00 | 08 | 00 | 00 | 00 | 08 | 2E | 00 | 00 | 08 | 00 | 08 | 08 | 08 | 00 | 4B | 00 | 08 | 00 | 00 | 08 | 00 | 08 | 08 |
| 12 | 00 | 00 | 00 | 08 | 00 | 00 | 08 | 00 | 2F | 00 | 00 | 08 | 00 | 08 | 08 | 08 | 08 | 4C | 00 | 08 | 00 | 00 | 08 | 08 | 00 | 00 |
| 13 | 00 | 00 | 00 | 08 | 00 | 00 | 08 | 08 | 30 | 00 | 00 | 08 | 08 | 00 | 00 | 00 | 00 | 4D | 00 | 08 | 00 | 00 | 08 | 08 | 00 | 08 |
| 14 | 00 | 00 | 00 | 08 | 00 | 08 | 00 | 00 | 31 | 00 | 00 | 08 | 08 | 00 | 00 | 00 | 08 | 4E | 00 | 08 | 00 | 00 | 08 | 08 | 08 | 00 |
| 15 | 00 | 00 | 00 | 08 | 00 | 08 | 00 | 08 | 32 | 00 | 00 | 08 | 08 | 00 | 00 | 08 | 00 | 4F | 00 | 08 | 00 | 00 | 08 | 08 | 08 | 08 |
| 16 | 00 | 00 | 00 | 08 | 00 | 08 | 08 | 00 | 33 | 00 | 00 | 08 | 08 | 00 | 00 | 08 | 08 | 50 | 00 | 08 | 00 | 08 | 00 | 00 | 00 | 00 |
| 17 | 00 | 00 | 00 | 08 | 00 | 08 | 08 | 08 | 34 | 00 | 00 | 08 | 08 | 00 | 08 | 00 | 00 | 51 | 00 | 08 | 00 | 08 | 00 | 00 | 00 | 08 |
| 18 | 00 | 00 | 00 | 08 | 08 | 00 | 00 | 00 | 35 | 00 | 00 | 08 | 08 | 00 | 08 | 00 | 08 | 52 | 00 | 08 | 00 | 08 | 00 | 00 | 08 | 00 |
| 19 | 00 | 00 | 00 | 08 | 08 | 00 | 00 | 08 | 36 | 00 | 00 | 08 | 08 | 00 | 08 | 08 | 00 | 53 | 00 | 08 | 00 | 08 | 00 | 00 | 08 | 08 |
| 1A | 00 | 00 | 00 | 08 | 08 | 00 | 08 | 00 | 37 | 00 | 00 | 08 | 08 | 00 | 08 | 08 | 08 | 54 | 00 | 08 | 00 | 08 | 00 | 08 | 00 | 00 |
| 1B | 00 | 00 | 00 | 08 | 08 | 00 | 08 | 08 | 38 | 00 | 00 | 08 | 08 | 08 | 00 | 00 | 00 | 55 | 00 | 08 | 00 | 08 | 00 | 08 | 00 | 08 |
| 1C | 00 | 00 | 00 | 08 | 08 | 08 | 00 | 00 | 39 | 00 | 00 | 08 | 08 | 08 | 00 | 00 | 08 | 56 | 00 | 08 | 00 | 08 | 00 | 08 | 08 | 00 |
| 57 | 00 | 08 | 00 | 08 | 00 | 08 | 08 | 08 | 74 | 00 | 08 | 08 | 08 | 00 | 08 | 00 | 00 | 91 | 08 | 00 | 00 | 08 | 00 | 00 | 00 | 08 |
| 58 | 00 | 08 | 00 | 08 | 08 | 00 | 00 | 00 | 75 | 00 | 08 | 08 | 08 | 00 | 08 | 00 | 08 | 92 | 08 | 00 | 00 | 08 | 00 | 00 | 08 | 00 |
| 59 | 00 | 08 | 00 | 08 | 08 | 00 | 00 | 08 | 76 | 00 | 08 | 08 | 08 | 00 | 08 | 08 | 00 | 93 | 08 | 00 | 00 | 08 | 00 | 00 | 08 | 08 |
| 5A | 00 | 08 | 00 | 08 | 08 | 00 | 08 | 00 | 77 | 00 | 08 | 08 | 08 | 00 | 08 | 08 | 08 | 94 | 08 | 00 | 00 | 08 | 00 | 08 | 00 | 00 |
| 5B | 00 | 08 | 00 | 08 | 08 | 00 | 08 | 08 | 78 | 00 | 08 | 08 | 08 | 08 | 00 | 00 | 00 | 95 | 08 | 00 | 00 | 08 | 00 | 08 | 00 | 08 |
| 5C | 00 | 08 | 00 | 08 | 08 | 08 | 00 | 00 | 79 | 00 | 08 | 08 | 08 | 08 | 00 | 00 | 08 | 96 | 08 | 00 | 00 | 08 | 00 | 08 | 08 | 00 |
| 5D | 00 | 08 | 00 | 08 | 08 | 08 | 00 | 08 | 7A | 00 | 08 | 08 | 08 | 08 | 00 | 08 | 00 | 97 | 08 | 00 | 00 | 08 | 00 | 08 | 08 | 08 |
| 5E | 00 | 08 | 00 | 08 | 08 | 08 | 08 | 00 | 7B | 00 | 08 | 08 | 08 | 08 | 00 | 08 | 08 | 98 | 08 | 00 | 00 | 08 | 08 | 00 | 00 | 00 |
| 5F | 00 | 08 | 00 | 08 | 08 | 08 | 08 | 08 | 7C | 00 | 08 | 08 | 08 | 08 | 08 | 00 | 00 | 99 | 08 | 00 | 00 | 08 | 08 | 00 | 00 | 08 |
| 60 | 00 | 08 | 08 | 00 | 00 | 00 | 00 | 00 | 7D | 00 | 08 | 08 | 08 | 08 | 08 | 00 | 08 | 9A | 08 | 00 | 00 | 08 | 08 | 00 | 08 | 00 |
| 61 | 00 | 08 | 08 | 00 | 00 | 00 | 00 | 08 | 7E | 00 | 08 | 08 | 08 | 08 | 08 | 08 | 00 | 9B | 08 | 00 | 00 | 08 | 08 | 00 | 08 | 08 |
| 62 | 00 | 08 | 08 | 00 | 00 | 00 | 08 | 00 | 7F | 00 | 08 | 08 | 08 | 08 | 08 | 08 | 08 | 9C | 08 | 00 | 00 | 08 | 08 | 08 | 00 | 00 |
| 63 | 00 | 08 | 08 | 00 | 00 | 00 | 08 | 08 | 80 | 08 | 00 | 00 | 00 | 00 | 00 | 00 | 00 | 9D | 08 | 00 | 00 | 08 | 08 | 08 | 00 | 08 |
| 64 | 00 | 08 | 08 | 00 | 00 | 08 | 00 | 00 | 81 | 08 | 00 | 00 | 00 | 00 | 00 | 00 | 08 | 9E | 08 | 00 | 00 | 08 | 08 | 08 | 08 | 00 |
| 65 | 00 | 08 | 08 | 00 | 00 | 08 | 00 | 08 | 82 | 08 | 00 | 00 | 00 | 00 | 00 | 08 | 00 | 9F | 08 | 00 | 00 | 08 | 08 | 08 | 08 | 08 |
| 66 | 00 | 08 | 08 | 00 | 00 | 08 | 08 | 00 | 83 | 08 | 00 | 00 | 00 | 00 | 00 | 08 | 08 | A0 | 08 | 00 | 08 | 00 | 00 | 00 | 00 | 00 |
| 67 | 00 | 08 | 08 | 00 | 00 | 08 | 08 | 08 | 84 | 08 | 00 | 00 | 00 | 00 | 08 | 00 | 00 | A1 | 08 | 00 | 08 | 00 | 00 | 00 | 00 | 08 |
| 68 | 00 | 08 | 08 | 00 | 08 | 00 | 00 | 00 | 85 | 08 | 00 | 00 | 00 | 00 | 08 | 00 | 08 | A2 | 08 | 00 | 08 | 00 | 00 | 00 | 08 | 00 |
| 69 | 00 | 08 | 08 | 00 | 08 | 00 | 00 | 08 | 86 | 08 | 00 | 00 | 00 | 00 | 08 | 08 | 00 | A3 | 08 | 00 | 08 | 00 | 00 | 00 | 08 | 08 |
| 6A | 00 | 08 | 08 | 00 | 08 | 00 | 08 | 00 | 87 | 08 | 00 | 00 | 00 | 00 | 08 | 08 | 08 | A4 | 08 | 00 | 08 | 00 | 00 | 08 | 00 | 00 |
| 6B | 00 | 08 | 08 | 00 | 08 | 00 | 08 | 08 | 88 | 08 | 00 | 00 | 00 | 08 | 00 | 00 | 00 | A5 | 08 | 00 | 08 | 00 | 00 | 08 | 00 | 08 |
| 6C | 00 | 08 | 08 | 00 | 08 | 08 | 00 | 00 | 89 | 08 | 00 | 00 | 00 | 08 | 00 | 00 | 08 | A6 | 08 | 00 | 08 | 00 | 00 | 08 | 08 | 00 |
| 6D | 00 | 08 | 08 | 00 | 08 | 08 | 00 | 08 | 8A | 08 | 00 | 00 | 00 | 08 | 00 | 08 | 00 | A7 | 08 | 00 | 08 | 00 | 00 | 08 | 08 | 08 |
| 6E | 00 | 08 | 08 | 00 | 08 | 08 | 08 | 00 | 8B | 08 | 00 | 00 | 00 | 08 | 00 | 08 | 08 | A8 | 08 | 00 | 08 | 00 | 08 | 00 | 00 | 00 |
| 6F | 00 | 08 | 08 | 00 | 08 | 08 | 08 | 08 | 8C | 08 | 00 | 00 | 00 | 08 | 08 | 00 | 00 | A9 | 08 | 00 | 08 | 00 | 08 | 00 | 00 | 08 |
| 70 | 00 | 08 | 08 | 08 | 00 | 00 | 00 | 00 | 8D | 08 | 00 | 00 | 00 | 08 | 08 | 00 | 08 | AA | 08 | 00 | 08 | 00 | 08 | 00 | 08 | 00 |
| 71 | 00 | 08 | 08 | 08 | 00 | 00 | 00 | 08 | 8E | 08 | 00 | 00 | 00 | 08 | 08 | 08 | 00 | AB | 08 | 00 | 08 | 00 | 08 | 00 | 08 | 08 |
| 72 | 00 | 08 | 08 | 08 | 00 | 00 | 08 | 00 | 8F | 08 | 00 | 00 | 00 | 08 | 08 | 08 | 08 | AC | 08 | 00 | 08 | 00 | 08 | 08 | 00 | 00 |
| 73 | 00 | 08 | 08 | 08 | 00 | 00 | 08 | 08 | 90 | 08 | 00 | 00 | 08 | 00 | 00 | 00 | 00 | AD | 08 | 00 | 08 | 00 | 08 | 08 | 00 | 08 |
| AE | 08 | 00 | 08 | 00 | 08 | 08 | 08 | 00 | CB | 08 | 08 | 00 | 00 | 08 | 00 | 08 | 08 | E8 | 08 | 08 | 08 | 00 | 08 | 00 | 00 | 00 |
| AF | 08 | 00 | 08 | 00 | 08 | 08 | 08 | 08 | CC | 08 | 08 | 00 | 00 | 08 | 08 | 00 | 00 | E9 | 08 | 08 | 08 | 00 | 08 | 00 | 00 | 08 |
| B0 | 08 | 00 | 08 | 08 | 00 | 00 | 00 | 00 | CD | 08 | 08 | 00 | 00 | 08 | 08 | 00 | 08 | EA | 08 | 08 | 08 | 00 | 08 | 00 | 08 | 00 |
| B1 | 08 | 00 | 08 | 08 | 00 | 00 | 00 | 08 | CE | 08 | 08 | 00 | 00 | 08 | 08 | 08 | 00 | EB | 08 | 08 | 08 | 00 | 08 | 00 | 08 | 08 |
| B2 | 08 | 00 | 08 | 08 | 00 | 00 | 08 | 00 | CF | 08 | 08 | 00 | 00 | 08 | 08 | 08 | 08 | EC | 08 | 08 | 08 | 00 | 08 | 08 | 00 | 00 |
| B3 | 08 | 00 | 08 | 08 | 00 | 00 | 08 | 08 | D0 | 08 | 08 | 00 | 08 | 00 | 00 | 00 | 00 | ED | 08 | 08 | 08 | 00 | 08 | 08 | 00 | 08 |
| B4 | 08 | 00 | 08 | 08 | 00 | 08 | 00 | 00 | D1 | 08 | 08 | 00 | 08 | 00 | 00 | 00 | 08 | EE | 08 | 08 | 08 | 00 | 08 | 08 | 08 | 00 |
| B5 | 08 | 00 | 08 | 08 | 00 | 08 | 00 | 08 | D2 | 08 | 08 | 00 | 08 | 00 | 00 | 08 | 00 | EF | 08 | 08 | 08 | 00 | 08 | 08 | 08 | 08 |
| B6 | 08 | 00 | 08 | 08 | 00 | 08 | 08 | 00 | D3 | 08 | 08 | 00 | 08 | 00 | 00 | 08 | 08 | F0 | 08 | 08 | 08 | 08 | 00 | 00 | 00 | 00 |
| B7 | 08 | 00 | 08 | 08 | 00 | 08 | 08 | 08 | D4 | 08 | 08 | 00 | 08 | 00 | 08 | 00 | 00 | F1 | 08 | 08 | 08 | 08 | 00 | 00 | 00 | 08 |
| B8 | 08 | 00 | 08 | 08 | 08 | 00 | 00 | 00 | D5 | 08 | 08 | 00 | 08 | 00 | 08 | 00 | 08 | F2 | 08 | 08 | 08 | 08 | 00 | 00 | 08 | 00 |
| B9 | 08 | 00 | 08 | 08 | 08 | 00 | 00 | 08 | D6 | 08 | 08 | 00 | 08 | 00 | 08 | 08 | 00 | F3 | 08 | 08 | 08 | 08 | 00 | 00 | 08 | 08 |
| BA | 08 | 00 | 08 | 08 | 08 | 00 | 08 | 00 | D7 | 08 | 08 | 00 | 08 | 00 | 08 | 08 | 08 | F4 | 08 | 08 | 08 | 08 | 00 | 08 | 00 | 00 |
| BB | 08 | 00 | 08 | 08 | 08 | 00 | 08 | 08 | D8 | 08 | 08 | 00 | 08 | 08 | 00 | 00 | 00 | F5 | 08 | 08 | 08 | 08 | 00 | 08 | 00 | 08 |
| BC | 08 | 00 | 08 | 08 | 08 | 08 | 00 | 00 | D9 | 08 | 08 | 00 | 08 | 08 | 00 | 00 | 08 | F6 | 08 | 08 | 08 | 08 | 00 | 08 | 08 | 00 |
| BD | 08 | 00 | 08 | 08 | 08 | 08 | 00 | 08 | DA | 08 | 08 | 00 | 08 | 08 | 00 | 08 | 00 | F7 | 08 | 08 | 08 | 08 | 00 | 08 | 08 | 08 |
| BE | 08 | 00 | 08 | 08 | 08 | 08 | 08 | 00 | DB | 08 | 08 | 00 | 08 | 08 | 00 | 08 | 08 | F8 | 08 | 08 | 08 | 08 | 08 | 00 | 00 | 00 |
| BF | 08 | 00 | 08 | 08 | 08 | 08 | 08 | 08 | DC | 08 | 08 | 00 | 08 | 08 | 08 | 00 | 00 | F9 | 08 | 08 | 08 | 08 | 08 | 00 | 00 | 08 |
| C0 | 08 | 08 | 00 | 00 | 00 | 00 | 00 | 00 | DD | 08 | 08 | 00 | 08 | 08 | 08 | 00 | 08 | FA | 08 | 08 | 08 | 08 | 08 | 00 | 08 | 00 |
| C1 | 08 | 08 | 00 | 00 | 00 | 00 | 00 | 08 | DE | 08 | 08 | 00 | 08 | 08 | 08 | 08 | 00 | FB | 08 | 08 | 08 | 08 | 08 | 00 | 08 | 08 |
| C2 | 08 | 08 | 00 | 00 | 00 | 00 | 08 | 00 | DF | 08 | 08 | 00 | 08 | 08 | 08 | 08 | 08 | FC | 08 | 08 | 08 | 08 | 08 | 08 | 00 | 00 |
| C3 | 08 | 08 | 00 | 00 | 00 | 00 | 08 | 08 | E0 | 08 | 08 | 08 | 00 | 00 | 00 | 00 | 00 | FD | 08 | 08 | 08 | 08 | 08 | 08 | 00 | 08 |
| C4 | 08 | 08 | 00 | 00 | 00 | 08 | 00 | 00 | E1 | 08 | 08 | 08 | 00 | 00 | 00 | 00 | 08 | FE | 08 | 08 | 08 | 08 | 08 | 08 | 08 | 00 |
| C5 | 08 | 08 | 00 | 00 | 00 | 08 | 00 | 08 | E2 | 08 | 08 | 08 | 00 | 00 | 00 | 08 | 00 | FF | 08 | 08 | 08 | 08 | 08 | 08 | 08 | 08 |
| C6 | 08 | 08 | 00 | 00 | 00 | 08 | 08 | 00 | E3 | 08 | 08 | 08 | 00 | 00 | 00 | 08 | 08 | | | | | | | | | |
| C7 | 08 | 08 | 00 | 00 | 00 | 08 | 08 | 08 | E4 | 08 | 08 | 08 | 00 | 00 | 08 | 00 | 00 | | | | | | | | | |
| C8 | 08 | 08 | 00 | 00 | 08 | 00 | 00 | 00 | E5 | 08 | 08 | 08 | 00 | 00 | 08 | 00 | 08 | | | | | | | | | |
| C9 | 08 | 08 | 00 | 00 | 08 | 00 | 00 | 08 | E6 | 08 | 08 | 08 | 00 | 00 | 08 | 08 | 00 | | | | | | | | | |
| CA | 08 | 08 | 00 | 00 | 08 | 00 | 08 | 00 | E7 | 08 | 08 | 08 | 00 | 00 | 08 | 08 | 08 | | | | | | | | | |

1-bit Mode - Destination Column 5

| Src Byte | 0 | 1 | 2 | 3 | 4 | 5 | 6 | 7 | Src Byte | 0 | 1 | 2 | 3 | 4 | 5 | 6 | 7 | Src Byte | 0 | 1 | 2 | 3 | 4 | 5 | 6 | 7 |
|---|---|---|---|---|---|---|---|---|---|---|---|---|---|---|---|---|---|---|---|---|---|---|---|---|---|---|
| 00 | 00 | 00 | 00 | 00 | 00 | 00 | 00 | 00 | 1D | 00 | 00 | 00 | 04 | 04 | 04 | 00 | 04 | 3A | 00 | 00 | 04 | 04 | 04 | 00 | 04 | 00 |
| 02 | 00 | 00 | 00 | 00 | 00 | 00 | 04 | 00 | 1F | 00 | 00 | 00 | 04 | 04 | 04 | 04 | 04 | 3C | 00 | 00 | 04 | 04 | 04 | 04 | 00 | 00 |
| 03 | 00 | 00 | 00 | 00 | 00 | 00 | 04 | 04 | 20 | 00 | 00 | 04 | 00 | 00 | 00 | 00 | 00 | 3D | 00 | 00 | 04 | 04 | 04 | 04 | 00 | 04 |
| 04 | 00 | 00 | 00 | 00 | 00 | 04 | 00 | 00 | 21 | 00 | 00 | 04 | 00 | 00 | 00 | 00 | 04 | 3E | 00 | 00 | 04 | 04 | 04 | 04 | 04 | 00 |
| 05 | 00 | 00 | 00 | 00 | 00 | 04 | 00 | 04 | 22 | 00 | 00 | 04 | 00 | 00 | 00 | 04 | 00 | 3F | 00 | 00 | 04 | 04 | 04 | 04 | 04 | 04 |
| 06 | 00 | 00 | 00 | 00 | 00 | 04 | 04 | 00 | 23 | 00 | 00 | 04 | 00 | 00 | 00 | 04 | 04 | 40 | 00 | 04 | 00 | 00 | 00 | 00 | 00 | 00 |
| 07 | 00 | 00 | 00 | 00 | 00 | 04 | 04 | 04 | 24 | 00 | 00 | 04 | 00 | 00 | 04 | 00 | 00 | 41 | 00 | 04 | 00 | 00 | 00 | 00 | 00 | 04 |
| 08 | 00 | 00 | 00 | 00 | 04 | 00 | 00 | 00 | 25 | 00 | 00 | 04 | 00 | 00 | 04 | 00 | 04 | 42 | 00 | 04 | 00 | 00 | 00 | 00 | 04 | 00 |
| 09 | 00 | 00 | 00 | 00 | 04 | 00 | 00 | 04 | 26 | 00 | 00 | 04 | 00 | 00 | 04 | 04 | 00 | 43 | 00 | 04 | 00 | 00 | 00 | 00 | 04 | 04 |
| 0A | 00 | 00 | 00 | 00 | 04 | 00 | 04 | 00 | 27 | 00 | 00 | 04 | 00 | 00 | 04 | 04 | 04 | 44 | 00 | 04 | 00 | 00 | 00 | 04 | 00 | 00 |
| 0B | 00 | 00 | 00 | 00 | 04 | 00 | 04 | 04 | 28 | 00 | 00 | 04 | 00 | 04 | 00 | 00 | 00 | 45 | 00 | 04 | 00 | 00 | 00 | 04 | 00 | 04 |
| 0C | 00 | 00 | 00 | 00 | 04 | 04 | 00 | 00 | 29 | 00 | 00 | 04 | 00 | 04 | 00 | 00 | 04 | 46 | 00 | 04 | 00 | 00 | 00 | 04 | 04 | 00 |
| 0D | 00 | 00 | 00 | 00 | 04 | 04 | 00 | 04 | 2A | 00 | 00 | 04 | 00 | 04 | 00 | 04 | 00 | 47 | 00 | 04 | 00 | 00 | 00 | 04 | 04 | 04 |
| 0E | 00 | 00 | 00 | 00 | 04 | 04 | 04 | 00 | 2B | 00 | 00 | 04 | 00 | 04 | 00 | 04 | 04 | 48 | 00 | 04 | 00 | 00 | 04 | 00 | 00 | 00 |
| 0F | 00 | 00 | 00 | 00 | 04 | 04 | 04 | 04 | 2C | 00 | 00 | 04 | 00 | 04 | 04 | 00 | 00 | 49 | 00 | 04 | 00 | 00 | 04 | 00 | 00 | 04 |
| 10 | 00 | 00 | 00 | 04 | 00 | 00 | 00 | 00 | 2D | 00 | 00 | 04 | 00 | 04 | 04 | 00 | 04 | 4A | 00 | 04 | 00 | 00 | 04 | 00 | 04 | 00 |
| 11 | 00 | 00 | 00 | 04 | 00 | 00 | 00 | 04 | 2E | 00 | 00 | 04 | 00 | 04 | 04 | 04 | 00 | 4B | 00 | 04 | 00 | 00 | 04 | 00 | 04 | 04 |
| 12 | 00 | 00 | 00 | 04 | 00 | 00 | 04 | 00 | 2F | 00 | 00 | 04 | 00 | 04 | 04 | 04 | 04 | 4C | 00 | 04 | 00 | 00 | 04 | 04 | 00 | 00 |
| 13 | 00 | 00 | 00 | 04 | 00 | 00 | 04 | 04 | 30 | 00 | 00 | 04 | 04 | 00 | 00 | 00 | 00 | 4D | 00 | 04 | 00 | 00 | 04 | 04 | 00 | 04 |
| 14 | 00 | 00 | 00 | 04 | 00 | 04 | 00 | 00 | 31 | 00 | 00 | 04 | 04 | 00 | 00 | 00 | 04 | 4E | 00 | 04 | 00 | 00 | 04 | 04 | 04 | 00 |
| 15 | 00 | 00 | 00 | 04 | 00 | 04 | 00 | 04 | 32 | 00 | 00 | 04 | 04 | 00 | 00 | 04 | 00 | 4F | 00 | 04 | 00 | 00 | 04 | 04 | 04 | 04 |
| 16 | 00 | 00 | 00 | 04 | 00 | 04 | 04 | 00 | 33 | 00 | 00 | 04 | 04 | 00 | 00 | 04 | 04 | 50 | 00 | 04 | 00 | 04 | 00 | 00 | 00 | 00 |
| 17 | 00 | 00 | 00 | 04 | 00 | 04 | 04 | 04 | 34 | 00 | 00 | 04 | 04 | 00 | 04 | 00 | 00 | 51 | 00 | 04 | 00 | 04 | 00 | 00 | 00 | 04 |
| 18 | 00 | 00 | 00 | 04 | 04 | 00 | 00 | 00 | 35 | 00 | 00 | 04 | 04 | 00 | 04 | 00 | 04 | 52 | 00 | 04 | 00 | 04 | 00 | 00 | 04 | 00 |
| 19 | 00 | 00 | 00 | 04 | 04 | 00 | 00 | 04 | 36 | 00 | 00 | 04 | 04 | 00 | 04 | 04 | 00 | 53 | 00 | 04 | 00 | 04 | 00 | 00 | 04 | 04 |
| 1A | 00 | 00 | 00 | 04 | 04 | 00 | 04 | 00 | 37 | 00 | 00 | 04 | 04 | 00 | 04 | 04 | 04 | 54 | 00 | 04 | 00 | 04 | 00 | 04 | 00 | 00 |
| 1B | 00 | 00 | 00 | 04 | 04 | 00 | 04 | 04 | 38 | 00 | 00 | 04 | 04 | 04 | 00 | 00 | 00 | 55 | 00 | 04 | 00 | 04 | 00 | 04 | 00 | 04 |
| 1C | 00 | 00 | 00 | 04 | 04 | 04 | 00 | 00 | 39 | 00 | 00 | 04 | 04 | 04 | 00 | 00 | 04 | 56 | 00 | 04 | 00 | 04 | 00 | 04 | 04 | 00 |
| 57 | 00 | 04 | 00 | 04 | 00 | 04 | 04 | 04 | 74 | 00 | 04 | 04 | 04 | 00 | 04 | 00 | 00 | 91 | 04 | 00 | 00 | 04 | 00 | 00 | 00 | 04 |
| 58 | 00 | 04 | 00 | 04 | 04 | 00 | 00 | 00 | 75 | 00 | 04 | 04 | 04 | 00 | 04 | 00 | 04 | 92 | 04 | 00 | 00 | 04 | 00 | 00 | 04 | 00 |
| 59 | 00 | 04 | 00 | 04 | 04 | 00 | 00 | 04 | 76 | 00 | 04 | 04 | 04 | 00 | 04 | 04 | 00 | 93 | 04 | 00 | 00 | 04 | 00 | 00 | 04 | 04 |
| 5A | 00 | 04 | 00 | 04 | 04 | 00 | 04 | 00 | 77 | 00 | 04 | 04 | 04 | 00 | 04 | 04 | 04 | 94 | 04 | 00 | 00 | 04 | 00 | 04 | 00 | 00 |
| 5B | 00 | 04 | 00 | 04 | 04 | 00 | 04 | 04 | 78 | 00 | 04 | 04 | 04 | 04 | 00 | 00 | 00 | 95 | 04 | 00 | 00 | 04 | 00 | 04 | 00 | 04 |
| 5C | 00 | 04 | 00 | 04 | 04 | 04 | 00 | 00 | 79 | 00 | 04 | 04 | 04 | 04 | 00 | 00 | 04 | 96 | 04 | 00 | 00 | 04 | 00 | 04 | 04 | 00 |
| 5D | 00 | 04 | 00 | 04 | 04 | 04 | 00 | 04 | 7A | 00 | 04 | 04 | 04 | 04 | 00 | 04 | 00 | 97 | 04 | 00 | 00 | 04 | 00 | 04 | 04 | 04 |
| 5E | 00 | 04 | 00 | 04 | 04 | 04 | 04 | 00 | 7B | 00 | 04 | 04 | 04 | 04 | 00 | 04 | 04 | 98 | 04 | 00 | 00 | 04 | 04 | 00 | 00 | 00 |
| 5F | 00 | 04 | 00 | 04 | 04 | 04 | 04 | 04 | 7C | 00 | 04 | 04 | 04 | 04 | 04 | 00 | 00 | 99 | 04 | 00 | 00 | 04 | 04 | 00 | 00 | 04 |
| 60 | 00 | 04 | 04 | 00 | 00 | 00 | 00 | 00 | 7D | 00 | 04 | 04 | 04 | 04 | 04 | 00 | 04 | 9A | 04 | 00 | 00 | 04 | 04 | 00 | 04 | 00 |
| 61 | 00 | 04 | 04 | 00 | 00 | 00 | 00 | 04 | 7E | 00 | 04 | 04 | 04 | 04 | 04 | 04 | 00 | 9B | 04 | 00 | 00 | 04 | 04 | 00 | 04 | 04 |
| 62 | 00 | 04 | 04 | 00 | 00 | 00 | 04 | 00 | 7F | 00 | 04 | 04 | 04 | 04 | 04 | 04 | 04 | 9C | 04 | 00 | 00 | 04 | 04 | 04 | 00 | 00 |
| 63 | 00 | 04 | 04 | 00 | 00 | 00 | 04 | 04 | 80 | 04 | 00 | 00 | 00 | 00 | 00 | 00 | 00 | 9D | 04 | 00 | 00 | 04 | 04 | 04 | 00 | 04 |
| 64 | 00 | 04 | 04 | 00 | 00 | 04 | 00 | 00 | 81 | 04 | 00 | 00 | 00 | 00 | 00 | 00 | 04 | 9E | 04 | 00 | 00 | 04 | 04 | 04 | 04 | 00 |
| 65 | 00 | 04 | 04 | 00 | 00 | 04 | 00 | 04 | 82 | 04 | 00 | 00 | 00 | 00 | 00 | 04 | 00 | 9F | 04 | 00 | 00 | 04 | 04 | 04 | 04 | 04 |
| 66 | 00 | 04 | 04 | 00 | 00 | 04 | 04 | 00 | 83 | 04 | 00 | 00 | 00 | 00 | 00 | 04 | 04 | A0 | 04 | 00 | 04 | 00 | 00 | 00 | 00 | 00 |
| 67 | 00 | 04 | 04 | 00 | 00 | 04 | 04 | 04 | 84 | 04 | 00 | 00 | 00 | 00 | 04 | 00 | 00 | A1 | 04 | 00 | 04 | 00 | 00 | 00 | 00 | 04 |
| 68 | 00 | 04 | 04 | 00 | 04 | 00 | 00 | 00 | 85 | 04 | 00 | 00 | 00 | 00 | 04 | 00 | 04 | A2 | 04 | 00 | 04 | 00 | 00 | 00 | 04 | 00 |
| 69 | 00 | 04 | 04 | 00 | 04 | 00 | 00 | 04 | 86 | 04 | 00 | 00 | 00 | 00 | 04 | 04 | 00 | A3 | 04 | 00 | 04 | 00 | 00 | 00 | 04 | 04 |
| 6A | 00 | 04 | 04 | 00 | 04 | 00 | 04 | 00 | 87 | 04 | 00 | 00 | 00 | 00 | 04 | 04 | 04 | A4 | 04 | 00 | 04 | 00 | 00 | 04 | 00 | 00 |
| 6B | 00 | 04 | 04 | 00 | 04 | 00 | 04 | 04 | 88 | 04 | 00 | 00 | 00 | 04 | 00 | 00 | 00 | A5 | 04 | 00 | 04 | 00 | 00 | 04 | 00 | 04 |
| 6C | 00 | 04 | 04 | 00 | 04 | 04 | 00 | 00 | 89 | 04 | 00 | 00 | 00 | 04 | 00 | 00 | 04 | A6 | 04 | 00 | 04 | 00 | 00 | 04 | 04 | 00 |
| 6D | 00 | 04 | 04 | 00 | 04 | 04 | 00 | 04 | 8A | 04 | 00 | 00 | 00 | 04 | 00 | 04 | 00 | A7 | 04 | 00 | 04 | 00 | 00 | 04 | 04 | 04 |
| 6E | 00 | 04 | 04 | 00 | 04 | 04 | 04 | 00 | 8B | 04 | 00 | 00 | 00 | 04 | 00 | 04 | 04 | A8 | 04 | 00 | 04 | 00 | 04 | 00 | 00 | 00 |
| 6F | 00 | 04 | 04 | 00 | 04 | 04 | 04 | 04 | 8C | 04 | 00 | 00 | 00 | 04 | 04 | 00 | 00 | A9 | 04 | 00 | 04 | 00 | 04 | 00 | 00 | 04 |
| 70 | 00 | 04 | 04 | 04 | 00 | 00 | 00 | 00 | 8D | 04 | 00 | 00 | 00 | 04 | 04 | 00 | 04 | AA | 04 | 00 | 04 | 00 | 04 | 00 | 04 | 00 |
| 71 | 00 | 04 | 04 | 04 | 00 | 00 | 00 | 04 | 8E | 04 | 00 | 00 | 00 | 04 | 04 | 04 | 00 | AB | 04 | 00 | 04 | 00 | 04 | 00 | 04 | 04 |
| 72 | 00 | 04 | 04 | 04 | 00 | 00 | 04 | 00 | 8F | 04 | 00 | 00 | 00 | 04 | 04 | 04 | 04 | AC | 04 | 00 | 04 | 00 | 04 | 04 | 00 | 00 |
| 73 | 00 | 04 | 04 | 04 | 00 | 00 | 04 | 04 | 90 | 04 | 00 | 00 | 04 | 00 | 00 | 00 | 00 | AD | 04 | 00 | 04 | 00 | 04 | 04 | 00 | 04 |
| AE | 04 | 00 | 04 | 00 | 04 | 04 | 04 | 00 | CB | 04 | 04 | 00 | 00 | 04 | 00 | 04 | 04 | E8 | 04 | 04 | 04 | 00 | 04 | 00 | 00 | 00 |
| AF | 04 | 00 | 04 | 00 | 04 | 04 | 04 | 04 | CC | 04 | 04 | 00 | 00 | 04 | 04 | 00 | 00 | E9 | 04 | 04 | 04 | 00 | 04 | 00 | 00 | 04 |
| B0 | 04 | 00 | 04 | 04 | 00 | 00 | 00 | 00 | CD | 04 | 04 | 00 | 00 | 04 | 04 | 00 | 04 | EA | 04 | 04 | 04 | 00 | 04 | 00 | 04 | 00 |
| B1 | 04 | 00 | 04 | 04 | 00 | 00 | 00 | 04 | CE | 04 | 04 | 00 | 00 | 04 | 04 | 04 | 00 | EB | 04 | 04 | 04 | 00 | 04 | 00 | 04 | 04 |
| B2 | 04 | 00 | 04 | 04 | 00 | 00 | 04 | 00 | CF | 04 | 04 | 00 | 00 | 04 | 04 | 04 | 04 | EC | 04 | 04 | 04 | 00 | 04 | 04 | 00 | 00 |
| B3 | 04 | 00 | 04 | 04 | 00 | 00 | 04 | 04 | D0 | 04 | 04 | 00 | 04 | 00 | 00 | 00 | 00 | ED | 04 | 04 | 04 | 00 | 04 | 04 | 00 | 04 |
| B4 | 04 | 00 | 04 | 04 | 00 | 04 | 00 | 00 | D1 | 04 | 04 | 00 | 04 | 00 | 00 | 00 | 04 | EE | 04 | 04 | 04 | 00 | 04 | 04 | 04 | 00 |
| B5 | 04 | 00 | 04 | 00 | 00 | 04 | 00 | 04 | D2 | 04 | 04 | 00 | 04 | 00 | 00 | 04 | 00 | EF | 04 | 04 | 04 | 00 | 04 | 04 | 04 | 04 |
| B6 | 04 | 00 | 04 | 04 | 00 | 04 | 04 | 00 | D3 | 04 | 04 | 00 | 04 | 00 | 00 | 04 | 04 | F0 | 04 | 04 | 04 | 04 | 00 | 00 | 00 | 00 |
| B7 | 04 | 00 | 04 | 04 | 00 | 04 | 04 | 04 | D4 | 04 | 04 | 00 | 04 | 00 | 04 | 00 | 00 | F1 | 04 | 04 | 04 | 04 | 00 | 00 | 00 | 04 |
| B8 | 04 | 00 | 04 | 04 | 04 | 00 | 00 | 00 | D5 | 04 | 04 | 00 | 04 | 00 | 04 | 00 | 04 | F2 | 04 | 04 | 04 | 04 | 00 | 00 | 04 | 00 |
| B9 | 04 | 00 | 04 | 04 | 04 | 00 | 00 | 04 | D6 | 04 | 04 | 00 | 04 | 00 | 04 | 04 | 00 | F3 | 04 | 04 | 04 | 04 | 00 | 00 | 04 | 04 |
| BA | 04 | 00 | 04 | 04 | 04 | 00 | 04 | 00 | D7 | 04 | 04 | 00 | 04 | 00 | 04 | 04 | 04 | F4 | 04 | 04 | 04 | 04 | 00 | 04 | 00 | 00 |
| BB | 04 | 00 | 04 | 04 | 04 | 00 | 04 | 04 | D8 | 04 | 04 | 00 | 04 | 04 | 00 | 00 | 00 | F5 | 04 | 04 | 04 | 04 | 00 | 04 | 00 | 04 |
| BC | 04 | 00 | 04 | 04 | 04 | 04 | 00 | 00 | D9 | 04 | 04 | 00 | 04 | 04 | 00 | 00 | 04 | F6 | 04 | 04 | 04 | 04 | 00 | 04 | 04 | 00 |
| BD | 04 | 00 | 04 | 04 | 04 | 04 | 00 | 04 | DA | 04 | 04 | 00 | 04 | 04 | 00 | 04 | 00 | F7 | 04 | 04 | 04 | 04 | 00 | 04 | 04 | 04 |
| BE | 04 | 00 | 04 | 04 | 04 | 04 | 04 | 00 | DB | 04 | 04 | 00 | 04 | 04 | 00 | 04 | 04 | F8 | 04 | 04 | 04 | 04 | 04 | 00 | 00 | 00 |
| BF | 04 | 00 | 04 | 04 | 04 | 04 | 04 | 04 | DC | 04 | 04 | 00 | 04 | 04 | 04 | 00 | 00 | F9 | 04 | 04 | 04 | 04 | 04 | 00 | 00 | 04 |
| C0 | 04 | 04 | 00 | 00 | 00 | 00 | 00 | 00 | DD | 04 | 04 | 00 | 04 | 04 | 04 | 00 | 04 | FA | 04 | 04 | 04 | 04 | 04 | 00 | 04 | 00 |
| C1 | 04 | 04 | 00 | 00 | 00 | 00 | 00 | 04 | DE | 04 | 04 | 00 | 04 | 04 | 04 | 04 | 00 | FB | 04 | 04 | 04 | 04 | 04 | 00 | 04 | 04 |
| C2 | 04 | 04 | 00 | 00 | 00 | 00 | 04 | 00 | DF | 04 | 04 | 00 | 04 | 04 | 04 | 04 | 04 | FC | 04 | 04 | 04 | 04 | 04 | 04 | 00 | 00 |

-continued 1-bit Mode - Destination Column 5

| Src Byte | Destination Row 0 | 1 | 2 | 3 | 4 | 5 | 6 | 7 | Src Byte | Destination Row 0 | 1 | 2 | 3 | 4 | 5 | 6 | 7 | Src Byte | Destination Row 0 | 1 | 2 | 3 | 4 | 5 | 6 | 7 |
|---|---|---|---|---|---|---|---|---|---|---|---|---|---|---|---|---|---|---|---|---|---|---|---|---|---|---|
| C3 | 04 | 04 | 00 | 00 | 00 | 00 | 04 | 04 | E0 | 04 | 04 | 04 | 00 | 00 | 00 | 00 | 00 | FD | 04 | 04 | 04 | 04 | 04 | 04 | 00 | 04 |
| C4 | 04 | 04 | 00 | 00 | 00 | 04 | 00 | 00 | E1 | 04 | 04 | 04 | 00 | 00 | 00 | 00 | 04 | FE | 04 | 04 | 04 | 04 | 04 | 04 | 04 | 00 |
| C5 | 04 | 04 | 00 | 00 | 00 | 04 | 00 | 04 | E2 | 04 | 04 | 04 | 00 | 00 | 00 | 04 | 00 | FF | 04 | 04 | 04 | 04 | 04 | 04 | 04 | 04 |
| C6 | 04 | 04 | 00 | 00 | 00 | 04 | 04 | 00 | E3 | 04 | 04 | 04 | 00 | 00 | 00 | 04 | 04 | | | | | | | | | |
| C7 | 04 | 04 | 00 | 00 | 00 | 04 | 04 | 04 | E4 | 04 | 04 | 04 | 00 | 00 | 04 | 00 | 00 | | | | | | | | | |
| C8 | 04 | 04 | 00 | 00 | 04 | 00 | 00 | 00 | E5 | 04 | 04 | 04 | 00 | 00 | 04 | 00 | 04 | | | | | | | | | |
| C9 | 04 | 04 | 00 | 00 | 04 | 00 | 00 | 04 | E6 | 04 | 04 | 04 | 00 | 00 | 04 | 04 | 00 | | | | | | | | | |
| CA | 04 | 04 | 00 | 00 | 04 | 00 | 04 | 00 | E7 | 04 | 04 | 04 | 00 | 00 | 04 | 04 | 04 | | | | | | | | | |

1-bit Mode - Destination Column 6

| Src Byte | Destination Row 0 | 1 | 2 | 3 | 4 | 5 | 6 | 7 | Src Byte | Destination Row 0 | 1 | 2 | 3 | 4 | 5 | 6 | 7 | Src Byte | Destination Row 0 | 1 | 2 | 3 | 4 | 5 | 6 | 7 |
|---|---|---|---|---|---|---|---|---|---|---|---|---|---|---|---|---|---|---|---|---|---|---|---|---|---|---|
| 00 | 00 | 00 | 00 | 00 | 00 | 00 | 00 | 00 | 1D | 00 | 00 | 00 | 02 | 02 | 02 | 00 | 02 | 3A | 00 | 00 | 02 | 02 | 02 | 00 | 02 | 00 |
| 01 | 00 | 00 | 00 | 00 | 00 | 00 | 00 | 02 | 1E | 00 | 00 | 00 | 02 | 02 | 02 | 02 | 00 | 3B | 00 | 00 | 02 | 02 | 02 | 00 | 02 | 02 |
| 02 | 00 | 00 | 00 | 00 | 00 | 00 | 02 | 00 | 1F | 00 | 00 | 00 | 02 | 02 | 02 | 02 | 02 | 3C | 00 | 00 | 02 | 02 | 02 | 02 | 00 | 00 |
| 03 | 00 | 00 | 00 | 00 | 00 | 00 | 02 | 02 | 20 | 00 | 00 | 02 | 00 | 00 | 00 | 00 | 00 | 3D | 00 | 00 | 02 | 02 | 02 | 02 | 00 | 02 |
| 04 | 00 | 00 | 00 | 00 | 00 | 02 | 00 | 00 | 21 | 00 | 00 | 02 | 00 | 00 | 00 | 00 | 02 | 3E | 00 | 00 | 02 | 02 | 02 | 02 | 02 | 00 |
| 05 | 00 | 00 | 00 | 00 | 00 | 02 | 00 | 02 | 22 | 00 | 00 | 02 | 00 | 00 | 00 | 02 | 00 | 3F | 00 | 00 | 02 | 02 | 02 | 02 | 02 | 02 |
| 06 | 00 | 00 | 00 | 00 | 00 | 02 | 02 | 00 | 23 | 00 | 00 | 02 | 00 | 00 | 00 | 02 | 02 | 40 | 00 | 02 | 00 | 00 | 00 | 00 | 00 | 00 |
| 07 | 00 | 00 | 00 | 00 | 00 | 02 | 02 | 02 | 24 | 00 | 00 | 02 | 00 | 00 | 02 | 00 | 00 | 41 | 00 | 02 | 00 | 00 | 00 | 00 | 00 | 02 |
| 08 | 00 | 00 | 00 | 00 | 02 | 00 | 00 | 00 | 25 | 00 | 00 | 02 | 00 | 00 | 02 | 00 | 02 | 42 | 00 | 02 | 00 | 00 | 00 | 00 | 02 | 00 |
| 09 | 00 | 00 | 00 | 00 | 02 | 00 | 00 | 02 | 26 | 00 | 00 | 02 | 00 | 00 | 02 | 02 | 00 | 43 | 00 | 02 | 00 | 00 | 00 | 00 | 02 | 02 |
| 0A | 00 | 00 | 00 | 00 | 02 | 00 | 02 | 00 | 27 | 00 | 00 | 02 | 00 | 00 | 02 | 02 | 02 | 44 | 00 | 02 | 00 | 00 | 00 | 02 | 00 | 00 |
| 0B | 00 | 00 | 00 | 00 | 02 | 00 | 02 | 02 | 28 | 00 | 00 | 02 | 00 | 02 | 00 | 00 | 00 | 45 | 00 | 02 | 00 | 00 | 00 | 02 | 00 | 02 |
| 0C | 00 | 00 | 00 | 00 | 02 | 02 | 00 | 00 | 29 | 00 | 00 | 02 | 00 | 02 | 00 | 00 | 02 | 46 | 00 | 02 | 00 | 00 | 00 | 02 | 02 | 00 |
| 0D | 00 | 00 | 00 | 00 | 02 | 02 | 00 | 02 | 2A | 00 | 00 | 02 | 00 | 02 | 00 | 02 | 00 | 47 | 00 | 02 | 00 | 00 | 00 | 02 | 02 | 02 |
| 0E | 00 | 00 | 00 | 00 | 02 | 02 | 02 | 00 | 2B | 00 | 00 | 02 | 00 | 02 | 00 | 02 | 02 | 48 | 00 | 02 | 00 | 00 | 02 | 00 | 00 | 00 |
| 0F | 00 | 00 | 00 | 00 | 02 | 02 | 02 | 02 | 2C | 00 | 00 | 02 | 00 | 02 | 02 | 00 | 00 | 49 | 00 | 02 | 00 | 00 | 02 | 00 | 00 | 02 |
| 10 | 00 | 00 | 00 | 02 | 00 | 00 | 00 | 00 | 2D | 00 | 00 | 02 | 00 | 02 | 02 | 00 | 02 | 4A | 00 | 02 | 00 | 00 | 02 | 00 | 02 | 00 |
| 11 | 00 | 00 | 00 | 02 | 00 | 00 | 00 | 02 | 2E | 00 | 00 | 02 | 00 | 02 | 02 | 02 | 00 | 4B | 00 | 02 | 00 | 00 | 02 | 00 | 02 | 02 |
| 12 | 00 | 00 | 00 | 02 | 00 | 00 | 02 | 00 | 2F | 00 | 00 | 02 | 00 | 02 | 02 | 02 | 02 | 4C | 00 | 02 | 00 | 00 | 02 | 02 | 00 | 00 |
| 13 | 00 | 00 | 00 | 02 | 00 | 00 | 02 | 02 | 30 | 00 | 00 | 02 | 02 | 00 | 00 | 00 | 00 | 4D | 00 | 02 | 00 | 00 | 02 | 02 | 00 | 02 |
| 14 | 00 | 00 | 00 | 02 | 00 | 02 | 00 | 00 | 31 | 00 | 00 | 02 | 02 | 00 | 00 | 00 | 02 | 4E | 00 | 02 | 00 | 00 | 02 | 02 | 02 | 00 |
| 15 | 00 | 00 | 00 | 02 | 00 | 02 | 00 | 02 | 32 | 00 | 00 | 02 | 02 | 00 | 00 | 02 | 00 | 4F | 00 | 02 | 00 | 00 | 02 | 02 | 02 | 02 |
| 16 | 00 | 00 | 00 | 02 | 00 | 02 | 02 | 00 | 33 | 00 | 00 | 02 | 02 | 00 | 00 | 02 | 02 | 50 | 00 | 02 | 00 | 02 | 00 | 00 | 00 | 00 |
| 17 | 00 | 00 | 00 | 02 | 00 | 02 | 02 | 02 | 34 | 00 | 00 | 02 | 02 | 00 | 02 | 00 | 00 | 51 | 00 | 02 | 00 | 02 | 00 | 00 | 00 | 02 |
| 18 | 00 | 00 | 00 | 02 | 02 | 00 | 00 | 00 | 35 | 00 | 00 | 02 | 02 | 00 | 02 | 00 | 02 | 52 | 00 | 02 | 00 | 02 | 00 | 00 | 02 | 00 |
| 19 | 00 | 00 | 00 | 02 | 02 | 00 | 00 | 02 | 36 | 00 | 00 | 02 | 02 | 00 | 02 | 02 | 00 | 53 | 00 | 02 | 00 | 02 | 00 | 00 | 02 | 02 |
| 1A | 00 | 00 | 00 | 02 | 02 | 00 | 02 | 00 | 37 | 00 | 00 | 02 | 02 | 00 | 02 | 02 | 02 | 54 | 00 | 02 | 00 | 02 | 00 | 02 | 00 | 00 |
| 1B | 00 | 00 | 00 | 02 | 02 | 00 | 02 | 02 | 38 | 00 | 00 | 02 | 02 | 02 | 00 | 00 | 00 | 55 | 00 | 02 | 00 | 02 | 00 | 02 | 00 | 02 |
| 1C | 00 | 00 | 00 | 02 | 02 | 02 | 00 | 00 | 39 | 00 | 00 | 02 | 02 | 02 | 00 | 00 | 02 | 56 | 00 | 02 | 00 | 02 | 00 | 02 | 02 | 00 |
| 57 | 00 | 02 | 00 | 02 | 00 | 02 | 02 | 02 | 74 | 00 | 02 | 02 | 02 | 00 | 02 | 00 | 00 | 91 | 02 | 00 | 00 | 02 | 00 | 00 | 00 | 02 |
| 58 | 00 | 02 | 00 | 02 | 02 | 00 | 00 | 00 | 75 | 00 | 02 | 02 | 02 | 00 | 02 | 00 | 02 | 92 | 02 | 00 | 00 | 02 | 00 | 00 | 02 | 00 |
| 59 | 00 | 02 | 00 | 02 | 02 | 00 | 00 | 02 | 76 | 00 | 02 | 02 | 02 | 00 | 02 | 02 | 00 | 93 | 02 | 00 | 00 | 02 | 00 | 00 | 02 | 02 |
| 5A | 00 | 02 | 00 | 02 | 02 | 00 | 02 | 00 | 77 | 00 | 02 | 02 | 02 | 00 | 02 | 02 | 02 | 94 | 02 | 00 | 00 | 02 | 00 | 02 | 00 | 00 |
| 5B | 00 | 02 | 00 | 02 | 02 | 00 | 02 | 02 | 78 | 00 | 02 | 02 | 02 | 02 | 00 | 00 | 00 | 95 | 02 | 00 | 00 | 02 | 00 | 02 | 00 | 02 |
| 5C | 00 | 02 | 00 | 02 | 02 | 02 | 00 | 00 | 79 | 00 | 02 | 02 | 02 | 02 | 00 | 00 | 02 | 96 | 02 | 00 | 00 | 02 | 00 | 02 | 02 | 00 |
| 5D | 00 | 02 | 00 | 02 | 02 | 02 | 00 | 02 | 7A | 00 | 02 | 02 | 02 | 02 | 00 | 02 | 00 | 97 | 02 | 00 | 00 | 02 | 00 | 02 | 02 | 02 |
| 5E | 00 | 02 | 00 | 02 | 02 | 02 | 02 | 00 | 7B | 00 | 02 | 02 | 02 | 02 | 00 | 02 | 02 | 98 | 02 | 00 | 00 | 02 | 02 | 00 | 00 | 00 |
| 5F | 00 | 02 | 00 | 02 | 02 | 02 | 02 | 02 | 7C | 00 | 02 | 02 | 02 | 02 | 02 | 00 | 00 | 99 | 02 | 00 | 00 | 02 | 02 | 00 | 00 | 02 |
| 60 | 00 | 02 | 02 | 00 | 00 | 00 | 00 | 00 | 7D | 00 | 02 | 02 | 02 | 02 | 02 | 00 | 02 | 9A | 02 | 00 | 00 | 02 | 02 | 00 | 02 | 00 |
| 61 | 00 | 02 | 02 | 00 | 00 | 00 | 00 | 02 | 7E | 00 | 02 | 02 | 02 | 02 | 02 | 02 | 00 | 9B | 02 | 00 | 00 | 02 | 02 | 00 | 02 | 02 |
| 62 | 00 | 02 | 02 | 00 | 00 | 00 | 02 | 00 | 7F | 00 | 02 | 02 | 02 | 02 | 02 | 02 | 02 | 9C | 02 | 00 | 00 | 02 | 02 | 02 | 00 | 00 |
| 63 | 00 | 02 | 02 | 00 | 00 | 00 | 02 | 02 | 80 | 02 | 00 | 00 | 00 | 00 | 00 | 00 | 00 | 9D | 02 | 00 | 00 | 02 | 02 | 02 | 00 | 02 |
| 64 | 00 | 02 | 02 | 00 | 00 | 02 | 00 | 00 | 81 | 02 | 00 | 00 | 00 | 00 | 00 | 00 | 02 | 9E | 02 | 00 | 00 | 02 | 02 | 02 | 02 | 00 |
| 65 | 00 | 02 | 02 | 00 | 00 | 02 | 00 | 02 | 82 | 02 | 00 | 00 | 00 | 00 | 00 | 02 | 00 | 9F | 02 | 00 | 00 | 02 | 02 | 02 | 02 | 02 |
| 66 | 00 | 02 | 02 | 00 | 00 | 02 | 02 | 00 | 83 | 02 | 00 | 00 | 00 | 00 | 00 | 02 | 02 | A0 | 02 | 00 | 02 | 00 | 00 | 00 | 00 | 00 |
| 67 | 00 | 02 | 02 | 00 | 00 | 02 | 02 | 02 | 84 | 02 | 00 | 00 | 00 | 00 | 02 | 00 | 00 | A1 | 02 | 00 | 02 | 00 | 00 | 00 | 00 | 02 |
| 68 | 00 | 02 | 02 | 00 | 02 | 00 | 00 | 00 | 85 | 02 | 00 | 00 | 00 | 00 | 02 | 00 | 02 | A2 | 02 | 00 | 02 | 00 | 00 | 00 | 02 | 00 |
| 69 | 00 | 02 | 02 | 00 | 02 | 00 | 00 | 02 | 86 | 02 | 00 | 00 | 00 | 00 | 02 | 02 | 00 | A3 | 02 | 00 | 02 | 00 | 00 | 00 | 02 | 02 |
| 6A | 00 | 02 | 02 | 00 | 02 | 00 | 02 | 00 | 87 | 02 | 00 | 00 | 00 | 00 | 02 | 02 | 02 | A4 | 02 | 00 | 02 | 00 | 00 | 02 | 00 | 00 |
| 6B | 00 | 02 | 02 | 00 | 02 | 00 | 02 | 02 | 88 | 02 | 00 | 00 | 00 | 02 | 00 | 00 | 00 | A5 | 02 | 00 | 02 | 00 | 00 | 02 | 00 | 02 |
| 6C | 00 | 02 | 02 | 00 | 02 | 02 | 00 | 00 | 89 | 02 | 00 | 00 | 00 | 02 | 00 | 00 | 02 | A6 | 02 | 00 | 02 | 00 | 00 | 02 | 02 | 00 |
| 6D | 00 | 02 | 02 | 00 | 02 | 02 | 00 | 02 | 8A | 02 | 00 | 00 | 00 | 02 | 00 | 02 | 00 | A7 | 02 | 00 | 02 | 00 | 00 | 02 | 02 | 02 |
| 6E | 00 | 02 | 02 | 00 | 02 | 02 | 02 | 00 | 8B | 02 | 00 | 00 | 00 | 02 | 00 | 02 | 02 | A8 | 02 | 00 | 02 | 00 | 02 | 00 | 00 | 00 |
| 6F | 00 | 02 | 02 | 00 | 02 | 02 | 02 | 02 | 8C | 02 | 00 | 00 | 00 | 02 | 02 | 00 | 00 | A9 | 02 | 00 | 02 | 00 | 02 | 00 | 00 | 02 |
| 70 | 00 | 02 | 02 | 02 | 00 | 00 | 00 | 00 | 8D | 02 | 00 | 00 | 00 | 02 | 02 | 00 | 02 | AA | 02 | 00 | 02 | 00 | 02 | 00 | 02 | 00 |
| 71 | 00 | 02 | 02 | 02 | 00 | 00 | 00 | 02 | 8E | 02 | 00 | 00 | 00 | 02 | 02 | 02 | 00 | AB | 02 | 00 | 02 | 00 | 02 | 00 | 02 | 02 |
| 72 | 00 | 02 | 02 | 02 | 00 | 00 | 02 | 00 | 8F | 02 | 00 | 00 | 00 | 02 | 02 | 02 | 02 | AC | 02 | 00 | 02 | 00 | 02 | 02 | 00 | 00 |
| 73 | 00 | 02 | 02 | 02 | 00 | 00 | 02 | 02 | 90 | 02 | 00 | 00 | 02 | 00 | 00 | 00 | 00 | AD | 02 | 00 | 02 | 00 | 02 | 02 | 00 | 02 |
| AE | 02 | 00 | 02 | 00 | 02 | 02 | 02 | 00 | CB | 02 | 02 | 00 | 00 | 02 | 00 | 02 | 02 | E8 | 02 | 02 | 02 | 00 | 02 | 00 | 00 | 00 |
| AF | 02 | 00 | 02 | 00 | 02 | 02 | 02 | 02 | CC | 02 | 02 | 00 | 00 | 02 | 02 | 00 | 00 | E9 | 02 | 02 | 02 | 00 | 02 | 00 | 00 | 02 |
| B0 | 02 | 00 | 02 | 02 | 00 | 00 | 00 | 00 | CD | 02 | 02 | 00 | 00 | 02 | 02 | 00 | 02 | EA | 02 | 02 | 02 | 00 | 02 | 00 | 02 | 00 |
| B1 | 02 | 00 | 02 | 02 | 00 | 00 | 00 | 02 | CE | 02 | 02 | 00 | 00 | 02 | 02 | 02 | 00 | EB | 02 | 02 | 02 | 00 | 02 | 00 | 02 | 02 |

-continued 1-bit Mode - Destination Column 6

| Src | Destination Row | | | | | | | | Src | Destination Row | | | | | | | | Src | Destination Row | | | | | | | |
|---|---|---|---|---|---|---|---|---|---|---|---|---|---|---|---|---|---|---|---|---|---|---|---|---|---|---|
| Byte | 0 | 1 | 2 | 3 | 4 | 5 | 6 | 7 | Byte | 0 | 1 | 2 | 3 | 4 | 5 | 6 | 7 | Byte | 0 | 1 | 2 | 3 | 4 | 5 | 6 | 7 |
| B2 | 02 | 00 | 02 | 02 | 00 | 00 | 02 | 00 | CF | 02 | 02 | 00 | 00 | 02 | 02 | 02 | 02 | EC | 02 | 02 | 02 | 00 | 02 | 02 | 00 | 00 |
| B3 | 02 | 00 | 02 | 02 | 00 | 00 | 02 | 02 | D0 | 02 | 02 | 00 | 02 | 00 | 00 | 00 | 00 | ED | 02 | 02 | 02 | 00 | 02 | 02 | 00 | 02 |
| B4 | 02 | 00 | 02 | 02 | 00 | 02 | 00 | 00 | D1 | 02 | 02 | 00 | 02 | 00 | 00 | 00 | 02 | EE | 02 | 02 | 02 | 00 | 02 | 02 | 02 | 00 |
| B5 | 02 | 00 | 02 | 02 | 00 | 02 | 00 | 02 | D2 | 02 | 02 | 00 | 02 | 00 | 00 | 02 | 00 | EF | 02 | 02 | 02 | 00 | 02 | 02 | 02 | 02 |
| B6 | 02 | 00 | 02 | 02 | 00 | 02 | 02 | 00 | D3 | 02 | 02 | 00 | 02 | 00 | 00 | 02 | 02 | F0 | 02 | 02 | 02 | 02 | 00 | 00 | 00 | 00 |
| B7 | 02 | 00 | 02 | 02 | 00 | 02 | 02 | 02 | D4 | 02 | 02 | 00 | 02 | 00 | 02 | 00 | 00 | F1 | 02 | 02 | 02 | 02 | 00 | 00 | 00 | 02 |
| B8 | 02 | 00 | 02 | 02 | 02 | 00 | 00 | 00 | D5 | 02 | 02 | 00 | 02 | 00 | 02 | 00 | 02 | F2 | 02 | 02 | 02 | 02 | 00 | 00 | 02 | 00 |
| B9 | 02 | 00 | 02 | 02 | 02 | 00 | 00 | 02 | D6 | 02 | 02 | 00 | 02 | 00 | 02 | 02 | 00 | F3 | 02 | 02 | 02 | 02 | 00 | 00 | 02 | 02 |
| BA | 02 | 00 | 02 | 02 | 02 | 00 | 02 | 00 | D7 | 02 | 02 | 00 | 02 | 00 | 02 | 02 | 02 | F4 | 02 | 02 | 02 | 02 | 00 | 02 | 00 | 00 |
| BB | 02 | 00 | 02 | 02 | 02 | 00 | 02 | 02 | D8 | 02 | 02 | 00 | 02 | 02 | 00 | 00 | 00 | F5 | 02 | 02 | 02 | 02 | 00 | 02 | 00 | 02 |
| BC | 02 | 00 | 02 | 02 | 02 | 02 | 00 | 00 | D9 | 02 | 02 | 00 | 02 | 02 | 00 | 00 | 02 | F6 | 02 | 02 | 02 | 02 | 00 | 02 | 02 | 00 |
| BD | 02 | 00 | 02 | 02 | 02 | 02 | 00 | 02 | DA | 02 | 02 | 00 | 02 | 02 | 00 | 02 | 00 | F7 | 02 | 02 | 02 | 02 | 00 | 02 | 02 | 02 |
| BE | 02 | 00 | 02 | 02 | 02 | 02 | 02 | 00 | DB | 02 | 02 | 00 | 02 | 02 | 00 | 02 | 02 | F8 | 02 | 02 | 02 | 02 | 02 | 00 | 00 | 00 |
| BF | 02 | 00 | 02 | 02 | 02 | 02 | 02 | 02 | DC | 02 | 02 | 00 | 02 | 02 | 02 | 00 | 00 | F9 | 02 | 02 | 02 | 02 | 02 | 00 | 00 | 02 |
| C0 | 02 | 02 | 00 | 00 | 00 | 00 | 00 | 00 | DD | 02 | 02 | 00 | 02 | 02 | 02 | 00 | 02 | FA | 02 | 02 | 02 | 02 | 02 | 00 | 02 | 00 |
| C1 | 02 | 02 | 00 | 00 | 00 | 00 | 00 | 02 | DE | 02 | 02 | 00 | 02 | 02 | 02 | 02 | 00 | FB | 02 | 02 | 02 | 02 | 02 | 00 | 02 | 02 |
| C2 | 02 | 02 | 00 | 00 | 00 | 00 | 02 | 00 | DF | 02 | 02 | 00 | 02 | 02 | 02 | 02 | 02 | FC | 02 | 02 | 02 | 02 | 02 | 02 | 00 | 00 |
| C3 | 02 | 02 | 00 | 00 | 00 | 00 | 02 | 02 | E0 | 02 | 02 | 02 | 00 | 00 | 00 | 00 | 00 | FD | 02 | 02 | 02 | 02 | 02 | 02 | 00 | 02 |
| C4 | 02 | 02 | 00 | 00 | 00 | 02 | 00 | 00 | E1 | 02 | 02 | 02 | 00 | 00 | 00 | 00 | 02 | FE | 02 | 02 | 02 | 02 | 02 | 02 | 02 | 00 |
| C5 | 02 | 02 | 00 | 00 | 00 | 02 | 00 | 02 | E2 | 02 | 02 | 02 | 00 | 00 | 00 | 02 | 00 | FF | 02 | 02 | 02 | 02 | 02 | 02 | 02 | 02 |
| C6 | 02 | 02 | 00 | 00 | 00 | 02 | 02 | 00 | E3 | 02 | 02 | 02 | 00 | 00 | 00 | 02 | 02 | | | | | | | | | |
| C7 | 02 | 02 | 00 | 00 | 00 | 02 | 02 | 02 | E4 | 02 | 02 | 02 | 00 | 00 | 02 | 00 | 00 | | | | | | | | | |
| C8 | 02 | 02 | 00 | 00 | 02 | 00 | 00 | 00 | E5 | 02 | 02 | 02 | 00 | 00 | 02 | 00 | 02 | | | | | | | | | |
| C9 | 02 | 02 | 00 | 00 | 02 | 00 | 00 | 02 | E6 | 02 | 02 | 02 | 00 | 00 | 02 | 02 | 00 | | | | | | | | | |
| CA | 02 | 02 | 00 | 00 | 02 | 00 | 02 | 00 | E7 | 02 | 02 | 02 | 00 | 00 | 02 | 02 | 02 | | | | | | | | | |

1-bit Mode - Destination Column 7

| Src | Destination Row | | | | | | | | Src | Destination Row | | | | | | | | Src | Destination Row | | | | | | | |
|---|---|---|---|---|---|---|---|---|---|---|---|---|---|---|---|---|---|---|---|---|---|---|---|---|---|---|
| Byte | 0 | 1 | 2 | 3 | 4 | 5 | 6 | 7 | Byte | 0 | 1 | 2 | 3 | 4 | 5 | 6 | 7 | Byte | 0 | 1 | 2 | 3 | 4 | 5 | 6 | 7 |
| 00 | 00 | 00 | 00 | 00 | 00 | 00 | 00 | 00 | 1D | 00 | 00 | 00 | 01 | 01 | 01 | 00 | 01 | 3A | 00 | 00 | 01 | 01 | 01 | 00 | 01 | 00 |
| 01 | 00 | 00 | 00 | 00 | 00 | 00 | 00 | 01 | 1E | 00 | 00 | 00 | 01 | 01 | 01 | 01 | 00 | 3B | 00 | 00 | 01 | 01 | 01 | 00 | 01 | 01 |
| 02 | 00 | 00 | 00 | 00 | 00 | 00 | 01 | 00 | 1F | 00 | 00 | 00 | 01 | 01 | 01 | 01 | 01 | 3C | 00 | 00 | 01 | 01 | 01 | 01 | 00 | 00 |
| 03 | 00 | 00 | 00 | 00 | 00 | 00 | 01 | 01 | 20 | 00 | 00 | 01 | 00 | 00 | 00 | 00 | 00 | 3D | 00 | 00 | 01 | 01 | 01 | 01 | 00 | 01 |
| 04 | 00 | 00 | 00 | 00 | 00 | 01 | 00 | 00 | 21 | 00 | 00 | 01 | 00 | 00 | 00 | 00 | 01 | 3E | 00 | 00 | 01 | 01 | 01 | 01 | 01 | 00 |
| 05 | 00 | 00 | 00 | 00 | 00 | 01 | 00 | 01 | 22 | 00 | 00 | 01 | 00 | 00 | 00 | 01 | 00 | 3F | 00 | 00 | 01 | 01 | 01 | 01 | 01 | 01 |
| 06 | 00 | 00 | 00 | 00 | 00 | 01 | 01 | 00 | 23 | 00 | 00 | 01 | 00 | 00 | 00 | 01 | 01 | 40 | 00 | 01 | 00 | 00 | 00 | 00 | 00 | 00 |
| 07 | 00 | 00 | 00 | 00 | 00 | 01 | 01 | 01 | 24 | 00 | 00 | 01 | 00 | 00 | 01 | 00 | 00 | 41 | 00 | 01 | 00 | 00 | 00 | 00 | 00 | 01 |
| 08 | 00 | 00 | 00 | 00 | 01 | 00 | 00 | 00 | 25 | 00 | 00 | 01 | 00 | 00 | 01 | 00 | 01 | 42 | 00 | 01 | 00 | 00 | 00 | 00 | 01 | 00 |
| 09 | 00 | 00 | 00 | 00 | 01 | 00 | 00 | 01 | 26 | 00 | 00 | 01 | 00 | 00 | 01 | 01 | 00 | 43 | 00 | 01 | 00 | 00 | 00 | 00 | 01 | 01 |
| 0A | 00 | 00 | 00 | 00 | 01 | 00 | 01 | 00 | 27 | 00 | 00 | 01 | 00 | 00 | 01 | 01 | 01 | 44 | 00 | 01 | 00 | 00 | 00 | 01 | 00 | 00 |
| 0B | 00 | 00 | 00 | 00 | 01 | 00 | 01 | 01 | 28 | 00 | 00 | 01 | 00 | 01 | 00 | 00 | 00 | 45 | 00 | 01 | 00 | 00 | 00 | 01 | 00 | 01 |
| 0C | 00 | 00 | 00 | 00 | 01 | 01 | 00 | 00 | 29 | 00 | 00 | 01 | 00 | 01 | 00 | 00 | 01 | 46 | 00 | 01 | 00 | 00 | 00 | 01 | 01 | 00 |
| 0D | 00 | 00 | 00 | 00 | 01 | 01 | 00 | 01 | 2A | 00 | 00 | 01 | 00 | 01 | 00 | 01 | 00 | 47 | 00 | 01 | 00 | 00 | 00 | 01 | 01 | 01 |
| 0E | 00 | 00 | 00 | 00 | 01 | 01 | 01 | 00 | 2B | 00 | 00 | 01 | 00 | 01 | 00 | 01 | 01 | 48 | 00 | 01 | 00 | 00 | 01 | 00 | 00 | 00 |
| 0F | 00 | 00 | 00 | 00 | 01 | 01 | 01 | 01 | 2C | 00 | 00 | 01 | 00 | 01 | 01 | 00 | 00 | 49 | 00 | 01 | 00 | 00 | 01 | 00 | 00 | 01 |
| 10 | 00 | 00 | 00 | 01 | 00 | 00 | 00 | 00 | 2D | 00 | 00 | 01 | 00 | 01 | 01 | 00 | 01 | 4A | 00 | 01 | 00 | 00 | 01 | 00 | 01 | 00 |
| 11 | 00 | 00 | 00 | 01 | 00 | 00 | 00 | 01 | 2E | 00 | 00 | 01 | 00 | 01 | 01 | 01 | 00 | 4B | 00 | 01 | 00 | 00 | 01 | 00 | 01 | 01 |
| 12 | 00 | 00 | 00 | 01 | 00 | 00 | 01 | 00 | 2F | 00 | 00 | 01 | 00 | 01 | 01 | 01 | 01 | 4C | 00 | 01 | 00 | 00 | 01 | 01 | 00 | 00 |
| 13 | 00 | 00 | 00 | 01 | 00 | 00 | 01 | 01 | 30 | 00 | 00 | 01 | 01 | 00 | 00 | 00 | 00 | 4D | 00 | 01 | 00 | 00 | 01 | 01 | 00 | 01 |
| 14 | 00 | 00 | 00 | 01 | 00 | 01 | 00 | 00 | 31 | 00 | 00 | 01 | 01 | 00 | 00 | 00 | 01 | 4E | 00 | 01 | 00 | 00 | 01 | 01 | 01 | 00 |
| 15 | 00 | 00 | 00 | 01 | 00 | 01 | 00 | 01 | 32 | 00 | 00 | 01 | 01 | 00 | 00 | 01 | 00 | 4F | 00 | 01 | 00 | 00 | 01 | 01 | 01 | 01 |
| 16 | 00 | 00 | 00 | 01 | 00 | 01 | 01 | 00 | 33 | 00 | 00 | 01 | 01 | 00 | 00 | 01 | 01 | 50 | 00 | 01 | 00 | 01 | 00 | 00 | 00 | 00 |
| 17 | 00 | 00 | 00 | 01 | 00 | 01 | 01 | 01 | 34 | 00 | 00 | 01 | 01 | 00 | 01 | 00 | 00 | 51 | 00 | 01 | 00 | 01 | 00 | 00 | 00 | 01 |
| 18 | 00 | 00 | 00 | 01 | 01 | 00 | 00 | 00 | 35 | 00 | 00 | 01 | 01 | 00 | 01 | 00 | 01 | 52 | 00 | 01 | 00 | 01 | 00 | 00 | 01 | 00 |
| 19 | 00 | 00 | 00 | 01 | 01 | 00 | 00 | 01 | 36 | 00 | 00 | 01 | 01 | 00 | 01 | 01 | 00 | 53 | 00 | 01 | 00 | 01 | 00 | 00 | 01 | 01 |
| 1A | 00 | 00 | 00 | 01 | 01 | 00 | 01 | 00 | 37 | 00 | 00 | 01 | 01 | 00 | 01 | 01 | 01 | 54 | 00 | 01 | 00 | 01 | 00 | 01 | 00 | 00 |
| 1B | 00 | 00 | 00 | 01 | 01 | 00 | 01 | 01 | 38 | 00 | 00 | 01 | 01 | 01 | 00 | 00 | 00 | 55 | 00 | 01 | 00 | 01 | 00 | 01 | 00 | 01 |
| 1C | 00 | 00 | 00 | 01 | 01 | 01 | 00 | 00 | 39 | 00 | 00 | 01 | 01 | 01 | 00 | 00 | 01 | 56 | 00 | 01 | 00 | 01 | 00 | 01 | 01 | 00 |
| 57 | 00 | 01 | 00 | 01 | 00 | 01 | 01 | 01 | 74 | 00 | 01 | 01 | 01 | 00 | 01 | 00 | 00 | 91 | 01 | 00 | 00 | 01 | 00 | 00 | 00 | 01 |
| 58 | 00 | 01 | 00 | 01 | 01 | 00 | 00 | 00 | 75 | 00 | 01 | 01 | 01 | 00 | 01 | 00 | 01 | 92 | 01 | 00 | 00 | 01 | 00 | 00 | 01 | 00 |
| 59 | 00 | 01 | 00 | 01 | 01 | 00 | 00 | 01 | 76 | 00 | 01 | 01 | 01 | 00 | 01 | 01 | 00 | 93 | 01 | 00 | 00 | 01 | 00 | 00 | 01 | 01 |
| 5A | 00 | 01 | 00 | 01 | 01 | 00 | 01 | 00 | 77 | 00 | 01 | 01 | 01 | 00 | 01 | 01 | 01 | 94 | 01 | 00 | 00 | 01 | 00 | 01 | 00 | 00 |
| 5B | 00 | 01 | 00 | 01 | 01 | 00 | 01 | 01 | 78 | 00 | 01 | 01 | 01 | 01 | 00 | 00 | 00 | 95 | 01 | 00 | 00 | 01 | 00 | 01 | 00 | 01 |
| 5C | 00 | 01 | 00 | 01 | 01 | 01 | 00 | 00 | 79 | 00 | 01 | 01 | 01 | 01 | 00 | 00 | 01 | 96 | 01 | 00 | 00 | 01 | 00 | 01 | 01 | 00 |
| 5D | 00 | 01 | 00 | 01 | 01 | 01 | 00 | 01 | 7A | 00 | 01 | 01 | 01 | 01 | 00 | 01 | 00 | 97 | 01 | 00 | 00 | 01 | 00 | 01 | 01 | 01 |
| 5E | 00 | 01 | 00 | 01 | 01 | 01 | 01 | 00 | 7B | 00 | 01 | 01 | 01 | 01 | 00 | 01 | 01 | 98 | 01 | 00 | 00 | 01 | 01 | 00 | 00 | 00 |
| 5F | 00 | 01 | 00 | 01 | 01 | 01 | 01 | 01 | 7C | 00 | 01 | 01 | 01 | 01 | 01 | 00 | 00 | 99 | 01 | 00 | 00 | 01 | 01 | 00 | 00 | 01 |
| 60 | 00 | 01 | 01 | 00 | 00 | 00 | 00 | 00 | 7D | 00 | 01 | 01 | 01 | 01 | 01 | 00 | 01 | 9A | 01 | 00 | 00 | 01 | 01 | 00 | 01 | 00 |
| 61 | 00 | 01 | 01 | 00 | 00 | 00 | 00 | 01 | 7E | 00 | 01 | 01 | 01 | 01 | 01 | 01 | 00 | 9B | 01 | 00 | 00 | 01 | 01 | 00 | 01 | 01 |
| 62 | 00 | 01 | 01 | 00 | 00 | 00 | 01 | 00 | 7F | 00 | 01 | 01 | 01 | 01 | 01 | 01 | 01 | 9C | 01 | 00 | 00 | 01 | 01 | 01 | 00 | 00 |
| 63 | 00 | 01 | 01 | 00 | 00 | 00 | 01 | 01 | 80 | 01 | 00 | 00 | 00 | 00 | 00 | 00 | 00 | 9D | 01 | 00 | 00 | 01 | 01 | 01 | 00 | 01 |
| 64 | 00 | 01 | 01 | 00 | 00 | 01 | 00 | 00 | 81 | 01 | 00 | 00 | 00 | 00 | 00 | 00 | 01 | 9E | 01 | 00 | 00 | 01 | 01 | 01 | 01 | 00 |
| 65 | 00 | 01 | 01 | 00 | 00 | 01 | 00 | 01 | 82 | 01 | 00 | 00 | 00 | 00 | 00 | 01 | 00 | 9F | 01 | 00 | 00 | 01 | 01 | 01 | 01 | 01 |
| 66 | 00 | 01 | 01 | 00 | 00 | 01 | 01 | 00 | 83 | 01 | 00 | 00 | 00 | 00 | 00 | 01 | 01 | A0 | 01 | 00 | 01 | 00 | 00 | 00 | 00 | 00 |

-continued 1-bit Mode - Destination Column 7

| Src | Destination Row | | | | | | | | Src | Destination Row | | | | | | | | Src | Destination Row | | | | | | | |
|---|---|---|---|---|---|---|---|---|---|---|---|---|---|---|---|---|---|---|---|---|---|---|---|---|---|---|
| Byte | 0 | 1 | 2 | 3 | 4 | 5 | 6 | 7 | Byte | 0 | 1 | 2 | 3 | 4 | 5 | 6 | 7 | Byte | 0 | 1 | 2 | 3 | 4 | 5 | 6 | 7 |
| 67 | 00 | 01 | 01 | 00 | 00 | 01 | 01 | 01 | 84 | 01 | 00 | 00 | 00 | 00 | 01 | 00 | 00 | A1 | 01 | 00 | 01 | 00 | 00 | 00 | 00 | 01 |
| 68 | 00 | 01 | 01 | 00 | 01 | 00 | 00 | 00 | 85 | 01 | 00 | 00 | 00 | 00 | 01 | 00 | 01 | A2 | 01 | 00 | 01 | 00 | 00 | 00 | 01 | 00 |
| 69 | 00 | 01 | 01 | 00 | 01 | 00 | 00 | 01 | 86 | 01 | 00 | 00 | 00 | 00 | 01 | 01 | 00 | A3 | 01 | 00 | 01 | 00 | 00 | 00 | 01 | 01 |
| 6A | 00 | 01 | 01 | 00 | 01 | 00 | 01 | 00 | 87 | 01 | 00 | 00 | 00 | 00 | 01 | 01 | 01 | A4 | 01 | 00 | 01 | 00 | 00 | 01 | 00 | 00 |
| 6B | 00 | 01 | 01 | 00 | 01 | 00 | 01 | 01 | 88 | 01 | 00 | 00 | 00 | 01 | 00 | 00 | 00 | A5 | 01 | 00 | 01 | 00 | 00 | 01 | 00 | 01 |
| 6C | 00 | 01 | 01 | 00 | 01 | 01 | 00 | 00 | 89 | 01 | 00 | 00 | 00 | 01 | 00 | 00 | 01 | A6 | 01 | 00 | 01 | 00 | 00 | 01 | 01 | 00 |
| 6D | 00 | 01 | 01 | 00 | 01 | 01 | 00 | 01 | 8A | 01 | 00 | 00 | 00 | 01 | 00 | 01 | 00 | A7 | 01 | 00 | 01 | 00 | 00 | 01 | 01 | 01 |
| 6E | 00 | 01 | 01 | 00 | 01 | 01 | 01 | 00 | 8B | 01 | 00 | 00 | 00 | 01 | 00 | 01 | 01 | A8 | 01 | 00 | 01 | 00 | 01 | 00 | 00 | 00 |
| 6F | 00 | 01 | 01 | 00 | 01 | 01 | 01 | 01 | 8C | 01 | 00 | 00 | 00 | 01 | 01 | 00 | 00 | A9 | 01 | 00 | 01 | 00 | 01 | 00 | 00 | 01 |
| 70 | 00 | 01 | 01 | 01 | 00 | 00 | 00 | 00 | 8D | 01 | 00 | 00 | 00 | 01 | 01 | 00 | 01 | AA | 01 | 00 | 01 | 00 | 01 | 00 | 01 | 00 |
| 71 | 00 | 01 | 01 | 01 | 00 | 00 | 00 | 01 | 8E | 01 | 00 | 00 | 00 | 01 | 01 | 01 | 00 | AB | 01 | 00 | 01 | 00 | 01 | 00 | 01 | 01 |
| 72 | 00 | 01 | 01 | 01 | 00 | 00 | 01 | 00 | 8F | 01 | 00 | 00 | 00 | 01 | 01 | 01 | 01 | AC | 01 | 00 | 01 | 00 | 01 | 01 | 00 | 00 |
| 73 | 00 | 01 | 01 | 01 | 00 | 00 | 01 | 01 | 90 | 01 | 00 | 00 | 01 | 00 | 00 | 00 | 00 | AD | 01 | 00 | 01 | 00 | 01 | 01 | 00 | 01 |
| 57 | 00 | 01 | 00 | 01 | 00 | 01 | 01 | 01 | 74 | 00 | 01 | 01 | 01 | 00 | 01 | 00 | 00 | 91 | 01 | 00 | 00 | 01 | 00 | 00 | 00 | 01 |
| 58 | 00 | 01 | 00 | 01 | 01 | 00 | 00 | 00 | 75 | 00 | 01 | 01 | 01 | 00 | 01 | 00 | 01 | 92 | 01 | 00 | 00 | 01 | 00 | 00 | 01 | 00 |
| 59 | 00 | 01 | 00 | 01 | 01 | 00 | 00 | 01 | 76 | 00 | 01 | 01 | 01 | 00 | 01 | 01 | 00 | 93 | 01 | 00 | 00 | 01 | 00 | 00 | 01 | 01 |
| 5A | 00 | 01 | 00 | 01 | 01 | 00 | 01 | 00 | 77 | 00 | 01 | 01 | 01 | 00 | 01 | 01 | 01 | 94 | 01 | 00 | 00 | 01 | 00 | 01 | 00 | 00 |
| 5B | 00 | 01 | 00 | 01 | 01 | 00 | 01 | 01 | 78 | 00 | 01 | 01 | 01 | 01 | 00 | 00 | 00 | 95 | 01 | 00 | 00 | 01 | 00 | 01 | 00 | 01 |
| 5C | 00 | 01 | 00 | 01 | 01 | 01 | 00 | 00 | 79 | 00 | 01 | 01 | 01 | 01 | 00 | 00 | 01 | 96 | 01 | 00 | 00 | 01 | 00 | 01 | 01 | 00 |
| 5D | 00 | 01 | 00 | 01 | 01 | 01 | 00 | 01 | 7A | 00 | 01 | 01 | 01 | 01 | 00 | 01 | 00 | 97 | 01 | 00 | 00 | 01 | 00 | 01 | 01 | 01 |
| 5E | 00 | 01 | 00 | 01 | 01 | 01 | 01 | 00 | 7B | 00 | 01 | 01 | 01 | 01 | 00 | 01 | 01 | 98 | 01 | 00 | 00 | 01 | 01 | 00 | 00 | 00 |
| 5F | 00 | 01 | 00 | 01 | 01 | 01 | 01 | 01 | 7C | 00 | 01 | 01 | 01 | 01 | 01 | 00 | 00 | 99 | 01 | 00 | 00 | 01 | 01 | 00 | 00 | 01 |
| 60 | 00 | 01 | 01 | 00 | 00 | 00 | 00 | 00 | 7D | 00 | 01 | 01 | 01 | 01 | 01 | 00 | 01 | 9A | 01 | 00 | 00 | 01 | 01 | 00 | 01 | 00 |
| 61 | 00 | 01 | 01 | 00 | 00 | 00 | 00 | 01 | 7E | 00 | 01 | 01 | 01 | 01 | 01 | 01 | 00 | 9B | 01 | 00 | 00 | 01 | 01 | 00 | 01 | 01 |
| 62 | 00 | 01 | 01 | 00 | 00 | 00 | 01 | 00 | 7F | 00 | 01 | 01 | 01 | 01 | 01 | 01 | 01 | 9C | 01 | 00 | 00 | 01 | 01 | 01 | 00 | 00 |
| 63 | 00 | 01 | 01 | 00 | 00 | 00 | 01 | 01 | 80 | 01 | 00 | 00 | 00 | 00 | 00 | 00 | 00 | 9D | 01 | 00 | 00 | 01 | 01 | 01 | 00 | 01 |
| 64 | 00 | 01 | 01 | 00 | 00 | 01 | 00 | 00 | 81 | 01 | 00 | 00 | 00 | 00 | 00 | 00 | 01 | 9E | 01 | 00 | 00 | 01 | 01 | 01 | 01 | 00 |
| 65 | 00 | 01 | 01 | 00 | 00 | 01 | 00 | 01 | 82 | 01 | 00 | 00 | 00 | 00 | 00 | 01 | 00 | 9F | 01 | 00 | 00 | 01 | 01 | 01 | 01 | 01 |
| 66 | 00 | 01 | 01 | 00 | 00 | 01 | 01 | 00 | 83 | 01 | 00 | 00 | 00 | 00 | 00 | 01 | 01 | A0 | 01 | 00 | 01 | 00 | 00 | 00 | 00 | 00 |
| 67 | 00 | 01 | 01 | 00 | 00 | 01 | 01 | 01 | 84 | 01 | 00 | 00 | 00 | 00 | 01 | 00 | 00 | A1 | 01 | 00 | 01 | 00 | 00 | 00 | 00 | 01 |
| 68 | 00 | 01 | 01 | 00 | 01 | 00 | 00 | 00 | 85 | 01 | 00 | 00 | 00 | 00 | 01 | 00 | 01 | A2 | 01 | 00 | 01 | 00 | 00 | 00 | 01 | 00 |
| 69 | 00 | 01 | 01 | 00 | 01 | 00 | 00 | 01 | 86 | 01 | 00 | 00 | 00 | 00 | 01 | 01 | 00 | A3 | 01 | 00 | 01 | 00 | 00 | 00 | 01 | 01 |
| 6A | 00 | 01 | 01 | 00 | 01 | 00 | 01 | 00 | 87 | 01 | 00 | 00 | 00 | 00 | 01 | 01 | 01 | A4 | 01 | 00 | 01 | 00 | 00 | 01 | 00 | 00 |
| 6B | 00 | 01 | 01 | 00 | 01 | 00 | 01 | 01 | 88 | 01 | 00 | 00 | 00 | 01 | 00 | 00 | 00 | A5 | 01 | 00 | 01 | 00 | 00 | 01 | 00 | 01 |
| 6C | 00 | 01 | 01 | 00 | 01 | 01 | 00 | 00 | 89 | 01 | 00 | 00 | 00 | 01 | 00 | 00 | 01 | A6 | 01 | 00 | 01 | 00 | 00 | 01 | 01 | 00 |
| 6D | 00 | 01 | 01 | 00 | 01 | 01 | 00 | 01 | 8A | 01 | 00 | 00 | 00 | 01 | 00 | 01 | 00 | A7 | 01 | 00 | 01 | 00 | 00 | 01 | 01 | 01 |
| 6E | 00 | 01 | 01 | 00 | 01 | 01 | 01 | 00 | 8B | 01 | 00 | 00 | 00 | 01 | 00 | 01 | 01 | A8 | 01 | 00 | 01 | 00 | 01 | 00 | 00 | 00 |
| 6F | 00 | 01 | 01 | 00 | 01 | 01 | 01 | 01 | 8C | 01 | 00 | 00 | 00 | 01 | 01 | 00 | 00 | A9 | 01 | 00 | 01 | 00 | 01 | 00 | 00 | 01 |
| 70 | 00 | 01 | 01 | 01 | 00 | 00 | 00 | 00 | 8D | 01 | 00 | 00 | 00 | 01 | 01 | 00 | 01 | AA | 01 | 00 | 01 | 00 | 01 | 00 | 01 | 00 |
| 71 | 00 | 01 | 01 | 01 | 00 | 00 | 00 | 01 | 8E | 01 | 00 | 00 | 00 | 01 | 01 | 01 | 00 | AB | 01 | 00 | 01 | 00 | 01 | 00 | 01 | 01 |
| 72 | 00 | 01 | 01 | 01 | 00 | 00 | 01 | 00 | 8F | 01 | 00 | 00 | 00 | 01 | 01 | 01 | 01 | AC | 01 | 00 | 01 | 00 | 01 | 01 | 00 | 00 |
| 73 | 00 | 01 | 01 | 01 | 00 | 00 | 01 | 01 | 90 | 01 | 00 | 00 | 01 | 00 | 00 | 00 | 00 | AD | 01 | 00 | 01 | 00 | 01 | 01 | 00 | 01 |
| AE | 01 | 00 | 01 | 00 | 01 | 01 | 01 | 00 | CB | 01 | 01 | 00 | 00 | 01 | 00 | 01 | 01 | E8 | 01 | 01 | 01 | 00 | 01 | 00 | 00 | 00 |
| AF | 01 | 00 | 01 | 00 | 01 | 01 | 01 | 01 | CC | 01 | 01 | 00 | 00 | 01 | 01 | 00 | 00 | E9 | 01 | 01 | 01 | 00 | 01 | 00 | 00 | 01 |
| B0 | 01 | 00 | 01 | 01 | 00 | 00 | 00 | 00 | CD | 01 | 01 | 00 | 00 | 01 | 01 | 00 | 01 | EA | 01 | 01 | 01 | 00 | 01 | 00 | 01 | 00 |
| B1 | 01 | 00 | 01 | 01 | 00 | 00 | 00 | 01 | CE | 01 | 01 | 00 | 00 | 01 | 01 | 01 | 00 | EB | 01 | 01 | 01 | 00 | 01 | 00 | 01 | 01 |
| B2 | 01 | 00 | 01 | 01 | 00 | 00 | 01 | 00 | CF | 01 | 01 | 00 | 00 | 01 | 01 | 01 | 01 | EC | 01 | 01 | 01 | 00 | 01 | 01 | 00 | 00 |
| B3 | 01 | 00 | 01 | 01 | 00 | 00 | 01 | 01 | D0 | 01 | 01 | 00 | 01 | 00 | 00 | 00 | 00 | ED | 01 | 01 | 01 | 00 | 01 | 01 | 00 | 01 |
| B4 | 01 | 00 | 01 | 01 | 00 | 01 | 00 | 00 | D1 | 01 | 01 | 00 | 01 | 00 | 00 | 00 | 01 | EE | 01 | 01 | 01 | 00 | 01 | 01 | 01 | 00 |
| B5 | 01 | 00 | 01 | 01 | 00 | 01 | 00 | 01 | D2 | 01 | 01 | 00 | 01 | 00 | 00 | 01 | 00 | EF | 01 | 01 | 01 | 00 | 01 | 01 | 01 | 01 |
| B6 | 01 | 00 | 01 | 01 | 00 | 01 | 01 | 00 | D3 | 01 | 01 | 00 | 01 | 00 | 00 | 01 | 01 | F0 | 01 | 01 | 01 | 01 | 00 | 00 | 00 | 00 |
| B7 | 01 | 00 | 01 | 01 | 00 | 01 | 01 | 01 | D4 | 01 | 01 | 00 | 01 | 00 | 01 | 00 | 00 | F1 | 01 | 01 | 01 | 01 | 00 | 00 | 00 | 01 |
| B8 | 01 | 00 | 01 | 01 | 01 | 00 | 00 | 00 | D5 | 01 | 01 | 00 | 01 | 00 | 01 | 00 | 01 | F2 | 01 | 01 | 01 | 01 | 00 | 00 | 01 | 00 |
| B9 | 01 | 00 | 01 | 01 | 01 | 00 | 00 | 01 | D6 | 01 | 01 | 00 | 01 | 00 | 01 | 01 | 00 | F3 | 01 | 01 | 01 | 01 | 00 | 00 | 01 | 01 |
| BA | 01 | 00 | 01 | 01 | 01 | 00 | 01 | 00 | D7 | 01 | 01 | 00 | 01 | 00 | 01 | 01 | 01 | F4 | 01 | 01 | 01 | 01 | 00 | 01 | 00 | 00 |
| BB | 01 | 00 | 01 | 01 | 01 | 00 | 01 | 01 | D8 | 01 | 01 | 00 | 01 | 01 | 00 | 00 | 00 | F5 | 01 | 01 | 01 | 01 | 00 | 01 | 00 | 01 |
| BC | 01 | 00 | 01 | 01 | 01 | 01 | 00 | 00 | D9 | 01 | 01 | 00 | 01 | 01 | 00 | 00 | 01 | F6 | 01 | 01 | 01 | 01 | 00 | 01 | 01 | 00 |
| BD | 01 | 00 | 01 | 01 | 01 | 01 | 00 | 01 | DA | 01 | 01 | 00 | 01 | 01 | 00 | 01 | 00 | F7 | 01 | 01 | 01 | 01 | 00 | 01 | 01 | 01 |
| BE | 01 | 00 | 01 | 01 | 01 | 01 | 01 | 00 | DB | 01 | 01 | 00 | 01 | 01 | 00 | 01 | 01 | F8 | 01 | 01 | 01 | 01 | 01 | 00 | 00 | 00 |
| BF | 01 | 00 | 01 | 01 | 01 | 01 | 01 | 01 | DC | 01 | 01 | 00 | 01 | 01 | 01 | 00 | 00 | F9 | 01 | 01 | 01 | 01 | 01 | 00 | 00 | 01 |
| C0 | 01 | 01 | 00 | 00 | 00 | 00 | 00 | 00 | DD | 01 | 01 | 00 | 01 | 01 | 01 | 00 | 01 | FA | 01 | 01 | 01 | 01 | 01 | 00 | 01 | 00 |
| C1 | 01 | 01 | 00 | 00 | 00 | 00 | 00 | 01 | DE | 01 | 01 | 00 | 01 | 01 | 01 | 01 | 00 | FB | 01 | 01 | 01 | 01 | 01 | 00 | 01 | 01 |
| C2 | 01 | 01 | 00 | 00 | 00 | 00 | 01 | 00 | DF | 01 | 01 | 00 | 01 | 01 | 01 | 01 | 01 | FC | 01 | 01 | 01 | 01 | 01 | 01 | 00 | 00 |
| C3 | 01 | 01 | 00 | 00 | 00 | 00 | 01 | 01 | E0 | 01 | 01 | 01 | 00 | 00 | 00 | 00 | 00 | FD | 01 | 01 | 01 | 01 | 01 | 01 | 00 | 01 |
| C4 | 01 | 01 | 00 | 00 | 00 | 01 | 00 | 00 | E1 | 01 | 01 | 01 | 00 | 00 | 00 | 00 | 01 | FE | 01 | 01 | 01 | 01 | 01 | 01 | 01 | 00 |
| C5 | 01 | 01 | 00 | 00 | 00 | 01 | 00 | 01 | E2 | 01 | 01 | 01 | 00 | 00 | 00 | 01 | 00 | FF | 01 | 01 | 01 | 01 | 01 | 01 | 01 | 01 |
| C6 | 01 | 01 | 00 | 00 | 00 | 01 | 01 | 00 | E3 | 01 | 01 | 01 | 00 | 00 | 00 | 01 | 01 | | | | | | | | | |
| C7 | 01 | 01 | 00 | 00 | 00 | 01 | 01 | 01 | E4 | 01 | 01 | 01 | 00 | 00 | 01 | 00 | 00 | | | | | | | | | |
| C8 | 01 | 01 | 00 | 00 | 01 | 00 | 00 | 00 | E5 | 01 | 01 | 01 | 00 | 00 | 01 | 00 | 01 | | | | | | | | | |
| C9 | 01 | 01 | 00 | 00 | 01 | 00 | 00 | 01 | E6 | 01 | 01 | 01 | 00 | 00 | 01 | 01 | 00 | | | | | | | | | |
| CA | 01 | 01 | 00 | 00 | 01 | 00 | 01 | 00 | E7 | 01 | 01 | 01 | 00 | 00 | 01 | 01 | 01 | | | | | | | | | |

| Src | Destination Row | | | | Src | Destination Row | | | | Src | Destination Row | | | | Src | Destination Row | | | |
|---|---|---|---|---|---|---|---|---|---|---|---|---|---|---|---|---|---|---|---|
| Byte | 0 | 1 | 2 | 3 | Byte | 0 | 1 | 2 | 3 | Byte | 0 | 1 | 2 | 3 | Byte | 0 | 1 | 2 | 3 |
| 2-bit Mode - Destination Column 0 | | | | | | | | | | | | | | | | | | | |
| 00 | 00 | 00 | 00 | 00 | 20 | 00 | 80 | 00 | 00 | 40 | 40 | 00 | 00 | 00 | 60 | 40 | 80 | 00 | 00 |
| 01 | 00 | 00 | 00 | 40 | 21 | 00 | 80 | 00 | 40 | 41 | 40 | 00 | 00 | 40 | 61 | 40 | 80 | 00 | 40 |
| 02 | 00 | 00 | 00 | 80 | 22 | 00 | 80 | 00 | 80 | 42 | 40 | 00 | 00 | 80 | 62 | 40 | 80 | 00 | 80 |
| 03 | 00 | 00 | 00 | C0 | 23 | 00 | 80 | 00 | C0 | 43 | 40 | 00 | 00 | C0 | 63 | 40 | 80 | 00 | C0 |
| 04 | 00 | 00 | 40 | 00 | 24 | 00 | 80 | 40 | 00 | 44 | 40 | 00 | 40 | 00 | 64 | 40 | 80 | 40 | 00 |
| 05 | 00 | 00 | 40 | 40 | 25 | 00 | 80 | 40 | 40 | 45 | 40 | 00 | 40 | 40 | 65 | 40 | 80 | 40 | 40 |
| 06 | 00 | 00 | 40 | 80 | 26 | 00 | 80 | 40 | 80 | 46 | 40 | 00 | 40 | 80 | 66 | 40 | 80 | 40 | 80 |
| 07 | 00 | 00 | 40 | C0 | 27 | 00 | 80 | 40 | C0 | 47 | 40 | 00 | 40 | C0 | 67 | 40 | 80 | 40 | C0 |
| 08 | 00 | 00 | 80 | 00 | 28 | 00 | 80 | 80 | 00 | 48 | 40 | 00 | 80 | 00 | 68 | 40 | 80 | 80 | 00 |
| 09 | 00 | 00 | 80 | 40 | 29 | 00 | 80 | 80 | 40 | 49 | 40 | 00 | 80 | 49 | 69 | 40 | 80 | 80 | 40 |
| 0A | 00 | 00 | 80 | 80 | 2A | 00 | 80 | 80 | 80 | 4A | 40 | 00 | 80 | 80 | 6A | 40 | 80 | 80 | 80 |
| 0B | 00 | 00 | 80 | C0 | 2B | 00 | 80 | 80 | C0 | 4B | 40 | 00 | 80 | C0 | 6B | 40 | 80 | 80 | C0 |
| 0C | 00 | 00 | C0 | 00 | 2C | 00 | 80 | C0 | 00 | 4C | 40 | 00 | C0 | 00 | 6C | 40 | 80 | C0 | 00 |
| 0D | 00 | 00 | C0 | 40 | 2D | 00 | 80 | C0 | 40 | 4D | 40 | 00 | C0 | 40 | 6D | 40 | 80 | C0 | 40 |
| 0E | 00 | 00 | C0 | 80 | 2E | 00 | 80 | C0 | 80 | 4E | 40 | 00 | C0 | 80 | 6E | 40 | 80 | C0 | 80 |
| 0F | 00 | 00 | C0 | C0 | 2F | 00 | 80 | C0 | C0 | 4F | 40 | 00 | C0 | C0 | 6F | 40 | 80 | C0 | C0 |
| 10 | 00 | 40 | 00 | 00 | 30 | 00 | C0 | 00 | 00 | 50 | 40 | 40 | 00 | 00 | 70 | 40 | C0 | 00 | 00 |
| 11 | 00 | 40 | 00 | 40 | 31 | 00 | C0 | 00 | 40 | 51 | 40 | 40 | 00 | 40 | 71 | 40 | C0 | 00 | 40 |
| 12 | 00 | 40 | 00 | 80 | 32 | 00 | C0 | 00 | 80 | 52 | 40 | 40 | 00 | 80 | 72 | 40 | C0 | 00 | 80 |
| 13 | 00 | 40 | 00 | C0 | 33 | 00 | C0 | 00 | C0 | 53 | 40 | 40 | 00 | C0 | 73 | 40 | C0 | 00 | C0 |
| 14 | 00 | 40 | 40 | 00 | 34 | 00 | C0 | 40 | 00 | 54 | 40 | 40 | 40 | 00 | 74 | 40 | C0 | 40 | 00 |
| 15 | 00 | 40 | 40 | 40 | 35 | 00 | C0 | 40 | 40 | 55 | 40 | 40 | 40 | 40 | 75 | 40 | C0 | 40 | 40 |
| 16 | 00 | 40 | 40 | 80 | 36 | 00 | C0 | 40 | 80 | 56 | 40 | 40 | 40 | 80 | 76 | 40 | C0 | 40 | 80 |
| 17 | 00 | 40 | 40 | C0 | 37 | 00 | C0 | 40 | C0 | 57 | 40 | 40 | 40 | C0 | 77 | 40 | C0 | 40 | C0 |
| 18 | 00 | 40 | 80 | 00 | 38 | 00 | C0 | 80 | 00 | 58 | 40 | 40 | 80 | 00 | 78 | 40 | C0 | 80 | 00 |
| 19 | 00 | 40 | 80 | 40 | 39 | 00 | C0 | 80 | 40 | 59 | 40 | 40 | 80 | 40 | 79 | 40 | C0 | 80 | 40 |
| 1A | 00 | 40 | 80 | 80 | 3A | 00 | C0 | 80 | 80 | 5A | 40 | 40 | 80 | 80 | 7A | 40 | C0 | 80 | 80 |
| 1B | 00 | 40 | 80 | C0 | 3B | 00 | C0 | 80 | C0 | 5B | 40 | 40 | 80 | C0 | 7B | 40 | C0 | 80 | C0 |
| 1C | 00 | 40 | C0 | 00 | 3C | 00 | C0 | C0 | 00 | 5C | 40 | 40 | C0 | 00 | 7C | 40 | C0 | C0 | 00 |
| 1D | 00 | 40 | C0 | 40 | 3D | 00 | C0 | C0 | 40 | 5D | 40 | 40 | C0 | 40 | 7D | 40 | C0 | C0 | 40 |
| 1E | 00 | 40 | C0 | 80 | 3E | 00 | C0 | C0 | 80 | 5E | 40 | 40 | C0 | 80 | 7E | 40 | C0 | C0 | 80 |
| 1F | 00 | 40 | C0 | C0 | 3F | 00 | C0 | C0 | C0 | 5F | 40 | 40 | C0 | C0 | 7F | 40 | C0 | C0 | C0 |
| 80 | 80 | 00 | 00 | 00 | A0 | 80 | 80 | 00 | 00 | C0 | C0 | 00 | 00 | 00 | E0 | C0 | 80 | 00 | 00 |
| 81 | 80 | 00 | 00 | 40 | A1 | 80 | 80 | 00 | 40 | C1 | C0 | 00 | 00 | 40 | E1 | C0 | 80 | 00 | 40 |
| 82 | 80 | 00 | 00 | 80 | A2 | 80 | 80 | 00 | 80 | C2 | C0 | 00 | 00 | 80 | E2 | C0 | 80 | 00 | 80 |
| 83 | 80 | 00 | 00 | C0 | A3 | 80 | 80 | 00 | C0 | C3 | C0 | 00 | 00 | C0 | E3 | C0 | 80 | 00 | C0 |
| 84 | 80 | 00 | 40 | 00 | A4 | 80 | 80 | 40 | 00 | C4 | C0 | 00 | 40 | 00 | E4 | C0 | 80 | 40 | 00 |
| 85 | 80 | 00 | 40 | 40 | A5 | 80 | 80 | 40 | 40 | C5 | C0 | 00 | 40 | 40 | E5 | C0 | 80 | 40 | 40 |
| 86 | 80 | 00 | 40 | 80 | A6 | 80 | 80 | 40 | 80 | C6 | C0 | 00 | 40 | 80 | E6 | C0 | 80 | 40 | 80 |
| 87 | 80 | 00 | 40 | C0 | A7 | 80 | 80 | 40 | C0 | C7 | C0 | 00 | 40 | C0 | E7 | C0 | 80 | 40 | C0 |
| 88 | 80 | 00 | 80 | 00 | A8 | 80 | 80 | 80 | 00 | C8 | C0 | 00 | 80 | 00 | E8 | C0 | 80 | 80 | 00 |
| 89 | 80 | 00 | 80 | 40 | A9 | 80 | 80 | 80 | 40 | C9 | C0 | 00 | 80 | 40 | E9 | C0 | 80 | 80 | 40 |
| 8A | 80 | 00 | 80 | 80 | AA | 80 | 80 | 80 | 80 | CA | C0 | 00 | 80 | 80 | EA | C0 | 80 | 80 | 80 |
| 8B | 80 | 00 | 80 | C0 | AB | 80 | 80 | 80 | C0 | CB | C0 | 00 | 80 | C0 | EB | C0 | 80 | 80 | C0 |
| 8C | 80 | 00 | C0 | 00 | AC | 80 | 80 | C0 | 00 | CC | C0 | 00 | C0 | 00 | EC | C0 | 80 | C0 | 00 |
| 8D | 80 | 00 | C0 | 40 | AD | 80 | 80 | C0 | 40 | CD | C0 | 00 | C0 | 40 | ED | C0 | 80 | C0 | 40 |
| 8E | 80 | 00 | C0 | 80 | AE | 80 | 80 | C0 | 80 | CE | C0 | 00 | C0 | 80 | EE | C0 | 80 | C0 | 80 |
| 8F | 80 | 00 | C0 | C0 | AF | 80 | 80 | C0 | C0 | CF | C0 | 00 | C0 | C0 | EF | C0 | 80 | C0 | C0 |
| 90 | 80 | 40 | 00 | 00 | B0 | 80 | C0 | 00 | 00 | D0 | C0 | 40 | 00 | 00 | F0 | C0 | C0 | 00 | 00 |
| 91 | 80 | 40 | 00 | 40 | B1 | 80 | C0 | 00 | 40 | D1 | C0 | 40 | 00 | 40 | F1 | C0 | C0 | 00 | 40 |
| 92 | 80 | 40 | 00 | 80 | B2 | 80 | C0 | 00 | 80 | D2 | C0 | 40 | 00 | 80 | F2 | C0 | C0 | 00 | 80 |
| 93 | 80 | 40 | 00 | C0 | B3 | 80 | C0 | 00 | C0 | D3 | C0 | 40 | 00 | C0 | F3 | C0 | C0 | 00 | C0 |
| 94 | 80 | 40 | 40 | 00 | B4 | 80 | C0 | 40 | 00 | D4 | C0 | 40 | 40 | 00 | F4 | C0 | C0 | 40 | 00 |
| 95 | 80 | 40 | 40 | 40 | B5 | 80 | C0 | 40 | 40 | D5 | C0 | 40 | 40 | 40 | F5 | C0 | C0 | 40 | 40 |
| 96 | 80 | 40 | 40 | 80 | B6 | 80 | C0 | 40 | 80 | D6 | C0 | 40 | 40 | 80 | F6 | C0 | C0 | 40 | 80 |
| 97 | 80 | 40 | 40 | C0 | B7 | 80 | C0 | 40 | C0 | D7 | C0 | 40 | 40 | C0 | F7 | C0 | C0 | 40 | C0 |
| 98 | 80 | 40 | 80 | 00 | B8 | 80 | C0 | 80 | 00 | D8 | C0 | 40 | 80 | 00 | F8 | C0 | C0 | 80 | 00 |
| 99 | 80 | 40 | 80 | 40 | B9 | 80 | C0 | 80 | 40 | D9 | C0 | 40 | 80 | 40 | F9 | C0 | C0 | 80 | 40 |
| 9A | 80 | 40 | 80 | 80 | BA | 80 | C0 | 80 | 80 | DA | C0 | 40 | 80 | 80 | FA | C0 | C0 | 80 | 80 |
| 9B | 80 | 40 | 80 | C0 | BB | 80 | C0 | 80 | C0 | DB | C0 | 40 | 80 | C0 | FB | C0 | C0 | 80 | C0 |
| 9C | 80 | 40 | C0 | 00 | BC | 80 | C0 | C0 | 00 | DC | C0 | 40 | C0 | 00 | FC | C0 | C0 | C0 | 00 |
| 9D | 80 | 40 | C0 | 40 | BD | 80 | C0 | C0 | 40 | DD | C0 | 40 | C0 | 40 | FD | C0 | C0 | C0 | 46 |
| 9E | 80 | 40 | C0 | 80 | BE | 80 | C0 | C0 | 80 | DE | C0 | 40 | C0 | 80 | FE | C0 | C0 | C0 | 80 |
| 9F | 80 | 40 | C0 | C0 | BF | 80 | C0 | C0 | C0 | DF | C0 | 40 | C0 | C0 | FF | C0 | C0 | C0 | C0 |
| 2-bit Mode - Destinatin Column 1 | | | | | | | | | | | | | | | | | | | |
| 00 | 00 | 00 | 00 | 00 | 20 | 00 | 20 | 00 | 00 | 40 | 10 | 00 | 00 | 00 | 60 | 10 | 20 | 00 | 00 |
| 01 | 00 | 00 | 00 | 10 | 21 | 00 | 20 | 00 | 10 | 41 | 10 | 00 | 00 | 10 | 61 | 10 | 20 | 00 | 10 |
| 02 | 00 | 00 | 00 | 20 | 22 | 00 | 20 | 00 | 20 | 42 | 10 | 00 | 00 | 20 | 62 | 10 | 20 | 00 | 20 |
| 03 | 00 | 00 | 00 | 30 | 23 | 00 | 20 | 00 | 30 | 43 | 10 | 00 | 00 | 30 | 63 | 10 | 20 | 00 | 30 |
| 04 | 00 | 00 | 10 | 00 | 24 | 00 | 20 | 10 | 00 | 44 | 10 | 00 | 10 | 00 | 64 | 10 | 20 | 10 | 00 |
| 05 | 00 | 00 | 10 | 10 | 25 | 00 | 20 | 10 | 10 | 45 | 10 | 00 | 10 | 10 | 65 | 10 | 20 | 10 | 10 |
| 06 | 00 | 00 | 10 | 20 | 26 | 00 | 20 | 10 | 20 | 46 | 10 | 00 | 10 | 20 | 66 | 10 | 20 | 10 | 20 |
| 07 | 00 | 00 | 10 | 30 | 27 | 00 | 20 | 10 | 30 | 47 | 10 | 00 | 10 | 30 | 67 | 10 | 20 | 10 | 30 |
| 08 | 00 | 00 | 20 | 00 | 28 | 00 | 20 | 20 | 00 | 48 | 10 | 00 | 20 | 00 | 68 | 10 | 20 | 20 | 00 |
| 09 | 00 | 00 | 20 | 10 | 29 | 00 | 20 | 20 | 10 | 49 | 10 | 00 | 20 | 10 | 69 | 10 | 20 | 20 | 10 |
| 0A | 00 | 00 | 20 | 20 | 2A | 00 | 20 | 20 | 20 | 4A | 10 | 00 | 20 | 20 | 6A | 10 | 20 | 20 | 20 |
| 0B | 00 | 00 | 20 | 30 | 2B | 00 | 20 | 20 | 30 | 4B | 10 | 00 | 20 | 30 | 6B | 10 | 20 | 20 | 30 |
| 0C | 00 | 00 | 30 | 00 | 2C | 00 | 20 | 30 | 00 | 4C | 10 | 00 | 30 | 00 | 6C | 10 | 20 | 30 | 00 |

-continued

| Src | Destination Row | | | | Src | Destination Row | | | | Src | Destination Row | | | | Src | Destination Row | | | |
|---|---|---|---|---|---|---|---|---|---|---|---|---|---|---|---|---|---|---|---|
| Byte | 0 | 1 | 2 | 3 | Byte | 0 | 1 | 2 | 3 | Byte | 0 | 1 | 2 | 3 | Byte | 0 | 1 | 2 | 3 |
| 0D | 00 | 00 | 30 | 10 | 2D | 00 | 20 | 30 | 10 | 4D | 10 | 00 | 30 | 10 | 6D | 10 | 20 | 30 | 10 |
| 0E | 00 | 00 | 30 | 20 | 2E | 00 | 20 | 30 | 20 | 4E | 10 | 00 | 30 | 20 | 6E | 10 | 20 | 30 | 20 |
| 0F | 00 | 00 | 30 | 30 | 2F | 00 | 20 | 30 | 30 | 4F | 10 | 00 | 30 | 30 | 6F | 10 | 20 | 30 | 30 |
| 10 | 00 | 10 | 00 | 00 | 30 | 00 | 30 | 00 | 00 | 50 | 10 | 10 | 00 | 00 | 70 | 10 | 30 | 00 | 00 |
| 11 | 00 | 10 | 00 | 10 | 31 | 00 | 30 | 00 | 10 | 51 | 10 | 10 | 00 | 10 | 71 | 10 | 30 | 00 | 10 |
| 12 | 00 | 10 | 00 | 20 | 32 | 00 | 30 | 00 | 20 | 52 | 10 | 10 | 00 | 20 | 72 | 10 | 30 | 00 | 20 |
| 13 | 00 | 10 | 00 | 30 | 33 | 00 | 30 | 00 | 30 | 53 | 10 | 10 | 00 | 30 | 73 | 10 | 30 | 00 | 30 |
| 14 | 00 | 10 | 10 | 00 | 34 | 00 | 30 | 10 | 00 | 54 | 10 | 10 | 10 | 00 | 74 | 10 | 30 | 10 | 00 |
| 15 | 00 | 10 | 10 | 10 | 35 | 00 | 30 | 10 | 10 | 55 | 10 | 10 | 10 | 10 | 75 | 10 | 30 | 10 | 10 |
| 16 | 00 | 10 | 10 | 20 | 36 | 00 | 30 | 10 | 20 | 56 | 10 | 10 | 10 | 20 | 76 | 10 | 30 | 10 | 20 |
| 17 | 00 | 10 | 10 | 30 | 37 | 00 | 30 | 10 | 30 | 57 | 10 | 10 | 10 | 30 | 77 | 10 | 30 | 10 | 30 |
| 18 | 00 | 10 | 20 | 00 | 38 | 00 | 30 | 20 | 00 | 58 | 10 | 10 | 20 | 00 | 78 | 10 | 30 | 20 | 00 |
| 19 | 00 | 10 | 20 | 10 | 39 | 00 | 30 | 20 | 10 | 59 | 10 | 10 | 20 | 10 | 99 | 10 | 30 | 20 | 10 |
| 1A | 00 | 10 | 20 | 20 | 3A | 00 | 30 | 20 | 20 | 5A | 10 | 10 | 20 | 20 | 7A | 10 | 30 | 20 | 20 |
| 1B | 00 | 10 | 20 | 30 | 3B | 00 | 30 | 20 | 30 | 5B | 10 | 10 | 20 | 30 | 7B | 10 | 30 | 20 | 30 |
| 1C | 00 | 01 | 30 | 00 | 3C | 00 | 30 | 30 | 00 | 5C | 10 | 10 | 30 | 00 | 7C | 10 | 30 | 30 | 00 |
| 1D | 00 | 10 | 30 | 10 | 3D | 00 | 30 | 30 | 10 | 5D | 10 | 10 | 30 | 10 | 7D | 10 | 30 | 30 | 10 |
| 1E | 00 | 10 | 30 | 20 | 3E | 00 | 30 | 30 | 20 | 5E | 10 | 10 | 30 | 20 | 3E | 10 | 30 | 30 | 20 |
| 1F | 00 | 10 | 30 | 30 | 3F | 00 | 30 | 30 | 30 | 5F | 10 | 10 | 30 | 30 | 7F | 10 | 30 | 30 | 30 |
| 80 | 20 | 00 | 00 | 00 | A0 | 20 | 20 | 00 | 00 | C0 | 30 | 00 | 00 | 00 | E0 | 30 | 20 | 00 | 00 |
| 81 | 20 | 00 | 00 | 10 | A1 | 20 | 20 | 00 | 10 | C1 | 30 | 00 | 00 | 10 | E1 | 30 | 20 | 00 | 10 |
| 82 | 20 | 00 | 00 | 20 | A2 | 20 | 20 | 00 | 20 | C2 | 30 | 00 | 00 | 20 | E2 | 30 | 20 | 00 | 20 |
| 83 | 20 | 00 | 00 | 30 | A3 | 20 | 20 | 00 | 30 | C3 | 30 | 00 | 00 | 30 | E3 | 30 | 20 | 00 | 30 |
| 84 | 20 | 00 | 10 | 00 | A4 | 20 | 20 | 10 | 00 | C4 | 30 | 00 | 10 | 00 | E4 | 30 | 20 | 10 | 00 |
| 85 | 20 | 00 | 10 | 10 | A5 | 20 | 20 | 10 | 10 | C5 | 30 | 00 | 10 | 10 | E5 | 30 | 20 | 10 | 10 |
| 86 | 20 | 00 | 10 | 20 | A6 | 20 | 20 | 10 | 20 | C6 | 30 | 00 | 10 | 20 | E6 | 30 | 20 | 10 | 20 |
| 87 | 20 | 00 | 10 | 30 | A7 | 20 | 20 | 10 | 30 | C7 | 30 | 00 | 10 | 30 | E7 | 30 | 20 | 10 | 30 |
| 88 | 20 | 00 | 20 | 00 | AB | 20 | 20 | 20 | 00 | C8 | 30 | 00 | 20 | 00 | E8 | 30 | 20 | 20 | 00 |
| 89 | 20 | 00 | 20 | 10 | A9 | 20 | 20 | 20 | 10 | C9 | 30 | 00 | 20 | 10 | E9 | 30 | 20 | 20 | 10 |
| 8A | 20 | 00 | 20 | 20 | AA | 20 | 20 | 20 | 20 | CA | 30 | 00 | 20 | 10 | EA | 30 | 20 | 20 | 20 |
| 8B | 20 | 00 | 20 | 30 | AB | 20 | 20 | 20 | 30 | CB | 30 | 00 | 20 | 30 | EB | 30 | 20 | 20 | 30 |
| 8C | 20 | 00 | 30 | 00 | AC | 20 | 20 | 30 | 00 | CC | 30 | 00 | 30 | 00 | EC | 30 | 20 | 30 | 00 |
| 8D | 20 | 00 | 30 | 10 | AD | 20 | 20 | 30 | 10 | CD | 30 | 0 | 030 | 10 | ED | 30 | 20 | 30 | 10 |
| 8E | 20 | 00 | 30 | 20 | AE | 20 | 20 | 30 | 20 | CE | 30 | 00 | 30 | 20 | EE | 30 | 20 | 30 | 20 |
| 8F | 20 | 00 | 30 | 30 | AF | 20 | 20 | 30 | 30 | CF | 30 | 00 | 30 | 30 | EF | 30 | 20 | 30 | 30 |
| 90 | 20 | 10 | 00 | 00 | B0 | 20 | 30 | 00 | 00 | D0 | 30 | 10 | 00 | 00 | F0 | 30 | 30 | 00 | 00 |
| 91 | 20 | 10 | 00 | 10 | B1 | 20 | 30 | 00 | 10 | D1 | 30 | 10 | 00 | 10 | F1 | 30 | 30 | 00 | 10 |
| 92 | 20 | 10 | 00 | 20 | B2 | 20 | 30 | 00 | 20 | D2 | 30 | 10 | 00 | 20 | F2 | 30 | 30 | 00 | 20 |
| 93 | 20 | 10 | 00 | 30 | B3 | 20 | 30 | 00 | 30 | D3 | 30 | 10 | 00 | 30 | F3 | 30 | 30 | 00 | 30 |
| 94 | 20 | 10 | 10 | 00 | B4 | 20 | 30 | 10 | 00 | D4 | 30 | 10 | 10 | 00 | F4 | 30 | 30 | 10 | 00 |
| 95 | 20 | 10 | 10 | 10 | B5 | 20 | 30 | 10 | 10 | D5 | 30 | 10 | 10 | 10 | F5 | 30 | 30 | 10 | 10 |
| 96 | 20 | 10 | 10 | 20 | B6 | 20 | 30 | 10 | 20 | D6 | 30 | 10 | 10 | 20 | F6 | 30 | 30 | 10 | 20 |
| 97 | 20 | 10 | 10 | 30 | B7 | 20 | 30 | 10 | 30 | D7 | 30 | 10 | 10 | 30 | F7 | 30 | 30 | 10 | 30 |
| 98 | 20 | 10 | 20 | 00 | B8 | 20 | 30 | 20 | 00 | D8 | 30 | 10 | 20 | 00 | F8 | 30 | 30 | 20 | 00 |
| 99 | 20 | 10 | 20 | 10 | B9 | 20 | 30 | 20 | 10 | D9 | 30 | 10 | 20 | 10 | F9 | 30 | 30 | 20 | 10 |
| 9A | 20 | 10 | 20 | 20 | BA | 20 | 30 | 20 | 20 | DA | 30 | 10 | 20 | 20 | FA | 30 | 30 | 20 | 20 |
| 9B | 20 | 10 | 20 | 30 | BB | 20 | 30 | 20 | 30 | DB | 30 | 10 | 20 | 30 | FB | 30 | 30 | 20 | 30 |
| 9C | 20 | 10 | 30 | 00 | BC | 20 | 30 | 30 | 00 | DC | 30 | 10 | 30 | 00 | FC | 30 | 30 | 30 | 00 |
| 9D | 20 | 10 | 30 | 10 | BD | 20 | 30 | 30 | 10 | DD | 30 | 10 | 30 | 10 | FD | 30 | 30 | 30 | 10 |
| 9E | 20 | 10 | 30 | 20 | BE | 20 | 30 | 30 | 20 | DE | 30 | 10 | 30 | 20 | FE | 30 | 30 | 30 | 20 |
| 9F | 20 | 10 | 30 | 30 | BF | 20 | 30 | 30 | 30 | DF | 30 | 10 | 30 | 30 | FF | 30 | 30 | 30 | 30 |

2-bit Mode - Destinatin Column 2

| Src | Destination Row | | | | Src | Destination Row | | | | Src | Destination Row | | | | Src | Destination Row | | | |
|---|---|---|---|---|---|---|---|---|---|---|---|---|---|---|---|---|---|---|---|
| Byte | 0 | 1 | 2 | 3 | Byte | 0 | 1 | 2 | 3 | Byte | 0 | 1 | 2 | 3 | Byte | 0 | 1 | 2 | 3 |
| 00 | 00 | 00 | 00 | 00 | 20 | 00 | 08 | 00 | 00 | 40 | 04 | 00 | 00 | 00 | 60 | 04 | 08 | 00 | 00 |
| 01 | 00 | 00 | 00 | 04 | 21 | 00 | 08 | 00 | 04 | 41 | 04 | 00 | 00 | 04 | 61 | 04 | 08 | 00 | 04 |
| 02 | 00 | 00 | 00 | 08 | 22 | 00 | 08 | 00 | 08 | 42 | 04 | 00 | 00 | 08 | 62 | 04 | 08 | 00 | 08 |
| 03 | 00 | 00 | 00 | 0C | 23 | 00 | 08 | 00 | 0C | 43 | 04 | 00 | 00 | 0C | 63 | 04 | 08 | 00 | 0C |
| 04 | 00 | 00 | 04 | 00 | 24 | 00 | 08 | 04 | 00 | 44 | 04 | 00 | 04 | 00 | 64 | 04 | 08 | 04 | 00 |
| 05 | 00 | 00 | 04 | 04 | 25 | 00 | 08 | 04 | 04 | 45 | 04 | 00 | 04 | 04 | 65 | 04 | 08 | 04 | 04 |
| 06 | 00 | 00 | 04 | 08 | 26 | 00 | 08 | 04 | 08 | 46 | 04 | 00 | 04 | 08 | 66 | 04 | 08 | 04 | 08 |
| 07 | 00 | 00 | 04 | 0C | 27 | 00 | 08 | 04 | 0C | 47 | 04 | 00 | 04 | 0C | 67 | 04 | 08 | 04 | 0C |
| 08 | 00 | 00 | 08 | 00 | 28 | 00 | 08 | 08 | 00 | 48 | 04 | 00 | 08 | 00 | 68 | 04 | 08 | 08 | 00 |
| 09 | 00 | 00 | 08 | 04 | 29 | 00 | 08 | 08 | 04 | 49 | 04 | 00 | 08 | 04 | 69 | 04 | 08 | 08 | 04 |
| 0A | 00 | 00 | 08 | 08 | 2A | 00 | 08 | 08 | 08 | 4A | 04 | 00 | 08 | 08 | 6A | 04 | 08 | 08 | 08 |
| 0B | 00 | 00 | 08 | 0C | 2B | 00 | 08 | 08 | 0C | 4B | 04 | 00 | 08 | 0C | 6B | 04 | 08 | 08 | 0C |
| 0C | 00 | 00 | 0C | 00 | 2C | 00 | 08 | 0C | 00 | 4C | 04 | 00 | 0C | 00 | 6C | 04 | 08 | 0C | 00 |
| 0D | 00 | 00 | 0C | 04 | 2D | 00 | 08 | 0C | 04 | 4D | 04 | 00 | 0C | 04 | 6D | 04 | 08 | 0C | 04 |
| 0E | 00 | 00 | 0C | 08 | 2E | 00 | 08 | 0C | 08 | 4E | 04 | 00 | 0C | 08 | 6E | 04 | 08 | 0C | 08 |
| 0F | 00 | 00 | 0C | 0C | 2F | 00 | 08 | 0C | 0C | 4F | 04 | 00 | 0C | 0C | 6F | 04 | 08 | 0C | 0C |
| 10 | 00 | 04 | 00 | 00 | 30 | 00 | 0C | 00 | 00 | 50 | 04 | 04 | 00 | 00 | 70 | 04 | 0C | 00 | 00 |
| 11 | 00 | 04 | 00 | 04 | 31 | 00 | 0C | 00 | 04 | 51 | 04 | 04 | 00 | 04 | 71 | 04 | 0C | 00 | 04 |
| 12 | 00 | 04 | 00 | 08 | 32 | 00 | 0C | 00 | 08 | 52 | 04 | 04 | 00 | 08 | 72 | 04 | 0C | 00 | 08 |
| 13 | 00 | 04 | 00 | 0C | 33 | 00 | 0C | 00 | 0C | 53 | 04 | 04 | 00 | 0C | 73 | 04 | 0C | 00 | 0C |
| 14 | 00 | 04 | 04 | 00 | 34 | 00 | 0C | 04 | 00 | 54 | 04 | 04 | 04 | 00 | 74 | 04 | 0C | 04 | 00 |

-continued 2-bit Mode - Destinatin Column 2

| Src | Destination Row | | | | Src | Destination Row | | | | Src | Destination Row | | | | Src | Destination Row | | | |
|---|---|---|---|---|---|---|---|---|---|---|---|---|---|---|---|---|---|---|---|
| Byte | 0 | 1 | 2 | 3 | Byte | 0 | 1 | 2 | 3 | Byte | 0 | 1 | 2 | 3 | Byte | 0 | 1 | 2 | 3 |
| 15 | 00 | 04 | 04 | 04 | 35 | 00 | 0C | 04 | 04 | 55 | 04 | 04 | 04 | 04 | 75 | 04 | 0C | 04 | 04 |
| 16 | 00 | 04 | 04 | 08 | 36 | 00 | 0C | 04 | 08 | 56 | 04 | 04 | 04 | 08 | 76 | 04 | 0C | 04 | 08 |
| 17 | 00 | 04 | 04 | 0C | 37 | 00 | 0C | 04 | 0C | 57 | 04 | 04 | 04 | 0C | 77 | 04 | 0C | 04 | 0C |
| 18 | 00 | 04 | 08 | 00 | 38 | 00 | 0C | 08 | 00 | 58 | 04 | 04 | 08 | 00 | 78 | 04 | 0C | 08 | 00 |
| 19 | 00 | 04 | 08 | 04 | 39 | 00 | 0C | 08 | 04 | 59 | 04 | 04 | 08 | 04 | 79 | 04 | 0C | 08 | 04 |
| 1A | 00 | 04 | 08 | 08 | 3A | 00 | 0C | 08 | 08 | 5A | 04 | 04 | 08 | 08 | 7A | 04 | 0C | 08 | 08 |
| 1B | 00 | 04 | 08 | 0C | 3B | 00 | 0C | 08 | 0C | 5B | 04 | 04 | 08 | 0C | 7B | 04 | 0C | 08 | 0C |
| 1C | 00 | 04 | 0C | 00 | 3C | 00 | 0C | 0C | 00 | 5C | 04 | 04 | 0C | 00 | 7C | 04 | 0C | 0C | 00 |
| 1D | 00 | 04 | 0C | 04 | 3D | 00 | 0C | 0C | 04 | 5D | 04 | 04 | 0C | 04 | 7D | 04 | 0C | 0C | 04 |
| 1E | 00 | 04 | 0C | 08 | 3E | 00 | 0C | 0C | 08 | 5E | 04 | 04 | 0C | 08 | 7E | 04 | 0C | 0C | 08 |
| 1F | 00 | 04 | 0C | 0C | 3F | 00 | 0C | 0C | 0C | 5F | 04 | 04 | 0C | 0C | 7F | 04 | 0C | 0C | 0C |

2-bit Mode - Destination Column 3

| Src | Destination Row | | | | Src | Destination Row | | | | Src | Destination Row | | | | Src | Destination Row | | | |
|---|---|---|---|---|---|---|---|---|---|---|---|---|---|---|---|---|---|---|---|
| Byte | 0 | 1 | 2 | 3 | Byte | 0 | 1 | 2 | 3 | Byte | 0 | 1 | 2 | 3 | Byte | 0 | 1 | 2 | 3 |
| 00 | 00 | 00 | 00 | 00 | 20 | 00 | 02 | 00 | 00 | 40 | 01 | 00 | 00 | 00 | 60 | 01 | 02 | 00 | 00 |
| 01 | 00 | 00 | 00 | 01 | 21 | 00 | 02 | 00 | 01 | 41 | 01 | 00 | 00 | 01 | 61 | 01 | 02 | 00 | 01 |
| 02 | 00 | 00 | 00 | 02 | 22 | 00 | 02 | 00 | 02 | 42 | 01 | 00 | 00 | 02 | 62 | 01 | 02 | 00 | 02 |
| 03 | 00 | 00 | 00 | 03 | 23 | 00 | 02 | 00 | 03 | 43 | 01 | 00 | 00 | 03 | 63 | 01 | 02 | 00 | 03 |
| 04 | 00 | 00 | 01 | 00 | 24 | 00 | 02 | 01 | 00 | 44 | 01 | 00 | 01 | 00 | 64 | 01 | 02 | 01 | 00 |
| 05 | 00 | 00 | 01 | 01 | 25 | 00 | 02 | 01 | 01 | 45 | 01 | 00 | 01 | 01 | 65 | 01 | 02 | 01 | 01 |
| 06 | 00 | 00 | 01 | 02 | 26 | 00 | 02 | 01 | 02 | 46 | 01 | 00 | 01 | 02 | 66 | 01 | 02 | 01 | 02 |
| 07 | 00 | 00 | 01 | 03 | 27 | 00 | 02 | 01 | 03 | 47 | 01 | 00 | 01 | 03 | 67 | 01 | 02 | 01 | 03 |
| 08 | 00 | 00 | 02 | 00 | 28 | 00 | 02 | 02 | 00 | 48 | 01 | 00 | 02 | 00 | 68 | 01 | 02 | 02 | 00 |
| 09 | 00 | 00 | 02 | 01 | 29 | 00 | 02 | 02 | 01 | 49 | 01 | 00 | 02 | 01 | 69 | 01 | 02 | 02 | 01 |
| 0A | 00 | 00 | 02 | 02 | 2A | 00 | 02 | 02 | 02 | 4A | 01 | 00 | 02 | 02 | 6A | 01 | 02 | 02 | 02 |
| 0B | 00 | 00 | 02 | 03 | 2B | 00 | 02 | 02 | 03 | 4B | 01 | 00 | 02 | 03 | 6B | 01 | 02 | 02 | 03 |
| 0C | 00 | 00 | 03 | 00 | 2C | 00 | 02 | 03 | 00 | 4C | 01 | 00 | 03 | 00 | 6C | 01 | 02 | 03 | 00 |
| 0D | 00 | 00 | 03 | 01 | 2D | 00 | 02 | 03 | 01 | 4D | 01 | 00 | 03 | 01 | 6D | 01 | 02 | 03 | 01 |
| 0E | 00 | 00 | 03 | 02 | 2E | 00 | 02 | 03 | 02 | 4E | 01 | 00 | 03 | 02 | 6E | 01 | 02 | 03 | 02 |
| 0F | 00 | 00 | 03 | 03 | 2F | 00 | 02 | 03 | 03 | 4F | 01 | 00 | 03 | 03 | 6F | 01 | 02 | 03 | 03 |
| 10 | 00 | 01 | 00 | 00 | 30 | 00 | 03 | 00 | 00 | 50 | 01 | 01 | 00 | 00 | 70 | 01 | 03 | 00 | 00 |
| 11 | 00 | 01 | 00 | 01 | 31 | 00 | 03 | 00 | 01 | 51 | 01 | 01 | 00 | 01 | 71 | 01 | 03 | 00 | 01 |
| 12 | 00 | 01 | 00 | 02 | 32 | 00 | 03 | 00 | 02 | 52 | 01 | 01 | 00 | 02 | 72 | 01 | 03 | 00 | 02 |
| 13 | 00 | 01 | 00 | 03 | 33 | 00 | 03 | 00 | 03 | 53 | 01 | 01 | 00 | 03 | 73 | 01 | 03 | 00 | 03 |
| 14 | 00 | 01 | 01 | 00 | 34 | 00 | 03 | 01 | 00 | 54 | 01 | 01 | 01 | 00 | 74 | 01 | 03 | 01 | 00 |
| 15 | 00 | 01 | 01 | 01 | 35 | 00 | 03 | 01 | 01 | 55 | 01 | 01 | 01 | 01 | 75 | 01 | 03 | 01 | 01 |
| 16 | 00 | 01 | 01 | 02 | 36 | 00 | 03 | 01 | 02 | 56 | 01 | 01 | 01 | 02 | 76 | 01 | 03 | 01 | 02 |
| 17 | 00 | 01 | 01 | 03 | 37 | 00 | 03 | 01 | 03 | 57 | 01 | 01 | 01 | 03 | 77 | 01 | 03 | 01 | 03 |
| 18 | 00 | 01 | 02 | 00 | 38 | 00 | 03 | 02 | 00 | 58 | 01 | 01 | 02 | 00 | 78 | 01 | 03 | 02 | 00 |
| 19 | 00 | 01 | 02 | 01 | 39 | 00 | 03 | 02 | 01 | 59 | 01 | 01 | 02 | 01 | 79 | 01 | 03 | 02 | 01 |
| 1A | 00 | 01 | 02 | 02 | 3A | 00 | 03 | 02 | 02 | 5A | 01 | 01 | 02 | 02 | 7A | 01 | 03 | 02 | 02 |
| 1B | 00 | 01 | 02 | 03 | 3B | 00 | 03 | 02 | 03 | 5B | 01 | 01 | 02 | 03 | 7B | 01 | 03 | 02 | 03 |
| 1C | 00 | 01 | 03 | 00 | 3C | 00 | 03 | 03 | 00 | 5C | 01 | 01 | 03 | 00 | 7C | 01 | 03 | 03 | 00 |
| 1D | 00 | 01 | 03 | 01 | 3D | 00 | 03 | 03 | 01 | 5D | 01 | 01 | 03 | 01 | 7D | 01 | 03 | 03 | 01 |
| 1E | 00 | 01 | 03 | 02 | 3E | 00 | 03 | 03 | 02 | 5E | 01 | 01 | 03 | 02 | 7E | 01 | 03 | 03 | 02 |
| 1F | 00 | 01 | 03 | 03 | 3F | 00 | 03 | 03 | 03 | 5F | 01 | 01 | 03 | 03 | 7F | 01 | 03 | 03 | 03 |

4-bit Mode - Destination Column 0

| Src | Destination Row | | Src | Destination Row | | Src | Destination Row | | Src | Destination Row | |
|---|---|---|---|---|---|---|---|---|---|---|---|
| Byte | 0 | 1 | Byte | 0 | 1 | Byte | 0 | 1 | Byte | 0 | 1 |
| 00 | 0000 | 0000 | 20 | 2000 | 0000 | 40 | 4000 | 0000 | 60 | 6000 | 0000 |
| 01 | 0000 | 1000 | 21 | 2000 | 1000 | 41 | 4000 | 1000 | 61 | 6000 | 1000 |
| 02 | 0000 | 2000 | 22 | 2000 | 2000 | 42 | 4000 | 2000 | 62 | 6000 | 2000 |
| 03 | 0000 | 3000 | 23 | 2000 | 3000 | 43 | 4000 | 3000 | 63 | 6000 | 3000 |
| 04 | 0000 | 4000 | 24 | 2000 | 4000 | 44 | 4000 | 4000 | 64 | 6000 | 4000 |
| 05 | 0000 | 5000 | 25 | 2000 | 5000 | 45 | 4000 | 5000 | 65 | 6000 | 5000 |
| 06 | 0000 | 6000 | 26 | 2000 | 6000 | 46 | 4000 | 6000 | 66 | 6000 | 6000 |
| 07 | 0000 | 7000 | 27 | 2000 | 7000 | 47 | 4000 | 7000 | 67 | 6000 | 7000 |
| 08 | 0000 | 8000 | 28 | 2000 | 8000 | 48 | 4000 | 8000 | 68 | 6000 | 8000 |
| 09 | 0000 | 9000 | 29 | 2000 | 9000 | 49 | 4000 | 9000 | 69 | 6000 | 9000 |
| 0A | 0000 | A000 | 2A | 2000 | A000 | 4A | 4000 | A000 | 6A | 6000 | A000 |
| 0B | 0000 | B000 | 2B | 2000 | B000 | 4B | 4000 | B000 | 6B | 6000 | B000 |
| 0C | 0000 | C000 | 2C | 2000 | C000 | 4C | 4000 | C000 | 6C | 6000 | C000 |
| 0D | 0000 | D000 | 2D | 2000 | D000 | 4D | 4000 | D000 | 6D | 6000 | D000 |
| 0E | 0000 | E000 | 2E | 2000 | E000 | 4E | 4000 | E000 | 6E | 6000 | E000 |
| 0F | 0000 | F000 | 2F | 2000 | F000 | 4F | 4000 | F000 | 6F | 6000 | F000 |
| 10 | 1000 | 0000 | 30 | 3000 | 0000 | 50 | 5000 | 0000 | 70 | 7000 | 0000 |
| 11 | 1000 | 1000 | 31 | 3000 | 1000 | 51 | 5000 | 1000 | 71 | 7000 | 1000 |

-continued 4-bit Mode - Destination Column 0

| Src Byte | Destination Row 0 | Destination Row 1 | Src Byte | Destination Row 0 | Destination Row 1 | Src Byte | Destination Row 0 | Destination Row 1 | Src Byte | Destination Row 0 | Destination Row 1 |
|---|---|---|---|---|---|---|---|---|---|---|---|
| 12 | 1000 | 2000 | 32 | 3000 | 2000 | 52 | 5000 | 2000 | 72 | 7000 | 2000 |
| 13 | 1000 | 3000 | 33 | 3000 | 3000 | 53 | 5000 | 3000 | 73 | 7000 | 3000 |
| 14 | 1000 | 4000 | 34 | 3000 | 4000 | 54 | 5000 | 4000 | 74 | 7000 | 4000 |
| 15 | 1000 | 5000 | 35 | 3000 | 5000 | 55 | 5000 | 5000 | 75 | 7000 | 5000 |
| 16 | 1000 | 6000 | 36 | 3000 | 6000 | 56 | 5000 | 6000 | 76 | 7000 | 6000 |
| 17 | 1000 | 7000 | 37 | 3000 | 7000 | 57 | 5000 | 7000 | 77 | 7000 | 7000 |
| 18 | 1000 | 8000 | 38 | 3000 | 8000 | 58 | 5000 | 8000 | 78 | 7000 | 8000 |
| 19 | 1000 | 9000 | 39 | 3000 | 9000 | 59 | 5000 | 9000 | 79 | 7000 | 9000 |
| 1A | 1000 | A000 | 3A | 3000 | A000 | 5A | 5000 | A000 | 7A | 7000 | A000 |
| 1B | 1000 | B000 | 3B | 3000 | B000 | 5B | 5000 | B000 | 7B | 7000 | B000 |
| 1c | 1000 | C000 | 3C | 3000 | C000 | 5C | 5000 | C000 | 7C | 7000 | C000 |
| 1D | 1000 | D000 | 3D | 3000 | D000 | 5D | 5000 | D000 | 7D | 7000 | D000 |
| 1E | 1000 | E000 | 3E | 3000 | E000 | 5E | 5000 | E000 | 7E | 7000 | E000 |
| 1F | 1000 | F000 | 3F | 3000 | F000 | 5F | 5000 | F000 | 7F | 7000 | F000 |
| 80 | 8000 | 0000 | A0 | A000 | 0000 | C0 | C000 | 0000 | E0 | E000 | 0000 |
| 81 | 8000 | 1000 | A1 | A000 | 1000 | C1 | C000 | 1000 | E1 | E000 | 1000 |
| 82 | 8000 | 2000 | A2 | A000 | 2000 | C2 | C000 | 2000 | E2 | E000 | 2000 |
| 83 | 8000 | 3000 | A3 | A000 | 3000 | C3 | C000 | 3000 | E3 | E000 | 3000 |
| 84 | 8000 | 4000 | A4 | A000 | 4000 | C4 | C000 | 4000 | E4 | E000 | 4000 |
| 85 | 8000 | 5000 | A5 | A000 | 5000 | C5 | C000 | 5000 | E5 | E000 | 5000 |
| 86 | 8000 | 6000 | A6 | A000 | 6000 | C6 | C000 | 6000 | E6 | E000 | 6000 |
| 87 | 8000 | 7000 | A7 | A000 | 7000 | C7 | C000 | 7000 | E7 | E000 | 7000 |
| 88 | 8000 | 8000 | A8 | A000 | 8000 | C8 | C000 | 8000 | E8 | E000 | 8000 |
| 89 | 8000 | 9000 | A9 | A000 | 9000 | C9 | C000 | 9000 | E9 | E000 | 9000 |
| 8A | 8000 | A000 | AA | A000 | A000 | CA | C000 | A000 | EA | E000 | A000 |
| 8B | 8000 | B000 | AB | A000 | B000 | CB | C000 | B000 | EB | E000 | B000 |
| 8C | 8000 | C000 | AC | A000 | C000 | CC | C000 | C000 | EC | E000 | C000 |
| 8D | 8000 | D000 | AD | A000 | D000 | CD | C000 | D000 | ED | E000 | D000 |
| 8E | 8000 | E000 | AE | A000 | E000 | CE | C000 | E000 | EE | E000 | E000 |
| 8F | 8000 | F000 | AF | A000 | F000 | CF | C000 | F000 | EF | E000 | F000 |
| 90 | 9000 | 0000 | B0 | B000 | 0000 | D0 | D000 | 0000 | F0 | F000 | 0000 |
| 91 | 9000 | 1000 | B1 | B000 | 1000 | D1 | D000 | 1000 | F1 | F000 | 1000 |
| 92 | 9000 | 2000 | B2 | B000 | 2000 | D2 | D000 | 2000 | F2 | F000 | 2000 |
| 93 | 9000 | 3000 | B3 | B000 | 3000 | D3 | D000 | 3000 | F3 | F000 | 3000 |
| 94 | 9000 | 4000 | B4 | B000 | 4000 | D4 | D000 | 4000 | F4 | F000 | 4000 |
| 95 | 9000 | 5000 | B5 | B000 | 5000 | D5 | D000 | 5000 | F5 | F000 | 5000 |
| 96 | 9000 | 6000 | B6 | B000 | 6000 | D6 | D000 | 6000 | F6 | F000 | 6000 |
| 97 | 9000 | 7000 | B7 | B000 | 7000 | D7 | D000 | 1000 | F7 | F000 | 7000 |
| 98 | 9000 | 8000 | B8 | B000 | 8000 | D8 | D000 | 8000 | F8 | F000 | 8000 |
| 99 | 9000 | 9000 | B9 | B000 | 9000 | D9 | D000 | 9000 | F9 | F000 | 9000 |
| 9A | 9000 | A000 | BA | B000 | A000 | DA | D000 | A000 | FA | F000 | A000 |
| 9B | 9000 | B000 | BB | B000 | B000 | DB | D000 | B000 | FB | F000 | B000 |
| 9C | 9000 | C000 | BC | B000 | C000 | DC | D000 | C000 | FC | F000 | C000 |
| 9D | 9000 | D000 | BD | B000 | D000 | DD | D000 | D000 | FD | F000 | D000 |
| 9E | 9000 | E000 | BE | B000 | E000 | DE | D000 | E000 | FE | F000 | E000 |
| 9F | 9000 | F000 | BF | B000 | F000 | DF | D000 | F000 | FF | F000 | F000 |

4-bit Mode - Destination Column 1

| Src Byte | Destination Row 0 | Destination Row 1 | Src Byte | Destination Row 0 | Destination Row 1 | Src Byte | Destination Row 0 | Destination Row 1 | Src Byte | Destination Row 0 | Destination Row 1 |
|---|---|---|---|---|---|---|---|---|---|---|---|
| 00 | 0000 | 0000 | 20 | 0200 | 0000 | 40 | 0400 | 0000 | 60 | 0600 | 0000 |
| 01 | 0000 | 0100 | 21 | 0200 | 0100 | 41 | 0400 | 0100 | 61 | 0600 | 0100 |
| 02 | 0000 | 0200 | 22 | 0200 | 0200 | 42 | 0400 | 0200 | 62 | 0600 | 0200 |
| 03 | 0000 | 0300 | 23 | 0200 | 0300 | 43 | 0400 | 0300 | 63 | 0600 | 0300 |
| 04 | 0000 | 0400 | 24 | 0200 | 0400 | 44 | 0400 | 0400 | 64 | 0600 | 0400 |
| 05 | 0000 | 0500 | 25 | 0200 | 0500 | 45 | 0400 | 0500 | 65 | 0600 | 0500 |
| 06 | 0000 | 0600 | 26 | 0200 | 0600 | 46 | 0400 | 0600 | 66 | 0600 | 0600 |
| 07 | 0000 | 0700 | 27 | 0200 | 0700 | 47 | 0400 | 0700 | 67 | 0600 | 0700 |
| 08 | 0000 | 0800 | 28 | 0200 | 0800 | 48 | 0400 | 0800 | 68 | 0600 | 0800 |
| 09 | 0000 | 0900 | 29 | 0200 | 0900 | 49 | 0400 | 0900 | 69 | 0600 | 0900 |
| 0A | 0000 | 0A00 | 2A | 0200 | 0A00 | 4A | 0400 | 0A00 | 6A | 0600 | 0A00 |
| 0B | 0000 | 0B00 | 2B | 0200 | 0B00 | 4B | 0400 | 0B00 | 6B | 0600 | 0B00 |
| 0C | 0000 | 0C00 | 2C | 0200 | 0C00 | 4C | 0400 | 0C00 | 6C | 0600 | 0C00 |
| 0D | 0000 | 0D00 | 2D | 0200 | 0D00 | 4D | 0400 | 0D00 | 6D | 0600 | 0D00 |
| 0E | 0000 | 0E00 | 2E | 0200 | 0E00 | 4E | 0400 | 0E00 | 6E | 0600 | 0E00 |
| 0F | 0000 | 0F00 | 2F | 0200 | 0F00 | 4F | 0400 | 0F00 | 6F | 0600 | 0F00 |
| 10 | 0100 | 0000 | 30 | 0300 | 0000 | 50 | 0500 | 0000 | 70 | 0700 | 0000 |
| 11 | 0100 | 0100 | 31 | 0300 | 0100 | 51 | 0500 | 0100 | 71 | 0700 | 0100 |
| 12 | 0100 | 0200 | 32 | 0300 | 0200 | 52 | 0500 | 0200 | 72 | 0700 | 0200 |
| 13 | 0100 | 0300 | 33 | 0300 | 0300 | 53 | 0500 | 0300 | 73 | 0700 | 0300 |
| 14 | 0100 | 0400 | 34 | 0300 | 0400 | 54 | 0500 | 0400 | 74 | 0700 | 0400 |
| 15 | 0100 | 0500 | 35 | 0300 | 0500 | 56 | 0500 | 0500 | 75 | 0700 | 0500 |

-continued

| 4-bit Mode - Destination Column 1 | | | | | | | | | | | |
|---|---|---|---|---|---|---|---|---|---|---|---|
| Src | Destination Row | | Src | Destination Row | | Src | Destination Row | | Src | Destination Row | |
| Byte | 0 | 1 | Byte | 0 | 1 | Byte | 0 | 1 | Byte | 0 | 1 |
| 16 | 0100 | 0600 | 36 | 0300 | 0600 | 56 | 0500 | 0600 | 76 | 0700 | 0600 |
| 17 | 0100 | 0700 | 37 | 0300 | 0700 | 57 | 0500 | 0700 | 77 | 0700 | 0700 |
| 18 | 0100 | 0800 | 38 | 0300 | 0800 | 58 | 0500 | 0800 | 78 | 0700 | 0800 |
| 19 | 0100 | 0900 | 39 | 0300 | 0900 | 59 | 0500 | 0900 | 79 | 0700 | 0900 |
| 1A | 0100 | 0A00 | 3A | 0300 | 0A00 | 5A | 0500 | 0A00 | 7A | 0700 | 0A00 |
| 1B | 0100 | 0B00 | 3B | 0300 | 0B00 | 5B | 0500 | 0B00 | 7B | 0700 | 0B00 |
| 1C | 0100 | 0C00 | 3C | 0300 | 0C00 | 5C | 0500 | 0C00 | 7C | 0700 | 0C00 |
| 1D | 0100 | 0D00 | 3D | 0300 | 0D00 | 5D | 0500 | 0D00 | 7D | 0700 | 0D00 |
| 1E | 0100 | 0E00 | 3E | 0300 | 0E00 | 5E | 0500 | 0E00 | 7E | 0700 | 0E00 |
| 1F | 0100 | 0F00 | 3F | 0300 | 0F00 | 5F | 0050 | 0F00 | 7F | 0700 | 0F00 |
| 80 | 0800 | 0000 | A0 | 0A00 | 0000 | C0 | 0C00 | 0000 | E0 | 0E00 | 0000 |
| 81 | 0800 | 0100 | A1 | 0A00 | 0100 | C1 | 0C00 | 0100 | E1 | 0E00 | 0100 |
| 82 | 0800 | 0200 | A2 | 0A00 | 0200 | C2 | 0C00 | 0200 | E2 | 0E00 | 0200 |
| 83 | 0800 | 0300 | A3 | 0A00 | 0300 | C3 | 0C00 | 0300 | E3 | 0E00 | 0300 |
| 84 | 0800 | 0400 | A4 | 0A00 | 0400 | C4 | 0C00 | 0400 | E4 | 0E00 | 0400 |
| 85 | 0800 | 0500 | A5 | 0A00 | 0500 | C5 | 0C00 | 0500 | E5 | 0E00 | 0500 |
| 86 | 0800 | 0600 | A6 | 0A00 | 0600 | C6 | 0C00 | 0600 | E6 | 0E00 | 0600 |
| 87 | 0800 | 0700 | A7 | 0A00 | 0700 | C7 | 0C00 | 0700 | E7 | 0E00 | 0700 |
| 88 | 0800 | 0800 | A8 | 0A00 | 0800 | C8 | 0C00 | 0800 | E8 | 0E00 | 0800 |
| 89 | 0800 | 0900 | A9 | 0A00 | 0900 | C9 | 0C00 | 0900 | E9 | 0E00 | 0900 |
| 8A | 0800 | 0A00 | AA | 0A00 | 0A00 | CA | 0C00 | 0A00 | EA | 0E00 | 0A00 |
| 8B | 0800 | 0B00 | AB | 0A00 | 0B00 | CB | 0C00 | 0B00 | EB | 0E00 | 0B00 |
| 8C | 0800 | 0C00 | AC | 0A00 | 0C00 | CC | 0C00 | 0C00 | EC | 0E00 | 0C00 |
| 8D | 0800 | 0D00 | AD | 0A00 | 0D00 | CD | 0C00 | 0D00 | ED | 0E00 | 0D00 |
| 8E | 0800 | 0E00 | AE | 0A00 | 0E00 | CE | 0C00 | 0E00 | EE | 0E00 | 0E00 |
| 8F | 0800 | 0F00 | AF | 0A00 | 0F00 | CF | 0C00 | 0F00 | EF | 0E00 | 0F00 |
| 90 | 0900 | 0000 | B0 | 0B00 | 0000 | D0 | 0D00 | 0000 | F0 | 0F00 | 0000 |
| 91 | 0900 | 0100 | B1 | 0B00 | 0100 | D1 | 0D00 | 0100 | F1 | 0F00 | 0100 |
| 92 | 0900 | 0200 | B2 | 0B00 | 0200 | D2 | 0D00 | 0200 | F2 | 0F00 | 0200 |
| 93 | 0900 | 0300 | B3 | 0B00 | 0300 | D3 | 0D00 | 0300 | F3 | 0F00 | 0300 |
| 94 | 0900 | 0400 | B4 | 0B00 | 0400 | D4 | 0D00 | 0400 | F4 | 0F00 | 0400 |
| 95 | 0900 | 0500 | B5 | 0B00 | 0500 | D5 | 0D00 | 0500 | F5 | 0F00 | 0500 |
| 96 | 0900 | 0600 | B6 | 0B00 | 0600 | D6 | 0D00 | 0600 | F6 | 0F00 | 0600 |
| 97 | 0900 | 0700 | B7 | 0B00 | 0700 | D7 | 0D00 | 0300 | F7 | 0F00 | 0700 |
| 98 | 0900 | 0800 | B8 | 0B00 | 0800 | D8 | 0D00 | 0800 | F8 | 0F00 | 0800 |
| 99 | 0900 | 0900 | B9 | 0B00 | 0900 | D9 | 0D00 | 0900 | F9 | 0F00 | 0900 |
| 9A | 0900 | 0A00 | BA | 0B00 | 0A00 | DA | 0D00 | 0A00 | FA | 0F00 | 0A00 |
| 9B | 0900 | 0B00 | BB | 0B00 | 0B00 | DB | 0D00 | 0B00 | FB | 0F00 | 0B00 |
| 9C | 0900 | 0C00 | BC | 0B00 | 0C00 | DC | 0D00 | 0C00 | FC | 0F00 | 0C00 |
| 9D | 0900 | 0D00 | BD | 0B00 | 0D00 | DD | 0D00 | 0D00 | FD | 0F00 | 0D00 |
| 9E | 0900 | 0E00 | BE | 0B00 | 0E00 | DE | 0D00 | 0E00 | FE | 0F00 | 0E00 |
| 9F | 0900 | 0F00 | BF | 0B00 | 0F00 | DF | 0D00 | 0F00 | FF | 0F00 | 0F00 |

| 4-bit Mode - Destination Column 2 | | | | | | | | | | | |
|---|---|---|---|---|---|---|---|---|---|---|---|
| Src | Destination Row | | Src | Destination Row | | Src | Destination Row | | Src | Destination Row | |
| Byte | 0 | 1 | Byte | 0 | 1 | Byte | 0 | 1 | Byte | 0 | 1 |
| 00 | 0000 | 0000 | 20 | 0020 | 0000 | 40 | 0040 | 0000 | 60 | 0060 | 0000 |
| 01 | 0000 | 0010 | 21 | 0020 | 0010 | 41 | 0040 | 0010 | 61 | 0060 | 0010 |
| 02 | 0000 | 0020 | 22 | 0020 | 0020 | 42 | 0040 | 0020 | 62 | 0060 | 0020 |
| 03 | 0000 | 0030 | 23 | 0020 | 0030 | 43 | 0040 | 0030 | 63 | 0060 | 0030 |
| 04 | 0000 | 0040 | 24 | 0020 | 0040 | 44 | 0040 | 0040 | 64 | 0060 | 0040 |
| 05 | 0000 | 0050 | 25 | 0020 | 0050 | 45 | 0040 | 0050 | 65 | 0060 | 0050 |
| 06 | 0000 | 0060 | 26 | 0020 | 0060 | 46 | 0040 | 0060 | 66 | 0060 | 0060 |
| 07 | 0000 | 0070 | 27 | 0020 | 0070 | 47 | 0040 | 0070 | 67 | 0060 | 0070 |
| 08 | 0000 | 0080 | 28 | 0020 | 0080 | 48 | 0040 | 0080 | 68 | 0060 | 0080 |
| 09 | 0000 | 0090 | 29 | 0020 | 0090 | 49 | 0040 | 0090 | 69 | 0060 | 0090 |
| 0A | 0000 | 00A0 | 2A | 0020 | 00A0 | 4A | 0040 | 00A0 | 6A | 0060 | 00A0 |
| 0B | 0000 | 00B0 | 2B | 0020 | 00B0 | 4B | 0040 | 00B0 | 6B | 0060 | 00B0 |
| 0C | 0000 | 00C0 | 2C | 0020 | 00C0 | 4C | 0040 | 00C0 | 6C | 0060 | 00C0 |
| 0D | 0000 | 00D0 | 2D | 0020 | 00D0 | 4D | 0040 | 00D0 | 6D | 0060 | 00D0 |
| 0E | 0000 | 00E0 | 2E | 0020 | 00E0 | 4E | 0040 | 00E0 | 6E | 0060 | 00E0 |
| 0F | 0000 | 00F0 | 2F | 0020 | 00F0 | 4F | 0040 | 00F0 | 6F | 0060 | 00F0 |
| 10 | 0010 | 0000 | 30 | 0030 | 0000 | 50 | 0050 | 0000 | 70 | 0070 | 0000 |
| 11 | 0010 | 0010 | 31 | 0030 | 0010 | 51 | 0050 | 0010 | 71 | 0070 | 0010 |
| 12 | 0010 | 0020 | 32 | 0030 | 0020 | 52 | 0050 | 0020 | 72 | 0070 | 0020 |
| 13 | 0010 | 0030 | 33 | 0030 | 0030 | 53 | 0050 | 0030 | 73 | 0070 | 0030 |
| 14 | 0010 | 0040 | 34 | 0030 | 0040 | 54 | 0050 | 0040 | 74 | 0070 | 0040 |
| 15 | 0010 | 0050 | 35 | 0030 | 0050 | 55 | 0050 | 0050 | 75 | 0070 | 0050 |
| 16 | 0010 | 0060 | 36 | 0030 | 0060 | 56 | 0050 | 0060 | 76 | 0070 | 0060 |
| 17 | 0010 | 0070 | 37 | 0030 | 0070 | 57 | 0050 | 0070 | 77 | 0070 | 0070 |
| 18 | 0010 | 0080 | 38 | 0030 | 0080 | 58 | 0050 | 0080 | 78 | 0070 | 0080 |
| 19 | 0010 | 0090 | 39 | 0030 | 0090 | 59 | 0050 | 0090 | 79 | 0070 | 0090 |

-continued

| 4-bit Mode - Destination Column 2 | | | | | | | | | | | |
|---|---|---|---|---|---|---|---|---|---|---|---|
| Src | Destination Row | | Src | Destination Row | | Src | Destination Row | | Src | Destination Row | |
| Byte | 0 | 1 | Byte | 0 | 1 | Byte | 0 | 1 | Byte | 0 | 1 |
| 1A | 0010 | 00A0 | 3A | 0030 | 00A0 | 5A | 0050 | 00A0 | 7A | 0070 | 00A0 |
| 1B | 0010 | 00B0 | 3B | 0030 | 00B0 | 5B | 0050 | 00B0 | 7B | 0070 | 00B0 |
| 1C | 0010 | 00C0 | 3C | 0030 | 00C0 | 5C | 0050 | 00C0 | 7C | 0070 | 00C0 |
| 1D | 0010 | 00D0 | 3D | 0030 | 00D0 | 5D | 0050 | 00D0 | 7D | 0070 | 00D0 |
| 1E | 0010 | 00E0 | 3E | 0030 | 00E0 | 5E | 0050 | 00E0 | 7E | 0070 | 00E0 |
| 1F | 0010 | 00F0 | 3F | 0030 | 00F0 | 5F | 0050 | 00F0 | 7F | 0070 | 00F0 |
| 80 | 0080 | 0000 | A0 | 00A0 | 0000 | C0 | 00C0 | 0000 | E0 | 00E0 | 0000 |
| 81 | 0080 | 0010 | A1 | 00A0 | 0010 | C1 | 00C0 | 0010 | E1 | 00E0 | 0010 |
| 82 | 0080 | 0020 | A2 | 00A0 | 0020 | C2 | 00C0 | 0020 | E2 | 00E0 | 0020 |
| 83 | 0080 | 0030 | A3 | 00A0 | 0030 | C3 | 00C0 | 0030 | E3 | 00E0 | 0030 |
| 84 | 0080 | 0040 | A4 | 00A0 | 0040 | C4 | 00C0 | 0040 | E4 | 00E0 | 0040 |
| 85 | 0080 | 0050 | A5 | 00A0 | 0050 | C5 | 00C0 | 0050 | E5 | 00E0 | 0050 |
| 86 | 0080 | 0060 | A6 | 00A0 | 0060 | C6 | 00C0 | 0060 | E6 | 00E0 | 0060 |
| 87 | 0080 | 0070 | A7 | 00A0 | 0070 | C7 | 00C0 | 0070 | E7 | 00E0 | 0070 |
| 88 | 0080 | 0080 | A8 | 00A0 | 0080 | C8 | 00C0 | 0080 | E8 | 00E0 | 0080 |
| 89 | 0080 | 0090 | A9 | 00A0 | 0090 | C9 | 00C0 | 0090 | E9 | 00E0 | 0090 |
| 8A | 0080 | 00A0 | AA | 00A0 | 00A0 | CA | 00C0 | 00A0 | EA | 00E0 | 00A0 |
| 8B | 0080 | 00B0 | AB | 00A0 | 00B0 | CB | 00C0 | 00B0 | EB | 00E0 | 00B0 |
| 8C | 0080 | 00C0 | AC | 00A0 | 00C0 | CC | 00C0 | 00C0 | EC | 00E0 | 00C0 |
| 8D | 0080 | 00D0 | AD | 00A0 | 00D0 | CD | 00C0 | 00D0 | ED | 00E0 | 00D0 |
| 8E | 0080 | 00E0 | AE | 00A0 | 00E0 | CE | 00C0 | 00E0 | EE | 00E0 | 00E0 |
| 8F | 0080 | 00F0 | AF | 00A0 | 00F0 | CF | 00C0 | 00F0 | EF | 00E0 | 00F0 |
| 90 | 0090 | 0000 | B0 | 00B0 | 0000 | D0 | 00D0 | 0000 | F0 | 00F0 | 0000 |
| 91 | 0090 | 0010 | B1 | 00B0 | 0010 | D1 | 00D0 | 0010 | F1 | 00F0 | 0010 |
| 92 | 0090 | 0020 | B2 | 00B0 | 0020 | D2 | 00D0 | 0020 | F2 | 00F0 | 0020 |
| 93 | 0090 | 0030 | B3 | 00B0 | 0030 | D3 | 00D0 | 0030 | F3 | 00F0 | 0030 |
| 94 | 0090 | 0040 | B4 | 00B0 | 0040 | D4 | 00D0 | 0040 | F4 | 00F0 | 0040 |
| 95 | 0090 | 0050 | B5 | 00B0 | 0050 | D5 | 00D0 | 0050 | F5 | 00F0 | 0050 |
| 96 | 0090 | 0060 | B6 | 00B0 | 0060 | D6 | 00D0 | 0060 | F6 | 00F0 | 0060 |
| 97 | 0090 | 0070 | B7 | 00B0 | 0070 | D7 | 00D0 | 0070 | F7 | 00F0 | 0070 |
| 98 | 0090 | 0080 | B8 | 00B0 | 0080 | D8 | 00D0 | 0080 | F8 | 00F0 | 0080 |
| 99 | 0090 | 0090 | B9 | 00B0 | 0090 | D9 | 00D0 | 0090 | F9 | 00F0 | 0090 |
| 9A | 0090 | 00A0 | BA | 00B0 | 00A0 | DA | 00D0 | 00A0 | FA | 00F0 | 00A0 |
| 9B | 0090 | 00B0 | BB | 00B0 | 00B0 | DB | 00D0 | 00B0 | FB | 00F0 | 00B0 |
| 9C | 0090 | 00C0 | BC | 00B0 | 00C0 | DC | 00D0 | 00C0 | FC | 00F0 | 00C0 |
| 9D | 0090 | 00D0 | BD | 00B0 | 00D0 | DD | 00D0 | 00D0 | FD | 00F0 | 00D0 |
| 9E | 0090 | 00E0 | BE | 00B0 | 00E0 | DE | 00D0 | 00E0 | FE | 00F0 | 00E0 |
| 9F | 0090 | 00F0 | BF | 00B0 | 00F0 | DF | 00D0 | 00F0 | FF | 00F0 | 00F0 |

| 4-bit Mode - Destination Column 3 | | | | | | | | | | | |
|---|---|---|---|---|---|---|---|---|---|---|---|
| Src | Destination Row | | Src | Destination Row | | Src | Destination Row | | Src | Destination Row | |
| Byte | 0 | 1 | Byte | 0 | 1 | Byte | 0 | 1 | Byte | 0 | 1 |
| 00 | 0000 | 0000 | 20 | 0002 | 0000 | 40 | 0004 | 0000 | 60 | 0006 | 0000 |
| 01 | 0000 | 0001 | 21 | 0002 | 0001 | 41 | 0004 | 0001 | 61 | 0006 | 0001 |
| 02 | 0000 | 0002 | 22 | 0002 | 0002 | 42 | 0004 | 0002 | 62 | 0006 | 0002 |
| 03 | 0000 | 0003 | 23 | 0002 | 0003 | 43 | 0004 | 0003 | 63 | 0006 | 0003 |
| 04 | 0000 | 0004 | 24 | 0002 | 0004 | 44 | 0004 | 0004 | 64 | 0006 | 0004 |
| 05 | 0000 | 0005 | 25 | 0002 | 0005 | 45 | 0004 | 0005 | 65 | 0006 | 0005 |
| 06 | 0000 | 0006 | 26 | 0002 | 0006 | 46 | 0004 | 0006 | 66 | 0006 | 0006 |
| 07 | 0000 | 0007 | 27 | 0002 | 0007 | 47 | 0004 | 0007 | 67 | 0006 | 0007 |
| 08 | 0000 | 0008 | 28 | 0002 | 0008 | 48 | 0004 | 0008 | 68 | 0006 | 0008 |
| 09 | 0000 | 0009 | 29 | 0002 | 0009 | 49 | 0004 | 0009 | 69 | 0006 | 0009 |
| 0A | 0000 | 000A | 2A | 0002 | 000A | 4A | 0004 | 000A | 6A | 0006 | 000A |
| 0B | 0000 | 000B | 2B | 0002 | 000B | 4B | 0004 | 000B | 6B | 0006 | 000B |
| 0C | 0000 | 000C | 2C | 0002 | 000C | 4C | 0004 | 000C | 6C | 0006 | 000C |
| 0D | 0000 | 000D | 2D | 0002 | 000D | 4D | 0004 | 000D | 6D | 0006 | 000D |
| 0E | 0000 | 000E | 2E | 0002 | 000E | 4E | 0004 | 000E | 6E | 0006 | 000E |
| 0F | 0000 | 000F | 2F | 0002 | 000F | 4F | 0004 | 000F | 6F | 0006 | 000F |
| 10 | 0001 | 0000 | 30 | 0003 | 0000 | 50 | 0005 | 0000 | 70 | 0007 | 0000 |
| 11 | 0001 | 0001 | 31 | 0003 | 0001 | 51 | 0005 | 0001 | 71 | 0007 | 0001 |
| 12 | 0001 | 0002 | 32 | 0003 | 0002 | 52 | 0005 | 0002 | 72 | 0007 | 0002 |
| 13 | 0001 | 0003 | 33 | 0003 | 0003 | 53 | 0005 | 0003 | 73 | 0007 | 0003 |
| 14 | 0001 | 0004 | 34 | 0003 | 0004 | 54 | 0005 | 0004 | 74 | 0007 | 0004 |
| 15 | 0001 | 0005 | 35 | 0003 | 0005 | 55 | 0005 | 0005 | 75 | 0007 | 0005 |
| 16 | 0001 | 0006 | 36 | 0003 | 0006 | 56 | 0005 | 0006 | 76 | 0007 | 0006 |
| 17 | 0001 | 0007 | 37 | 0003 | 0007 | 57 | 0005 | 0007 | 77 | 0007 | 0007 |
| 18 | 0001 | 0008 | 38 | 0003 | 0008 | 58 | 0005 | 0008 | 78 | 0007 | 0008 |
| 19 | 0001 | 0009 | 39 | 0003 | 0009 | 59 | 0005 | 0009 | 79 | 0007 | 0009 |
| 1A | 0001 | 000A | 3A | 0003 | 000A | 5A | 0005 | 000A | 7A | 0007 | 000A |
| 1B | 0001 | 000B | 3B | 0003 | 000B | 5B | 0005 | 000B | 7B | 0007 | 000B |
| 1C | 0001 | 000C | 3C | 0003 | 000C | 5C | 0005 | 000C | 7C | 0007 | 000C |
| 1D | 0001 | 000D | 3D | 0003 | 000D | 5D | 0005 | 000D | 7D | 0007 | 000D |

-continued

| 4-bit Mode - Destination Column 3 | | | | | | | | | | | |
|---|---|---|---|---|---|---|---|---|---|---|---|
| Src | Destination Row | | Src | Destination Row | | Src | Destination Row | | Src | Destination Row | |
| Byte | 0 | 1 | Byte | 0 | 1 | Byte | 0 | 1 | Byte | 0 | 1 |
| 1E | 0001 | 000E | 3E | 0003 | 000E | 5E | 0005 | 000E | 7E | 0007 | 000E |
| 1F | 0001 | 000F | 3F | 0003 | 000F | 5F | 0005 | 000F | 7F | 0007 | 000F |
| 80 | 0008 | 0000 | A0 | 000A | 0000 | C0 | 000C | 0000 | E0 | 000E | 0000 |
| 81 | 0008 | 0001 | A1 | 000A | 0001 | C1 | 000C | 0001 | E1 | 000E | 0001 |
| 82 | 0008 | 0002 | A2 | 000A | 0002 | C2 | 000C | 0002 | E2 | 000E | 0002 |
| 83 | 0008 | 0003 | A3 | 000A | 0003 | C3 | 000C | 0003 | E3 | 000E | 0003 |
| 84 | 0008 | 0004 | A4 | 000A | 0004 | C4 | 000C | 0004 | E4 | 000E | 0004 |
| 85 | 0008 | 0005 | A5 | 000A | 0005 | C5 | 000C | 0005 | E5 | 000E | 0005 |
| 86 | 0008 | 0006 | A6 | 000A | 0006 | C6 | 000C | 0006 | E6 | 000E | 0006 |
| 87 | 0008 | 0007 | A7 | 000A | 0007 | C7 | 000C | 0007 | E7 | 000E | 0007 |
| 88 | 0008 | 0008 | A8 | 000A | 0008 | C8 | 000C | 0008 | E8 | 000E | 0008 |
| 89 | 0008 | 0009 | A9 | 000A | 0009 | C9 | 000C | 0009 | E9 | 000E | 0009 |
| 8A | 0008 | 000A | AA | 000A | 000A | CA | 000C | 000A | EA | 000E | 000A |
| 8B | 0008 | 000B | AB | 000A | 000B | CB | 000C | 000B | EB | 000E | 000B |
| 8C | 0008 | 000C | AC | 000A | 000C | CC | 000C | 000C | EC | 000E | 000C |
| 8D | 0008 | 000D | AD | 000A | 000D | CD | 000C | 000D | ED | 000E | 000D |
| 8E | 0008 | 000E | AE | 000A | 000E | CE | 000C | 000E | EE | 000E | 000E |
| 8F | 0008 | 000F | AF | 000A | 000F | CF | 000C | 000F | EF | 000E | 000F |
| 90 | 0009 | 0000 | B0 | 000B | 0000 | D0 | 000D | 0000 | F0 | 000F | 0000 |
| 91 | 0009 | 0001 | B1 | 000B | 0001 | D1 | 000D | 0001 | F1 | 000F | 0001 |
| 92 | 0009 | 0002 | B2 | 000B | 0002 | D2 | 000D | 0002 | F2 | 000F | 0002 |
| 93 | 0009 | 0003 | B3 | 000B | 0003 | D3 | 000D | 0003 | F3 | 000F | 0003 |
| 94 | 0009 | 0004 | B4 | 000B | 0004 | D4 | 000D | 0004 | F4 | 000F | 0004 |
| 95 | 0009 | 0005 | B5 | 000B | 0005 | D5 | 000D | 0005 | F5 | 000F | 0005 |
| 96 | 0009 | 0006 | B6 | 000B | 0006 | D6 | 000D | 0006 | F6 | 000F | 0006 |
| 97 | 0009 | 0007 | B7 | 000B | 0007 | D7 | 000D | 0007 | F7 | 000F | 0007 |
| 98 | 0009 | 0008 | B8 | 000B | 0008 | D8 | 000D | 0008 | F8 | 000F | 0008 |
| 99 | 0009 | 0009 | B9 | 000B | 0009 | D9 | 000D | 0009 | F9 | 000F | 0009 |
| 9A | 0009 | 000A | BA | 000B | 000A | DA | 000D | 000A | FA | 000F | 000A |
| 9B | 0009 | 000B | BB | 000B | 000B | DB | 000D | 000B | FB | 000F | 000B |
| 9C | 0009 | 000C | BC | 000B | 000C | DC | 000D | 000C | FC | 000F | 000C |
| 9D | 0009 | 000D | BD | 000B | 000D | DD | 000D | 000D | FD | 000F | 000D |
| 9E | 0009 | 000E | BE | 000B | 000E | DE | 000D | 000E | FE | 000F | 000E |
| 9F | 0009 | 000F | BF | 000B | 000F | DF | 000D | 000F | FF | 000F | 000F |

We claim:

1. A method for storing and accessing information within a computing environment having a first central processing unit (CPU) which is subordinate to a second CPU in accessing a first memory, for which data read and data write operations are required for modifying data stored therein and in which the first CPU has priority access to a second memory, the first CPU being directly connected to the first memory and the second memory by a system bus, and the second CPU being directly connected to the first memory by a video bus, the method comprising the steps of:

allocating a portion of the second memory for operation as a buffer to the first memory, the portion storing a plurality of blocks of data;

selectively modifying a subset of the plurality of blocks stored in the portion of the second memory responsive to change requirements of the first CPU; and transferring the modified subset of the plurality of blocks in said portion of the second memory to the first memory directly over the system bus during intervals in which the first memory is available for access by the first CPU.

2. A method as in claim 1 wherein the computing environment includes a display device and the second CPU controls operation of the display device in response to data stored in the first memory.

3. The method as in claim 1 wherein the step of transferring the subset of said plurality of blocks in said portion of the second memory includes the steps of:

determining which of the plurality of blocks have been modified and included in the subset;

reading the subset of said plurality of blocks in said portion of the second memory over the system bus, the subset having a format;

transforming the subset of said plurality of blocks in said portion of the second memory to alter the format; and writing the transformed subset to the first memory over the system bus during intervals in which the first memory is available for access by the first CPU.

4. A method as in claim 3, wherein said step of transforming said subset includes rotating said subset.

5. A computing system comprising:

a central processing unit having a plurality of input and output ports;

a display memory for storing display data blocks selectively transferred from the central processing unit to the display memory;

a display processing unit for retrieving display data stored in the display memory with higher access priority to the display memory than the central processing unit;

a system memory including addressable locations for storing a plurality of display data blocks, and addressable locations for the storage of block change data relating to addresses of a subset of the plurality of blocks, the subset representing ones of said blocks having been most recently modified;

a system bus directly connecting the central processing unit, the display memory, and the system memory; and a video bus directly connecting the display memory and the display processing unit; said central processing unit accelerating display changes by storing a copy of the display data in the system memory, by modifying data in the system memory and updating said block change data in response to processing instructions, and by transferring the subset of data blocks from the system memory to the display memory during intervals in which the display memory is available for acces by the central processing unit.

6. The computing system in claim 5 further comprising:

a video display; and wherein said display processing unit is connected to and controls said video display.

* * * * *